(12) United States Patent
Howe et al.

(10) Patent No.: US 12,420,962 B2
(45) Date of Patent: Sep. 23, 2025

(54) VERTICAL AIR VEHICLE TAKEOFF AND LANDING STABILIZATION APPARATUSES, SYSTEMS, AND METHODS

(71) Applicant: The Boeing Company, Arlington, VA (US)

(72) Inventors: Wayne Richard Howe, Irvine, CA (US); Terrance Mason, Pasadena, CA (US)

(73) Assignee: THE BOEING COMPANY, Arlington, VA (US)

( * ) Notice: Subject to any disclaimer, the term of this patent is extended or adjusted under 35 U.S.C. 154(b) by 14 days.

(21) Appl. No.: 18/636,631

(22) Filed: Apr. 16, 2024

(65) Prior Publication Data

US 2024/0262543 A1 Aug. 8, 2024

Related U.S. Application Data

(63) Continuation of application No. 17/588,438, filed on Jan. 31, 2022, now Pat. No. 11,987,402.

(60) Provisional application No. 63/167,199, filed on Mar. 29, 2021.

(51) Int. Cl.
| | |
|---|---|
| *B64U 70/70* | (2023.01) |
| *B64U 10/14* | (2023.01) |
| *B64U 30/299* | (2023.01) |
| *B64U 70/30* | (2023.01) |
| *B64U 101/64* | (2023.01) |

(52) U.S. Cl.
CPC ........... *B64U 70/70* (2023.01); *B64U 30/299* (2023.01); *B64U 70/30* (2023.01); *B64U 10/14* (2023.01); *B64U 2101/64* (2023.01)

(58) Field of Classification Search
CPC ........ B64U 70/97; B64U 70/90; B64U 70/95; B64U 70/70; B64U 70/50
See application file for complete search history.

(56) References Cited

U.S. PATENT DOCUMENTS

| | | |
|---|---|---|
| 2,225,525 A | 12/1940 | Pitcairn |
| 6,464,459 B2 | 10/2002 | Illingworth |
| 6,616,094 B2 | 9/2003 | Illingworth |

(Continued)

FOREIGN PATENT DOCUMENTS

| | | |
|---|---|---|
| CN | 201023656 Y | 2/2008 |
| CN | 102756805 A | 10/2012 |

(Continued)

OTHER PUBLICATIONS

EP Search Report mailed Aug. 2, 2022 in re EP Application No. 22160429.1.

(Continued)

*Primary Examiner* — Joshua J Michener
*Assistant Examiner* — Ashesh Dangol
(74) *Attorney, Agent, or Firm* — COATS & BENNETT, PLLC

(57) ABSTRACT

Vertical takeoff and landing vehicles (VTOLs) of the type used for the point-to-point delivery and transport of payloads (e.g., packages, equipment, etc.) and personnel, are significantly stabilized at least during takeoff and landing with present aspects significantly ameliorating or significantly eliminating destabilizing effects, including ground effect, during VTOL takeoff and/or landing.

12 Claims, 32 Drawing Sheets

(56) References Cited

U.S. PATENT DOCUMENTS

| | | |
|---|---|---|
| 7,530,318 B2 | 5/2009 | Kristiansen |
| 8,286,909 B2 | 10/2012 | Lee |
| 8,910,903 B2 | 12/2014 | Zhu |
| 9,745,047 B2 | 8/2017 | Zhu |
| 10,131,423 B2 | 11/2018 | Geise et al. |
| 10,434,885 B2 | 10/2019 | Antonini et al. |
| 2004/0244633 A1 | 12/2004 | Witmer |
| 2010/0076625 A1 | 3/2010 | Yoeli |
| 2011/0024553 A1 | 2/2011 | Choi |
| 2013/0140404 A1 | 6/2013 | Parks |
| 2013/0313364 A1 | 11/2013 | Shachor et al. |
| 2015/0008280 A1 | 1/2015 | Smoker |
| 2016/0144956 A1 | 5/2016 | Parks |
| 2016/0200438 A1 | 7/2016 | Bokeno et al. |
| 2016/0208742 A1 | 7/2016 | Pande |
| 2017/0175564 A1 | 6/2017 | Schlak |
| 2017/0203839 A1 | 7/2017 | Giannini et al. |
| 2018/0156616 A1 | 6/2018 | Bennett et al. |
| 2018/0370653 A1 | 12/2018 | Fujita |
| 2019/0133363 A1 | 5/2019 | Burchat |
| 2019/0202578 A1 | 7/2019 | Fox et al. |
| 2019/0241282 A1 | 8/2019 | Strobel |
| 2019/0270526 A1 | 9/2019 | Hehn et al. |
| 2019/0276147 A1 | 9/2019 | Lee |
| 2019/0383052 A1 | 12/2019 | Blake et al. |
| 2020/0003529 A1 | 1/2020 | Benezra |
| 2020/0031466 A1 | 1/2020 | Anderson |
| 2020/0290752 A1 | 9/2020 | Kolosiuk |
| 2021/0276735 A1 | 9/2021 | Raptopoulos et al. |
| 2021/0387744 A1* | 12/2021 | Melamed ................ B64F 1/04 |

FOREIGN PATENT DOCUMENTS

| | | |
|---|---|---|
| CN | 206552260 U | 10/2017 |
| CN | 207208447 U | 4/2018 |
| CN | 207631474 U | 7/2018 |
| CN | 108473194 A | 8/2018 |
| CN | 108715223 A | 10/2018 |
| CN | 110884660 A | 3/2020 |
| EP | 2279944 A1 | 2/2011 |
| GB | 2543816 A | 5/2017 |
| KR | 20100094056 A | 8/2010 |
| KR | 102403431 B1 | 6/2022 |
| MX | 2014014172 A | 12/2015 |
| WO | 1994020741 A1 | 9/1994 |
| WO | 2014025444 A2 | 2/2014 |
| WO | 2016137982 A1 | 9/2016 |
| WO | 2017106376 A1 | 6/2017 |
| WO | 2017155348 A1 | 9/2017 |
| WO | 2018209911 A1 | 11/2018 |
| WO | 2021023795 A1 | 2/2021 |

OTHER PUBLICATIONS

EP Search Report mailed Aug. 2, 2022 in re EP Application No. 22160425.9.

EP Search Report mailed Aug. 2, 2022 in re EP Application No. 22160423.4.

* cited by examiner

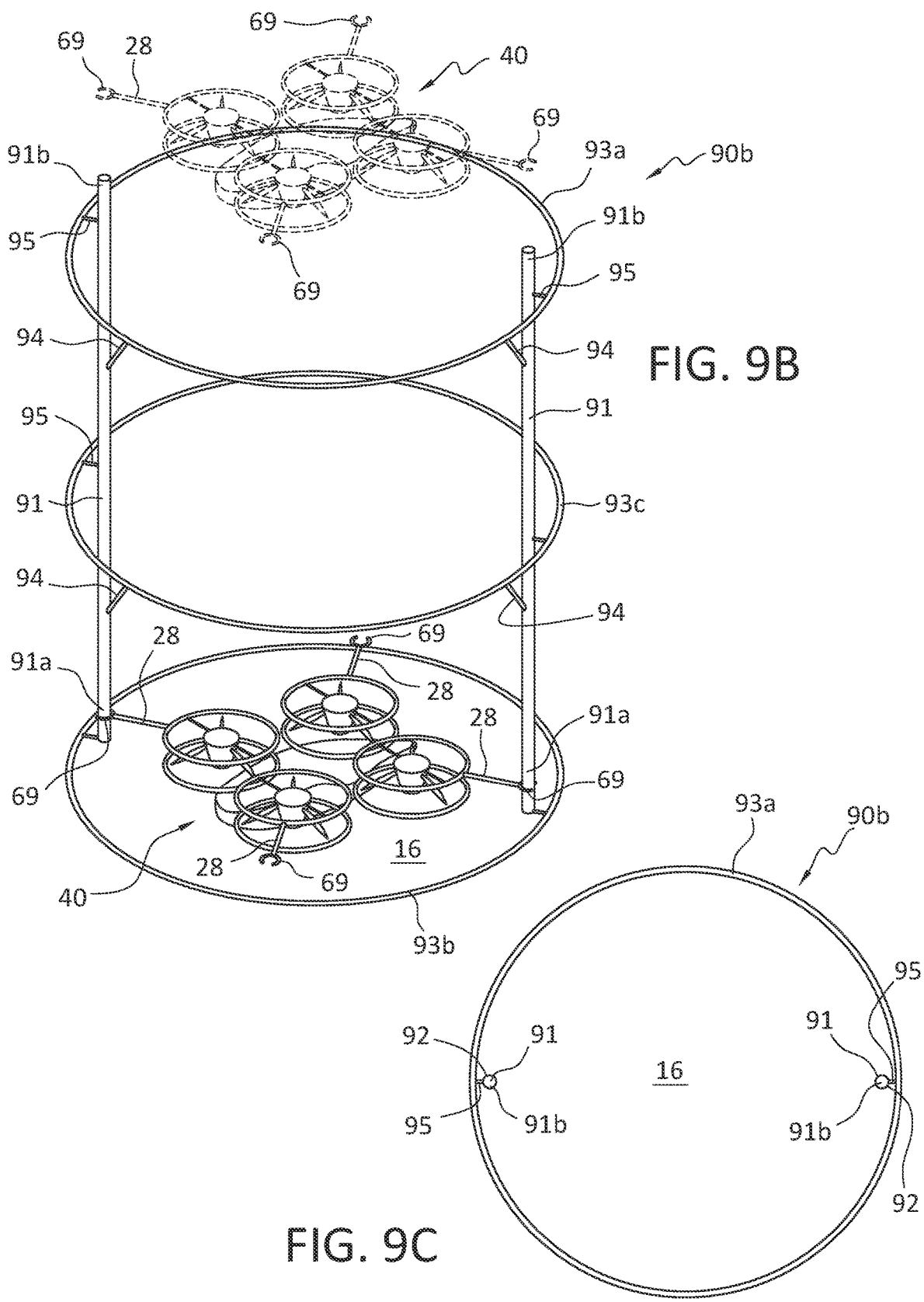

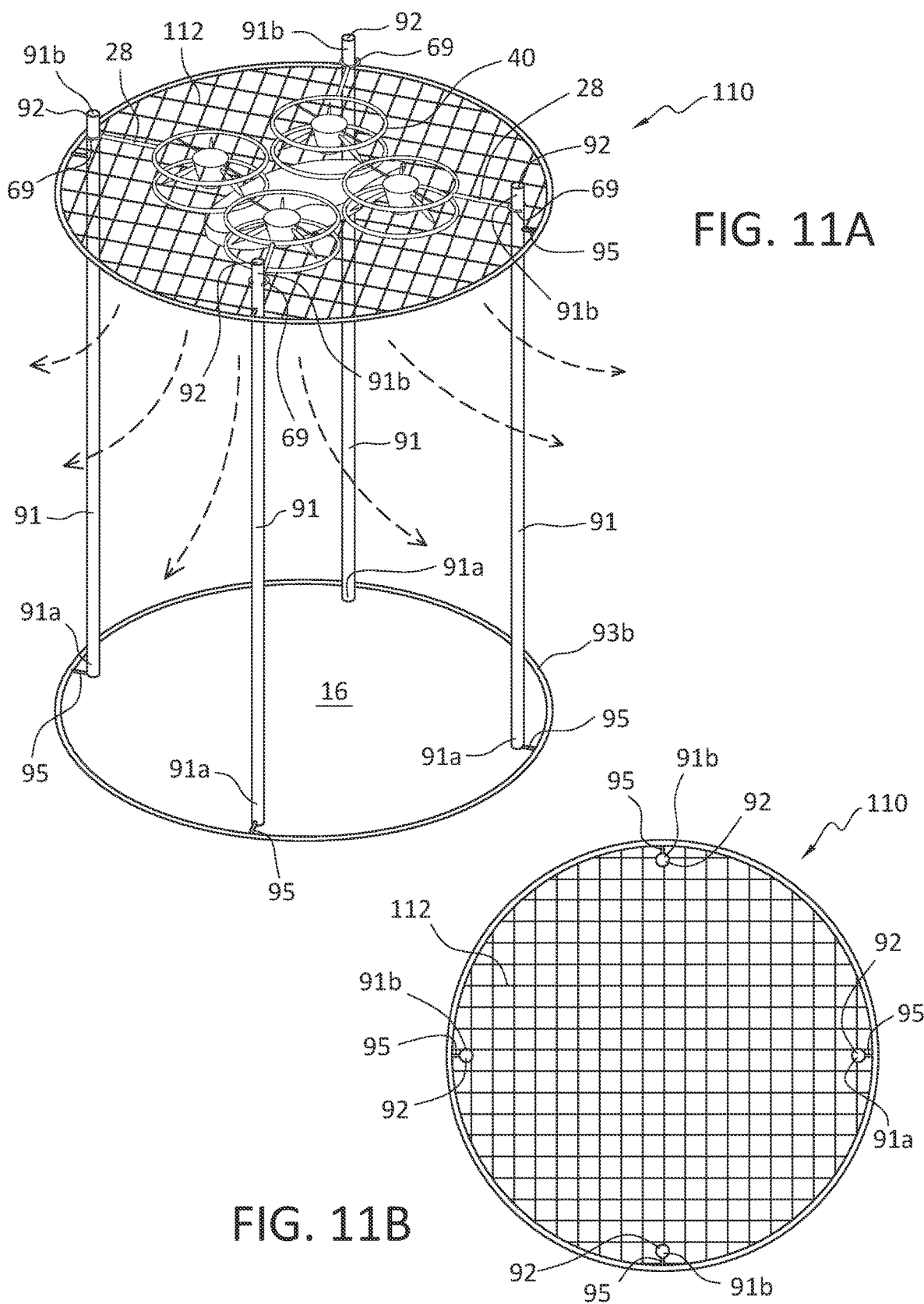

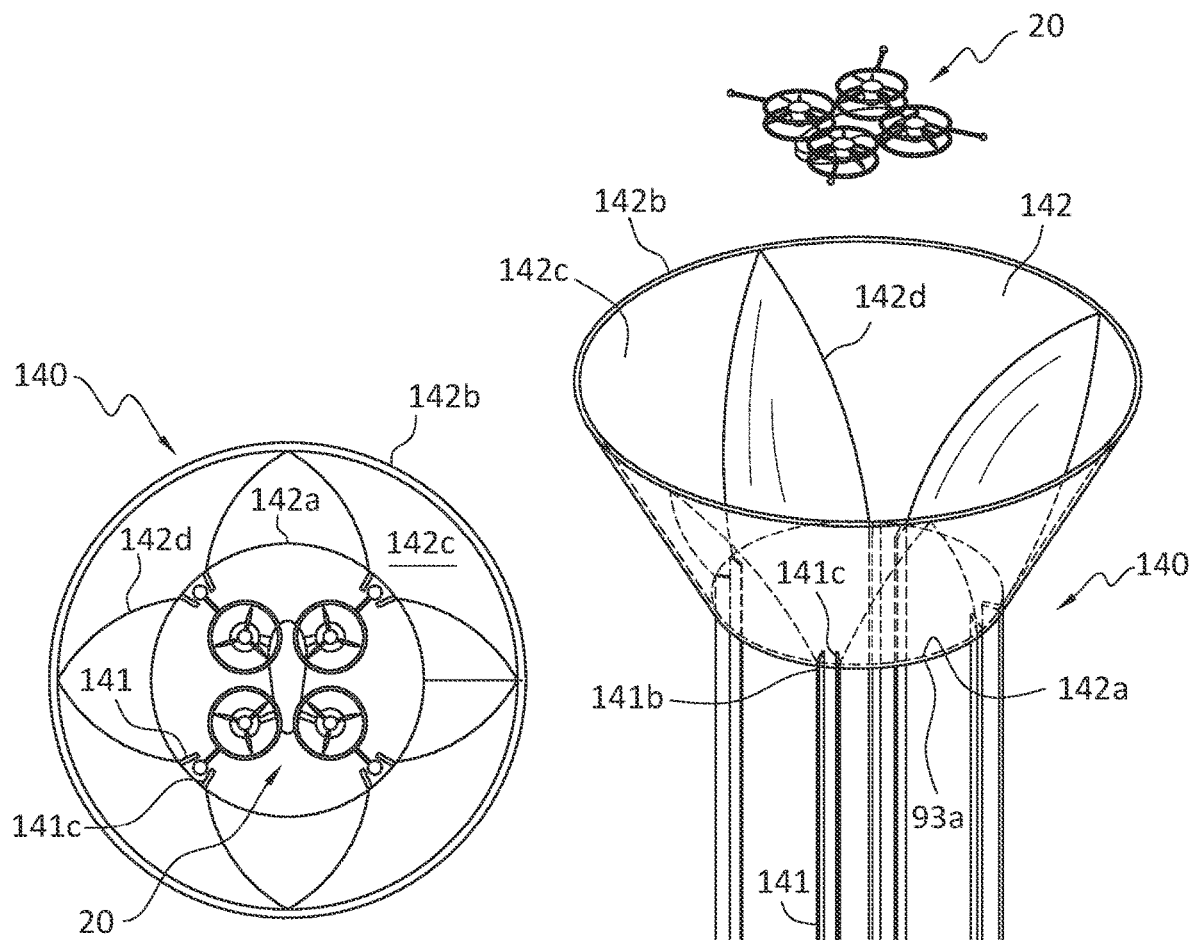
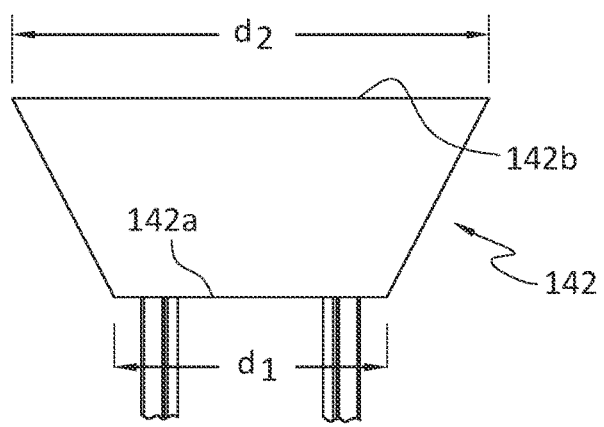
FIG. 14B
FIG. 14C
FIG. 14A

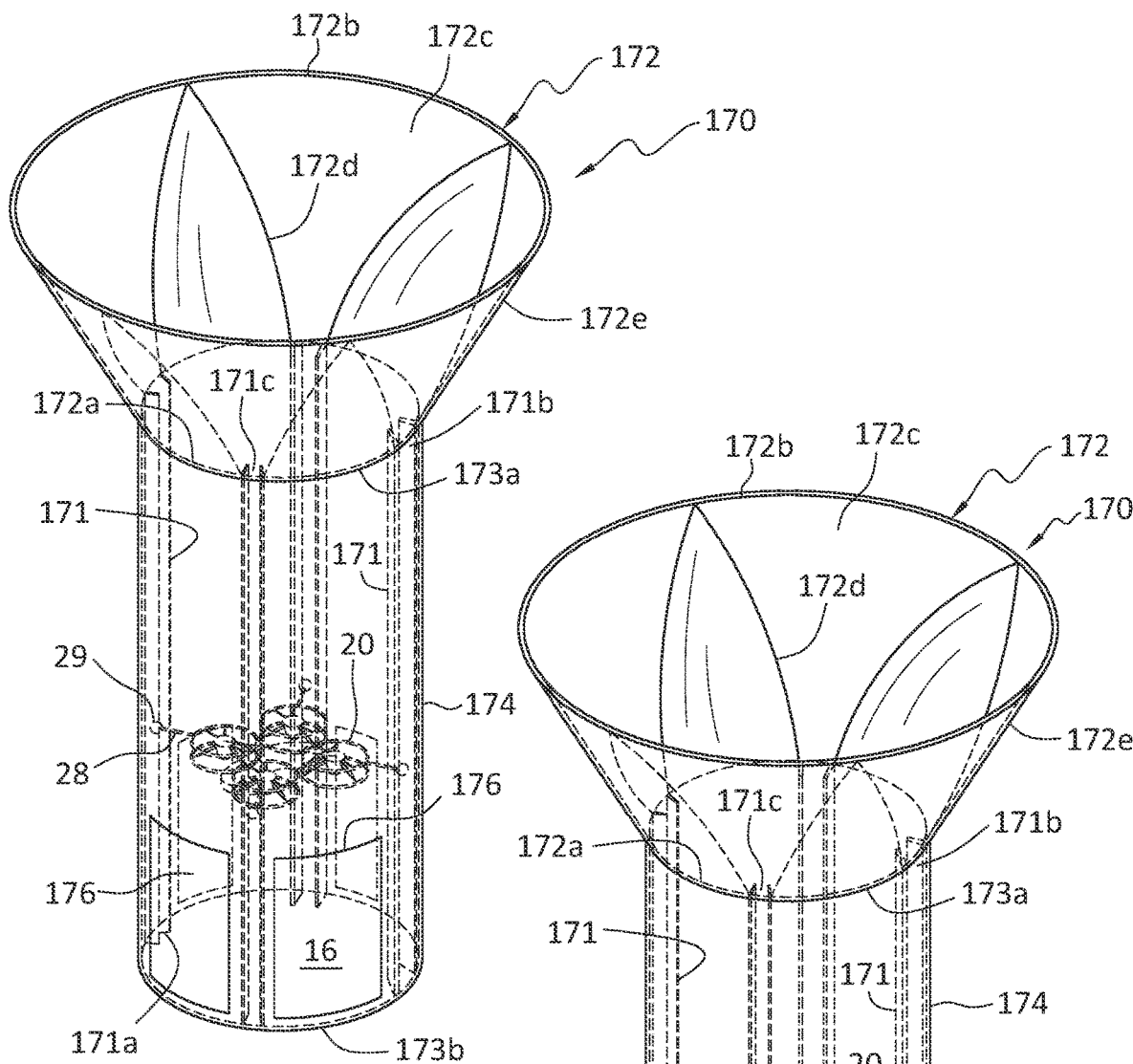
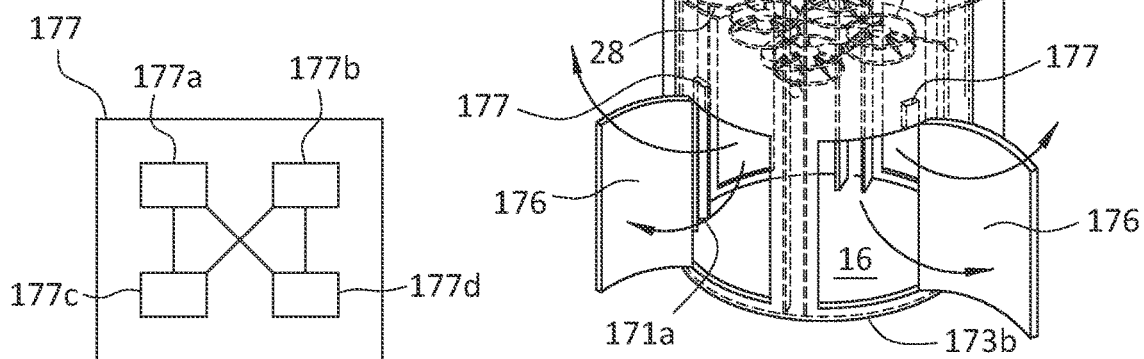
FIG. 17A
FIG. 17C
FIG. 17B

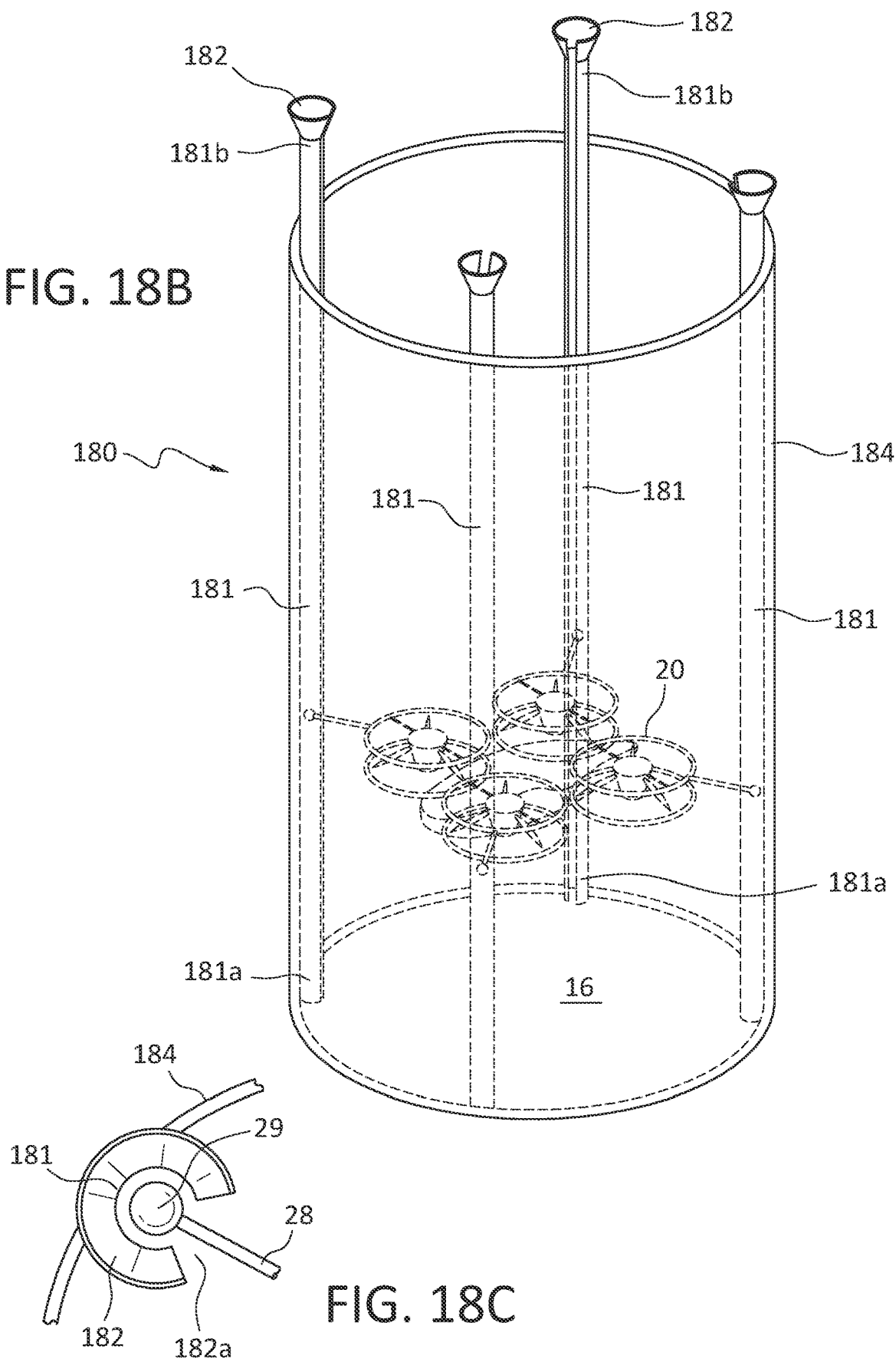

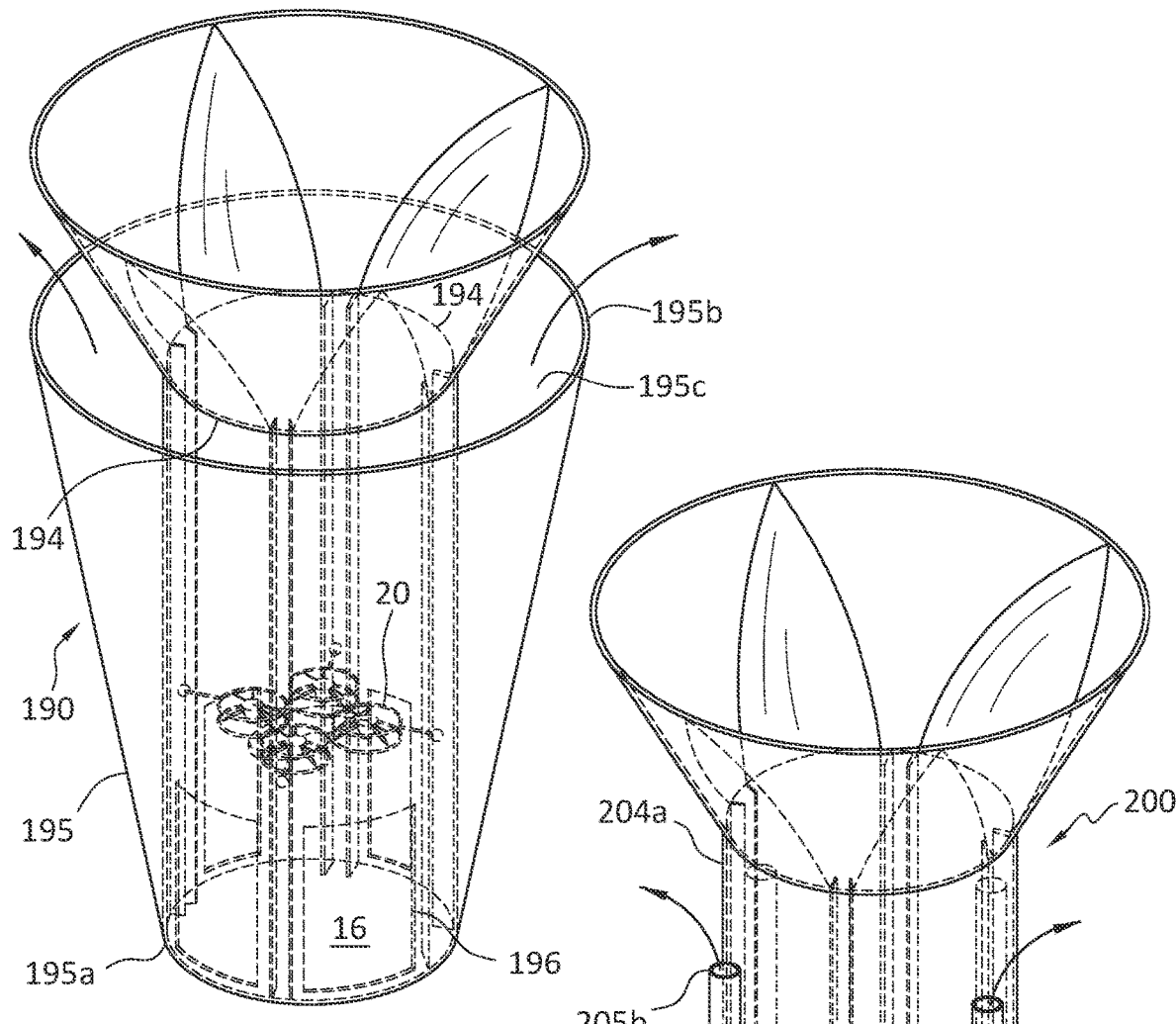
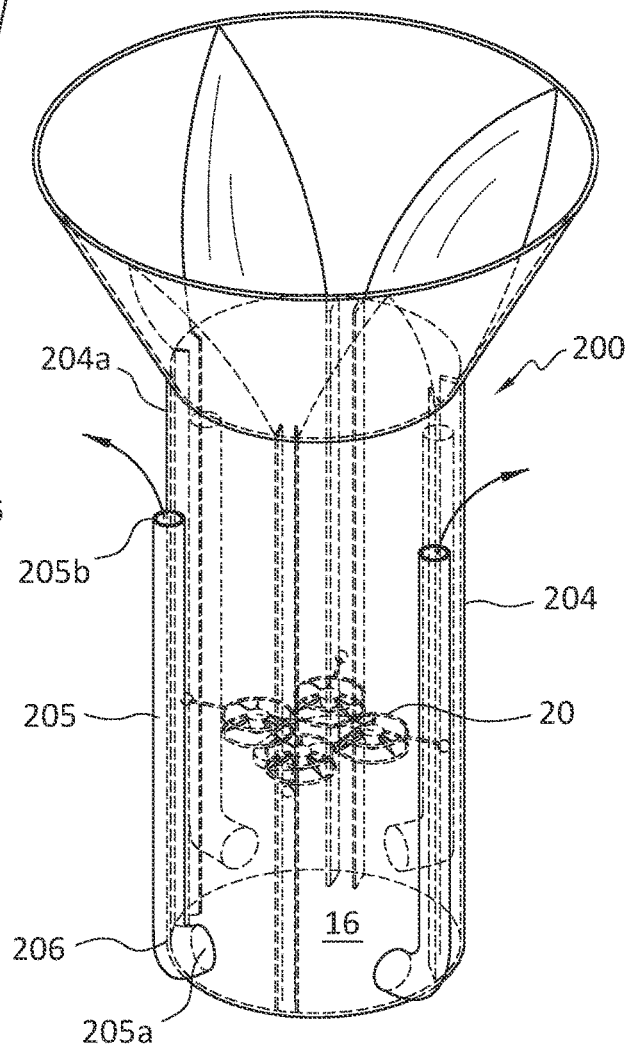
FIG. 19
FIG. 20

VERTICAL AIR VEHICLE TAKEOFF AND LANDING STABILIZATION APPARATUSES, SYSTEMS, AND METHODS

RELATED APPLICATIONS

This application is a Continuation application of U.S. patent application Ser. No. 17/588,438 filed Jan. 31, 2022 and issued May 21, 2024 as U.S. Pat. No. 11,987,402, and that claims priority to U.S. Provisional Patent Application Ser. No. 63/167,199 filed on Mar. 29, 2021, the entire contents of both of which are incorporated herein by reference.

TECHNOLOGICAL FIELD

The present disclosure relates generally to the field of vertical lift-off and vertical descent air vehicles. More specifically, the present disclosure relates to improving the use of vertical lift-off and vertical descent vehicles in proximity to inhabited locations.

BACKGROUND

The demand for point-to-point delivery of packages, payloads, and personnel has increased the potential need for air vehicles used for such delivery and personnel transportation. Rotor-driven aircraft (e.g., rotorcraft), including non-crewed smaller-scale rotorcraft collectively referred to as "drones" are typically vertical lift-off and vertical descent vehicles that create the lift required for flight by engaging one or more powerful rotors. Such "vertical air vehicles" can create significant air turbulence, noise, and safety issues during takeoff and landing, and otherwise adversely impact structures and people located at ground level during, for example, takeoff and landing. In addition, the vehicles themselves can incur damage due to instability due to ground effect turbulence during takeoff and landing. These issues and others have become impediments to the mass adoption of air vehicles in inhabited areas for delivery services and personnel transport. Unless explicitly identified as such, no statement herein is admitted as prior art merely by its inclusion in the Technological Field and/or Background section.

SUMMARY

Transport of and delivery of cargo and personnel can facilitate point-to-point via use of aircraft that does not require significant space for takeoff and landing. Accordingly, vertical air vehicles referred to equivalently herein as "vertical takeoff and landing vehicles" (VTOLs), including rotorcraft, that obviate the need for runways, etc., to achieve the lift required to become airborne offer many advantages. However, drawbacks to an increased adoption of VTOLs, including commercial use of VTOLs, include increased localized noise, ground effect from the rotors, safety issues, likelihood of incurring damage to VTOLs or land-based structures during takeoff and landing, etc. In addition, various factors can impact VTOL stability, flight, and performance during takeoff and landing, including wind gusts, etc. Present methods, systems, and apparatuses address, significantly ameliorate, and/or eliminate drawbacks to the widespread (e.g., commercial) adoption of VTOLs, and further facilitate the increased use of VTOLs, including a widespread adoption of VTOLs in inhabited areas, including inhabited areas having dense human populations.

According to present aspects, a method for launching and landing a vertical takeoff and landing vehicle is disclosed, with the method including providing a vertically-oriented support element, with the vertically-oriented support element having a vertically-oriented support element first end and a vertically-oriented support element second end, with the vertically-oriented support element first end proximate to a base, with the vertically-oriented support element extending from the vertically-oriented support element first end to the vertically-oriented support element second end, with the vertically-oriented support element second end located at a selected distance away from the vertically-oriented support element first end, with the vertically-oriented support element comprising a first cooperating stabilizer element, and with the first cooperating stabilizer element located proximate to or integral with the vertically-oriented support element second end, and an enclosure, with the enclosure dimensioned to substantially surround the at least one vertically-oriented support element. The method further includes providing a vertical takeoff and landing vehicle, with the vertical takeoff and landing vehicle comprising at least one second cooperating stabilizer element, with the second cooperating stabilizer element dimensioned to engage with the first cooperating stabilizer element, and engaging the first cooperating stabilizer element of the vertically-oriented support element with the second cooperating stabilizer element of the vertical takeoff and landing vehicle.

In another aspect, a method further comprises stabilizing the vertical takeoff and landing vehicle during at least one of takeoff and landing.

According to another aspect, the stabilizing of the vertical takeoff and landing vehicle during at least one of takeoff and landing can comprise horizontal stabilization, angular stabilization, and combinations thereof, that can further include the stabilization of aerial conditions including, for example, at least one of pitch, yaw, roll, and combinations thereof.

In another aspect, the method further comprises restricting angular movement of the vertical takeoff and landing vehicle toward and away from the vertically-oriented support element during takeoff and landing of the vertical takeoff and landing vehicle. The restriction of the angular movement can be a horizontal restriction or a restriction at an angle other than planar (with planar defined as 0° or 180°).

In another aspect, the method comprises the use of a plurality of vertically-oriented support elements.

In another aspect, the base is proximate to ground level.

In another aspect, the enclosure is in direct communication with the vertically-oriented support element.

In a further aspect, the vertically-oriented support element first end is integral with the base.

In another aspect, the vertically-oriented support element first end is attached to the base.

In a further aspect, the method comprises the use of a frame comprising at least one vertically-oriented support element.

In another aspect, the second end of the vertically-oriented support element is located a distance from the first end, with the distance ranging from about 4 ft. to about 100 ft.

In another aspect, the first cooperating stabilizer element comprises at least one of: a male attachment portion and a female attachment portion.

In a further aspect, the second cooperating stabilizer element comprises at least one of: a male attachment portion and a female attachment portion.

In another aspect, the first cooperating stabilizer element comprises a standoff element, with the standoff element configured to extend outwardly from the vertically-oriented support element, and with the standoff element configured to engage the second cooperating stabilizer element.

In another aspect, the second cooperating stabilizer element comprises a standoff element, with the standoff element configured to engage the first cooperating stabilizer element.

In another aspect, the second cooperating stabilizer element is configured to extend outwardly from a vertical takeoff and landing vehicle structure.

In a further, the standoff element is configured to extend outwardly from a vertical takeoff and landing vehicle rotor guard.

In another aspect, the standoff element is integral with the vertical takeoff and landing vehicle.

In another aspect, the standoff element is integral with the vertical takeoff and landing rotor guard.

In a further aspect, the vertical takeoff and landing vehicle is a rotorcraft.

In another aspect, the frame is configured to reside at a fixed location.

In a further aspect, the frame is moveable to a plurality of locations.

In another aspect, a method further comprises stabilizing the vertical takeoff and landing vehicle during at least one of takeoff and landing.

In another aspect, the enclosure is in direct communication with the vertically-oriented support element.

In a further aspect, the enclosure comprises at least one moveable panel.

In another aspect, the enclosure comprises at least one moveable panel, with the at least one moveable panel configured to open and close.

In another aspect, the at least one moveable panel is proximate to the base.

In another aspect, the at least one moveable panel is proximate to the vertically-oriented support element first end.

According to further present aspects, a method is disclosed for reducing air turbulence in a vertical takeoff and landing vehicle landing apparatus during landing, with the method including providing an at least partially enclosed vertical takeoff and landing apparatus. According to this method, the apparatus includes at least one vertically-oriented support element, said at least one vertically-oriented support element having a vertically-oriented support element first end and a vertically-oriented support element second end, said vertically-oriented support element first end located proximate to a base, with the vertically-oriented support element extending from the vertically-oriented support element first end to the vertically-oriented support element second end, with the vertically-oriented support element comprising a first cooperating stabilizer element, and with the first cooperating stabilizer element extending from the vertically-oriented support element second end to the vertically-oriented support element first end located. The apparatus further includes an enclosure, said enclosure dimensioned to substantially surround the at least one vertically-oriented support element, said enclosure comprising at least one moveable enclosure panel, said at least one moveable enclosure panel positioned proximate to or integral with the vertically-oriented support element first end. The method further includes landing a vertical takeoff and landing vehicle into the vertical takeoff and landing vehicle landing apparatus, with the vertical takeoff and landing vehicle comprising at least one second cooperating stabilizer element, said second cooperating stabilizer element dimensioned to engage with the first cooperating stabilizer element. The method further includes engaging the second cooperating stabilizer element of the vertical takeoff and landing vehicle second with the first cooperating stabilizer element of the vertically-oriented support element, lowering the vertical takeoff and landing vehicle within the at least partially enclosed vertical takeoff and landing apparatus from the vertically-oriented support element second end to the vertically-oriented support element first end, and opening the at least one moveable panel to dissipate air turbulence in the enclosure during the landing of the vertical takeoff and landing vehicle.

In further aspects, the method further comprises detecting air pressure in at least a region of the enclosure, actuating the at least one moveable panel in response to a pressure detected by the detector, and opening the at least one moveable panel to dissipate air turbulence in the enclosure during the landing of the vertical takeoff and landing vehicle.

According to a further present aspect, an apparatus is disclosed for stabilizing takeoff and landing of a vertical takeoff and landing vehicle. According to a present aspect, the apparatus includes a vertically-oriented support element, said vertically-oriented support element including a vertically-oriented support element first end and a vertically-oriented support element second end. The vertically-oriented support element second end extends from the vertically-oriented support element first end, with the vertically-oriented support element second end located at a selected distance away from the vertically-oriented support element first end, with the vertically-oriented support element further including at least one first cooperating stabilizer element, with the at least one first cooperating stabilizer element located proximate to the vertically-oriented support element second end. The apparatus further includes an enclosure, with the enclosure dimensioned to substantially surround the at least one vertically-oriented support element, and wherein the at least one first cooperating stabilizer element includes at least one of: a male attachment portion and a female attachment portion.

In another aspect, the second end is located a distance from the first end, said distance ranging from about 4 ft. to about 100 ft.

In another aspect, the vertically-oriented support element second end is located a distance from the vertically-oriented support element first end, said distance ranging from about 1 ft. to about 10 ft.

In a further aspect, the at least one first cooperating stabilizer element is configured to extend outwardly from the vertically-oriented support element.

In another aspect, the first cooperating stabilizer element includes a male attachment portion dimensioned to receive a second cooperating stabilizer element, with the second cooperating stabilizer element including a female attachment portion.

In another aspect, the first cooperating stabilizer element includes a female attachment portion dimensioned to receive a second cooperating stabilizer portion, with the second cooperating stabilizer element comprising a male attachment portion.

In another aspect, the female attachment portion includes a slot, with the slot located at the vertically-oriented support element second end, and with the slot extending a selected distance from the vertically-oriented support element second end longitudinally along the length of the vertically-oriented support element.

In another aspect, the apparatus further includes a guide, with the guide in communication with the vertically-oriented support element, and with the guide including the at least one first cooperating stabilizer element.

In a further aspect, the apparatus further includes an enclosure including a frame located proximate to the enclosure, with the frame including a plurality of vertically-oriented support elements, with the plurality of vertically-oriented support elements spaced a distance from one another, and frame further includes at least one circumferential frame support, with the at least one circumferential frame supports in communication with one or more of the plurality of vertically-oriented support elements, and wherein the enclosure is dimensioned to substantially surround the plurality of vertically-oriented support elements and with the enclosure dimensioned to substantially surround the frame.

In another aspect, the apparatus includes a plurality of horizontally-oriented connectors.

In another aspect, at least one of the circumferential frame supports comprises a horizontally-oriented connector.

In a further aspect, the frame is configured to support at least one of the plurality of vertically-oriented support elements.

In another aspect, the apparatus further includes a base, with the base configured to support the frame.

In another aspect, the base is in communication with at least one of the plurality of vertically-oriented support elements.

In another aspect, the enclosure includes at least one moveable enclosure panel, with the at least one moveable enclosure panel positioned proximate to the vertically-oriented support element first end.

In another aspect, the apparatus further includes a detector for detecting pressure within at least a localized region of the enclosure, a controller in communication with the detector, at least one of an actuator and a drive mechanism in communication with the controller, with the drive mechanism further in communication with the at least one moveable enclosure panel.

In a further aspect, the apparatus further includes a guide, with the guide in communication with the second end of the plurality of vertically-oriented support elements, and with the guide further in communication with the at least one first cooperating stabilizer element.

In another aspect, the guide further includes a guide outer surface and a guide inner surface, with the guide inner surface further including at least one directional track, said directional track referred to equivalently herein as a "guide inner surface channel" that is dimensioned to receive the second cooperating stabilizer element into the directional track, said guide inner surface channel in communication with the first cooperating stabilizer element.

In another aspect, the enclosure includes at least one moveable enclosure panel, with the at least one moveable enclosure panel positioned proximate to the vertically-oriented support element first end.

In another aspect, the at least one movable enclosure panel is configured to move from a closed position to an open position.

In a further aspect, the frame comprises at least one panel, with the at least one moveable enclosure panel is in communication with the plurality of vertically-oriented support elements.

In another aspect, the apparatus further includes a horizontally-disposed platform, with the horizontally-disposed platform in communication with the vertically-oriented support element, with the horizontally-disposed platform comprising a rigid floor, with the rigid floor comprising a mesh material, and with the mesh material comprising a mesh gauge selected to facilitate airflow through the rigid floor. The apparatus further includes a drive mechanism in communication with the horizontally-disposed platform, and the drive mechanism is configured to raise and lower the horizontally-disposed platform.

In a further aspect, an apparatus includes a horizontally-disposed platform in communication with at least one of the plurality of vertically-oriented support elements, with the horizontally-disposed platform including a rigid floor, with the rigid floor including a mesh material, and with the mesh material including a mesh gauge selected to facilitate airflow through the rigid floor. The apparatus further includes a drive mechanism in communication with the horizontally-disposed platform, and wherein the drive mechanism is configured to raise and lower the horizontally-disposed platform from a first position to a second position.

In another aspect, the horizontally-disposed platform is in communication with a plurality of the plurality of vertically-oriented support elements.

According to a further aspect, a vertical takeoff and landing vehicle is disclosed with the vehicle including a vertical takeoff and landing vehicle body, said vertical takeoff and landing vehicle body housing a motor, at least one rotor in communication with the motor, with the at least one rotor having a rotor length, and a rotor guard, with the rotor guard dimensioned to have a rotor guard diameter, sand with the rotor guard radius exceeding the rotor length. The vertical takeoff and landing vehicle further includes a vehicle standoff element in communication with at least one of the vertical takeoff and landing vehicle body and the rotor guard.

In another aspect, the vertical takeoff and landing vehicle includes a standoff element including a male attachment portion.

In a further aspect, the vertical takeoff and landing vehicle includes a standoff element including a female attachment portion.

In another aspect, the rotor guard is a circumferential rotor guard.

In a further aspect, the vehicle standoff element extends outwardly from at least one of: the vertical takeoff and landing vehicle body and the rotor guard.

In another aspect, the standoff element is integral with the vertical takeoff and landing vehicle body.

In a further aspect, the standoff element is integral with the vertical takeoff and landing rotor guard.

In another aspect, the vertical takeoff and landing vehicle is a rotorcraft.

According to further present aspects, a method for assisting takeoff of a vertical takeoff and landing vehicle is disclosed, with the method including providing an at least partially enclosed vertical takeoff and landing apparatus. The apparatus includes at least one vertically-oriented support element, with the at least one vertically-oriented support element having a vertically-oriented support element first end and a vertically-oriented support element second end, with the vertically-oriented support element first end proximate to a base, with the vertically-oriented support element extending from the vertically-oriented support element first end to the vertically-oriented support element second end, said vertically-oriented support element second end located at a selected distance away from the vertically-oriented support element first end, with the vertically-oriented support element including a first cooperating stabilizer element, and with the first cooperating stabilizer element located proximate to or integral with the vertically-oriented support element second end. The apparatus further includes an enclosure, said enclosure dimensioned to substantially surround the at least one vertically-oriented support element. The method further includes providing a vertical takeoff and landing vehicle, with the vertical takeoff and landing vehicle including at least one second cooperating stabilizer element, with the second cooperating stabilizer element dimensioned to engage with the first cooperating stabilizer element. The method further includes engaging the first cooperating stabilizer element of the vertically-oriented support element with the second cooperating stabilizer element of the vertical takeoff and landing vehicle, increasing pressure within at least a region of the enclosure from an ambient pressure to a takeoff pressure with the takeoff pressure greater than the ambient pressure, and with the region of the enclosure proximate to the vertical takeoff and landing vehicle. The method further includes maintaining the vertical takeoff and landing vehicle in a substantially fixed position within the enclosure during the pressure increase, and releasing the vertical takeoff and landing vehicle from the substantially fixed position at the takeoff pressure.

In another aspect, an apparatus for assisting a vertical takeoff and landing vehicle takeoff, with the apparatus including at least one vertically-oriented support element, with the at least one vertically-oriented support elements having a vertically-oriented support element first end and a vertically-oriented support element second end, with the first end proximate to a base, with the vertically-oriented support element extending from the vertically-oriented support element first end to the vertically-oriented support element second end, with the vertically-oriented support element second end located at a selected distance away from the vertically-oriented support element first end, with the vertically-oriented support element comprising a first cooperating stabilizer element, and with the first cooperating stabilizer element located proximate to or integral with the vertically-oriented support element second end. The apparatus further includes an enclosure, with the enclosure dimensioned to substantially surround the at least one vertically-oriented support element. The apparatus optionally further includes a pressurization unit in communication with the enclosure, with the pressurization unit configured to increase pressure within the enclosure at least at a region of the enclosure interior.

In another aspect, the pressurization required to assist VTOL takeoff is supplied by the VTOL rotors, and without the assistance of a separate pressurization unit, to increase pressure within the enclosure from ambient pressure to a takeoff pressure. The apparatus further comprises, a pressure detector, and a controller, with the controller in communication with at least one of: the pressure detector, and a release mechanism. The release mechanism is configured to release a vertical takeoff and landing vehicle from a substantially stationary position within the enclosure, preferably at a selected and/or detected pressure.

In another aspect, the enclosure includes at least one moveable enclosure panel, said at least one moveable enclosure panel positioned proximate to the vertically-oriented support element first end.

In another aspect, the at least one moveable panel is configured to move from a closed position to an open position, and further configured to move from an open position to a closed position.

In a further aspect, the apparatus further includes at least one guide, with the guide in communication with the second end of the plurality of vertically-oriented support elements, said guide further in communication with the at least one first cooperating stabilizer element.

In another aspect, the guide further includes a guide outer surface and a guide inner surface, with the guide inner surface further including at least one guide inner surface channel, with the guide inner surface channel dimensioned to receive the second cooperating stabilizer element into the guide inner surface channel, and with the guide inner surface channel in communication with the first cooperating stabilizer element.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
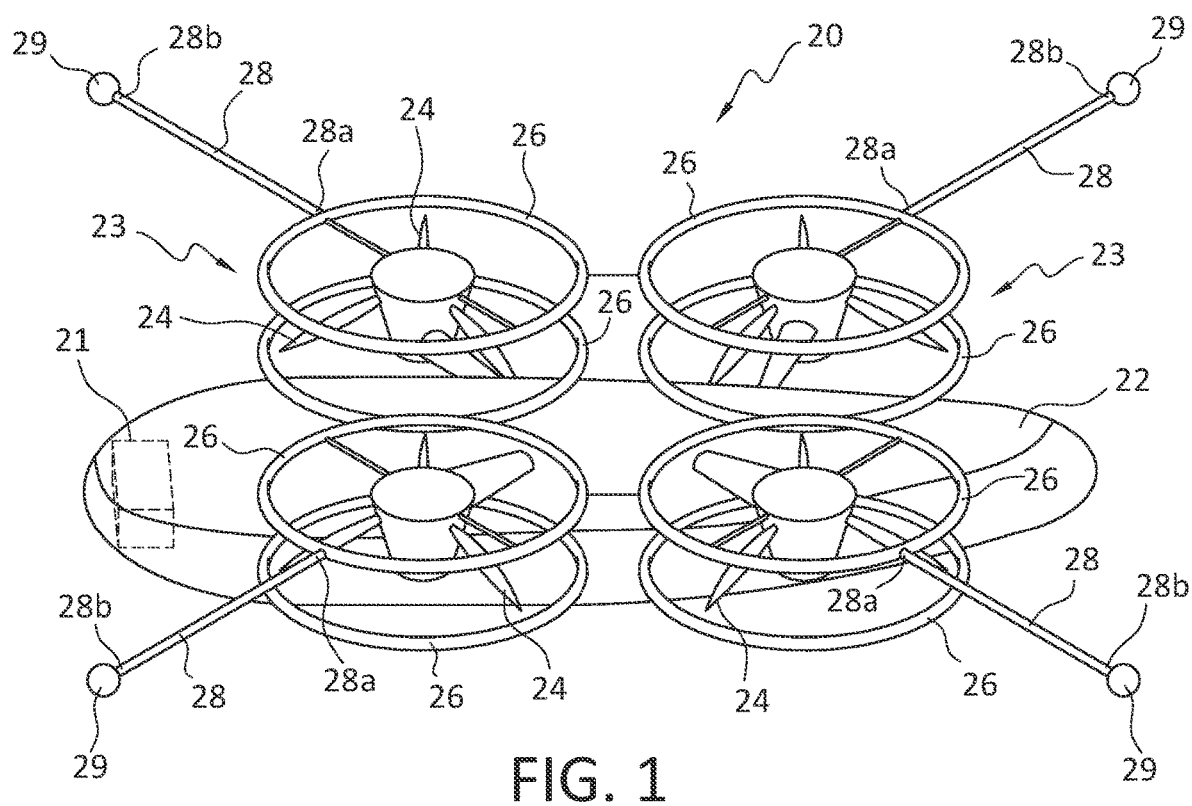
Figure 2:
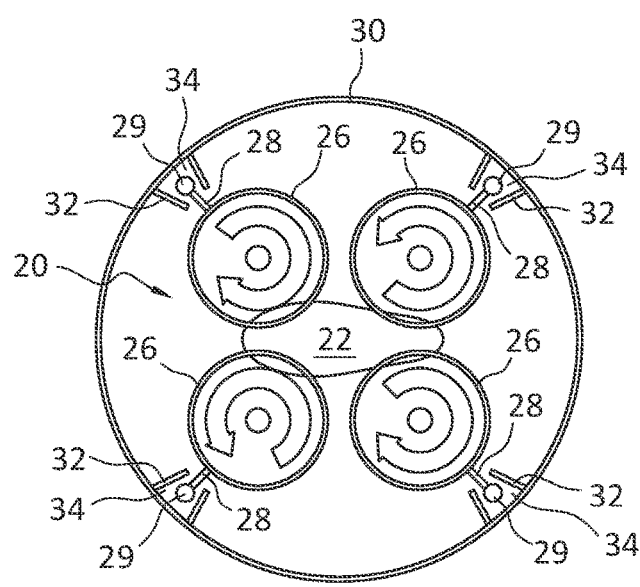
Figure 3B:
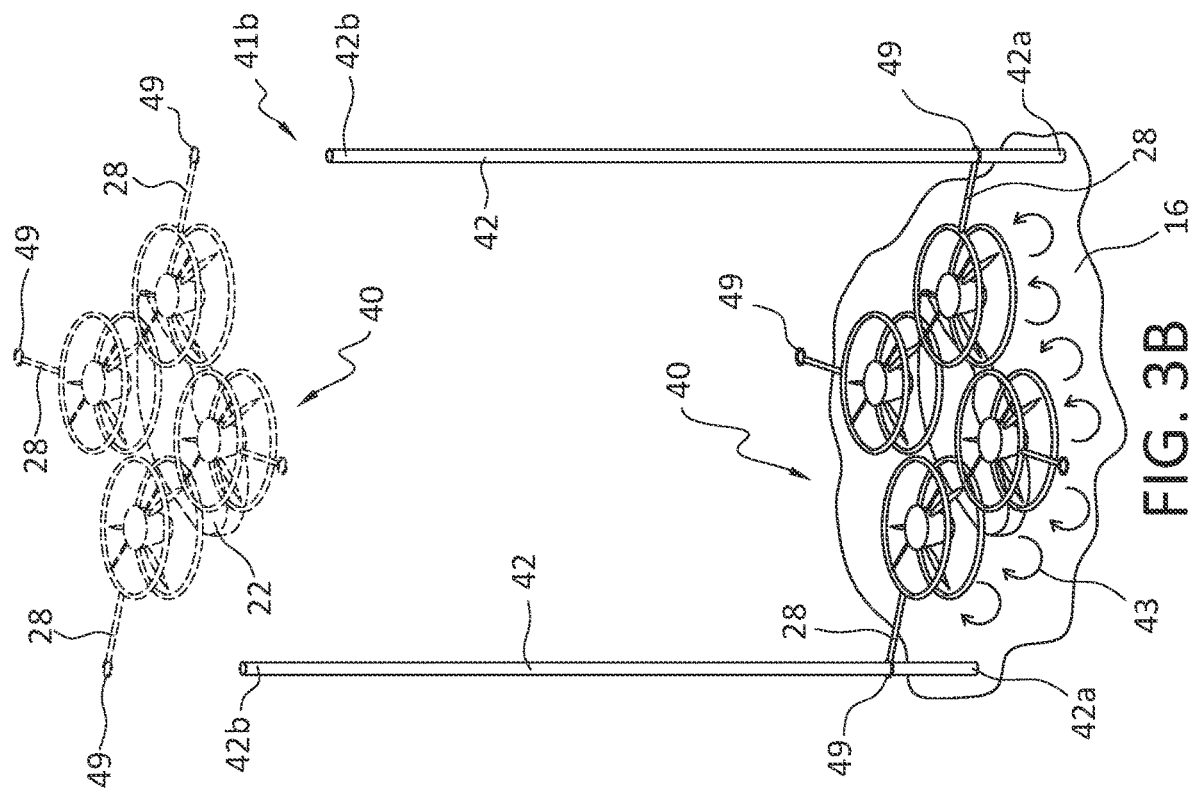
Figure 3A:
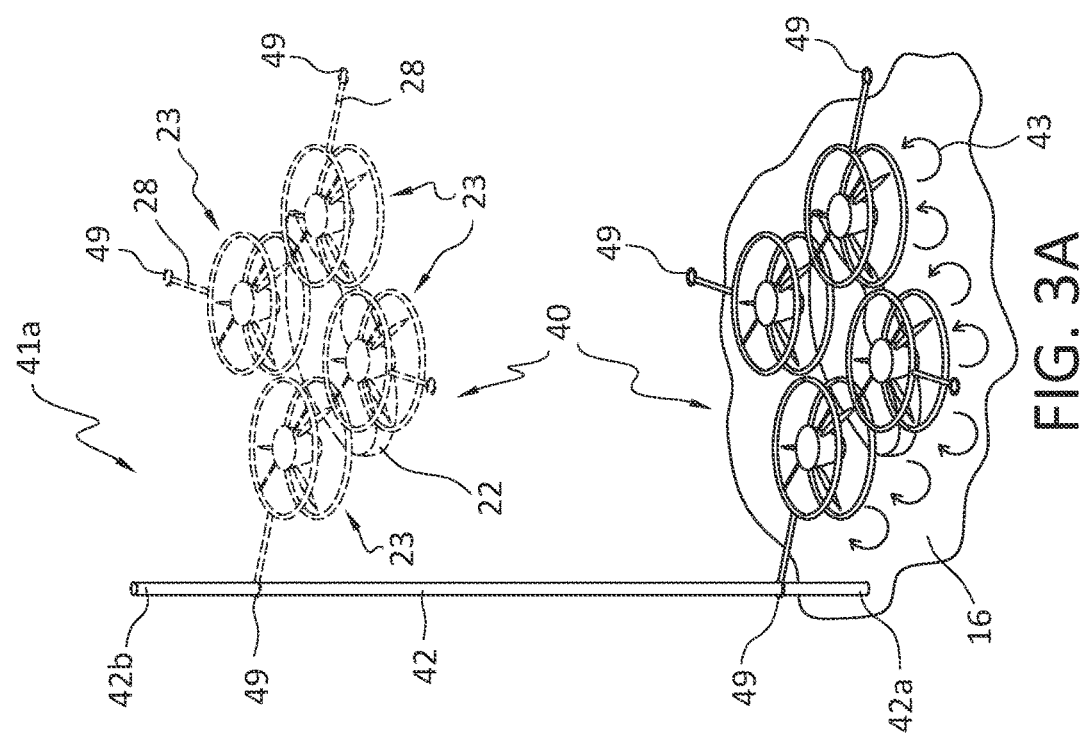
Figure 4A:
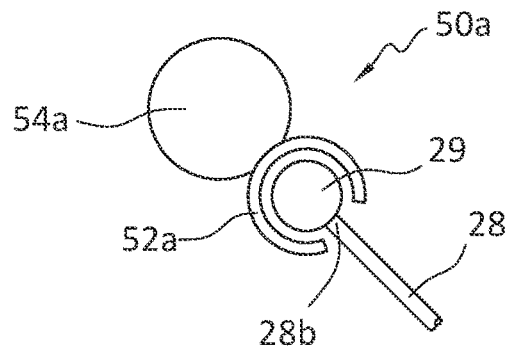
Figure 4B:
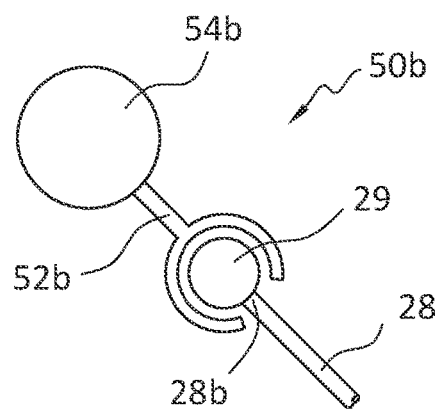
Figure 4C:
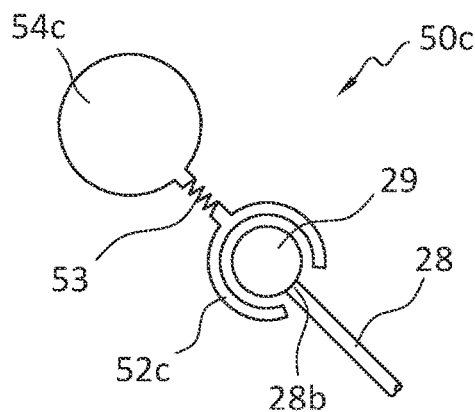
Figure 4D:
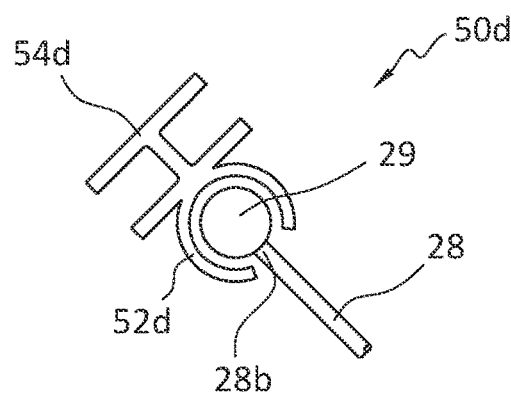
Figure 4E:
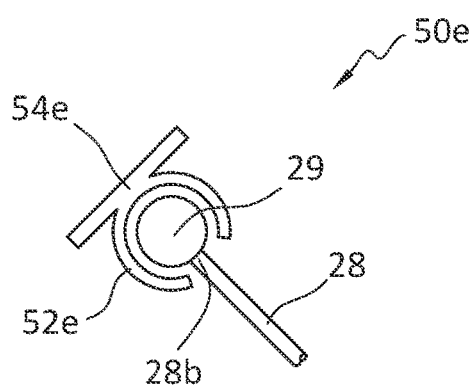
Figure 4F:
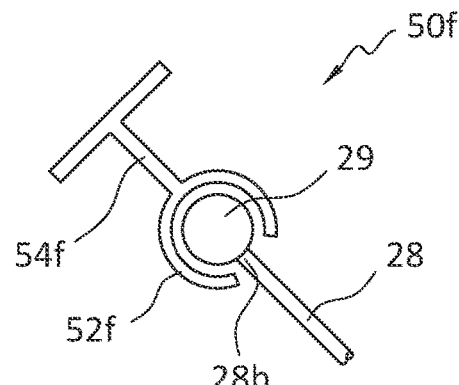
Figure 5A:
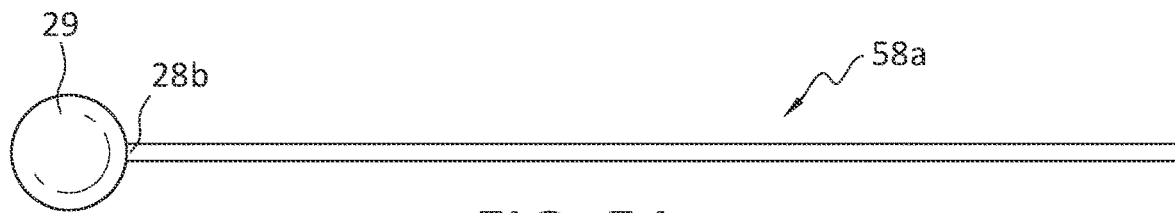
Figure 5B:
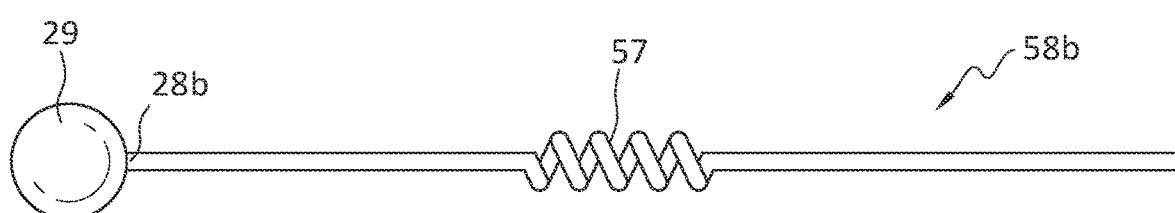
Figure 5C:
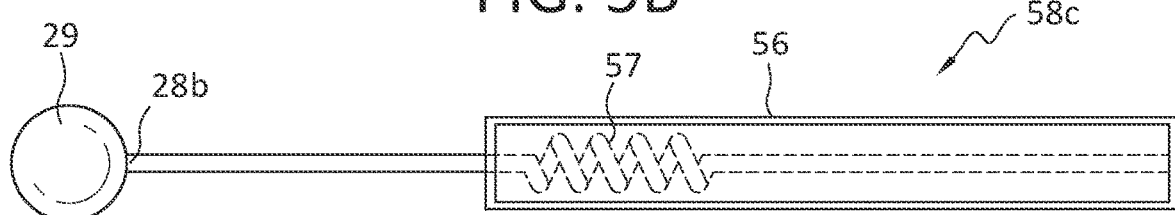
Figure 5D:
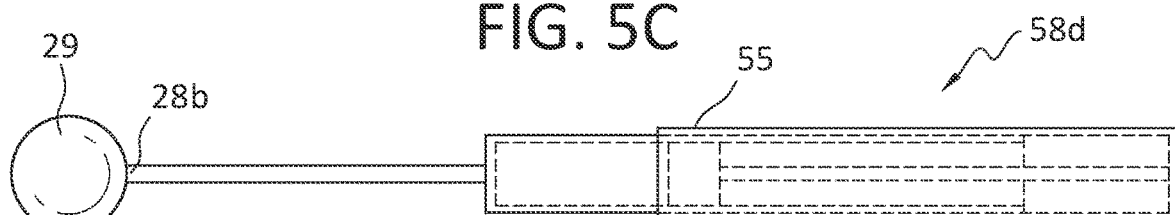
Figure 5E:
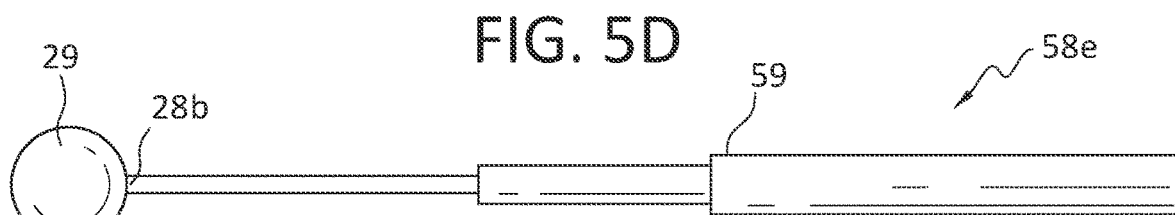
Figure 5F:
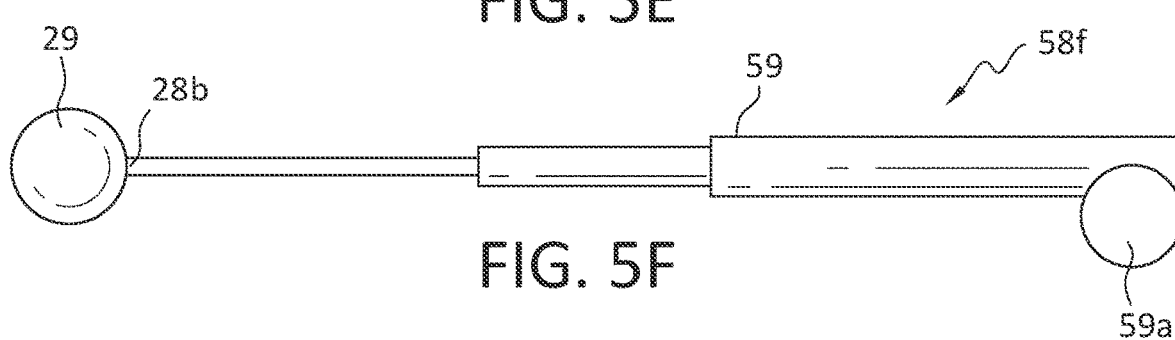
Figure 6A:
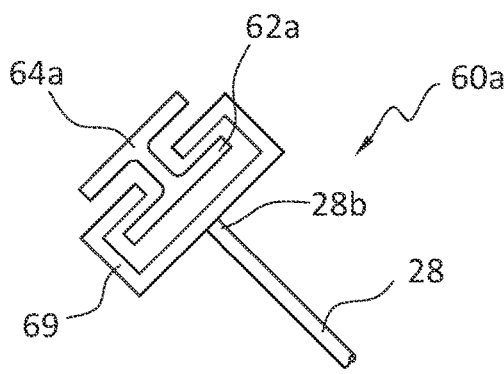
Figure 6B:
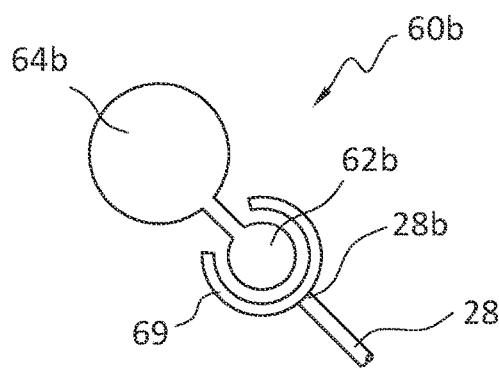
Figure 6C:
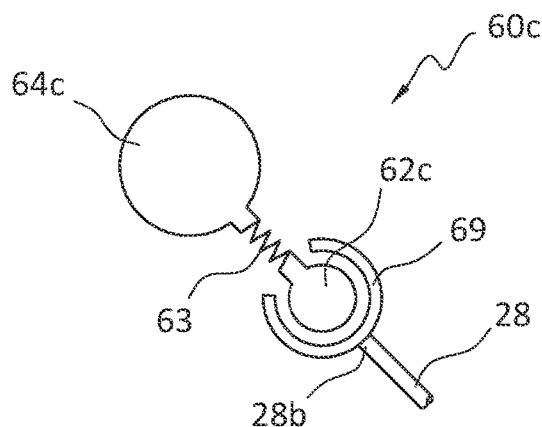
Figure 6D:
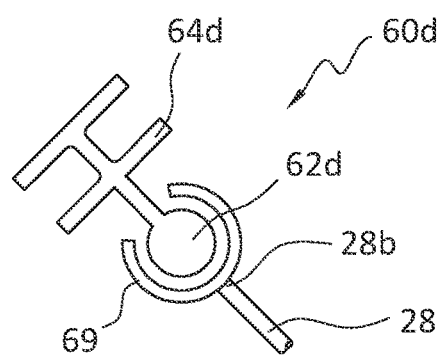
Figure 6E:
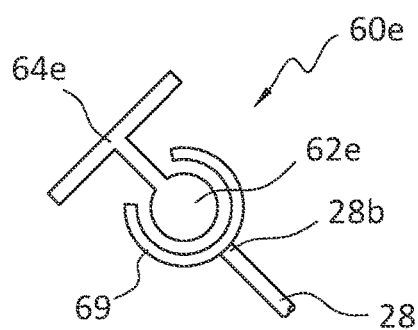
Figure 7A:
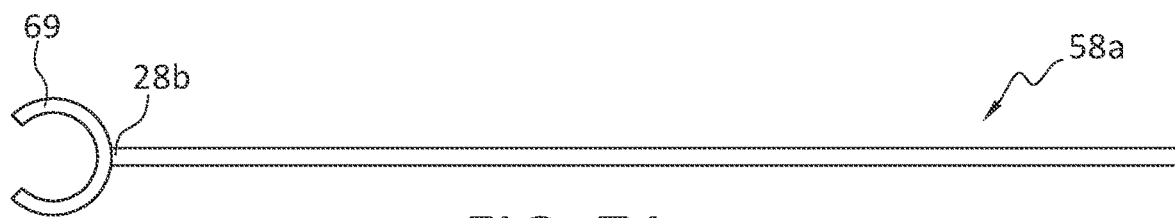
Figure 7B:
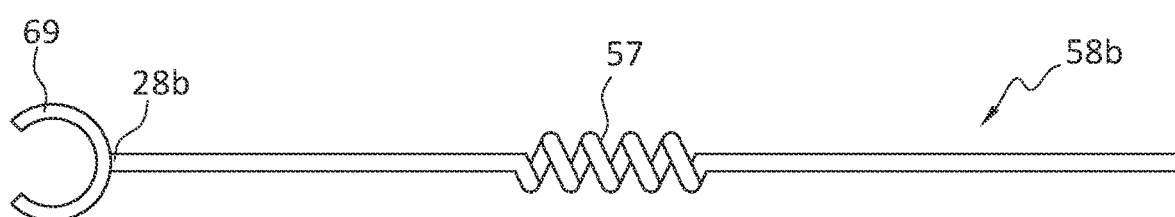
Figure 7C:
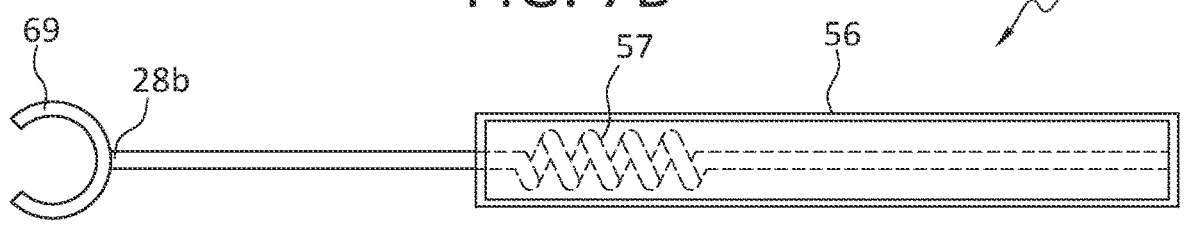
Figure 7D:
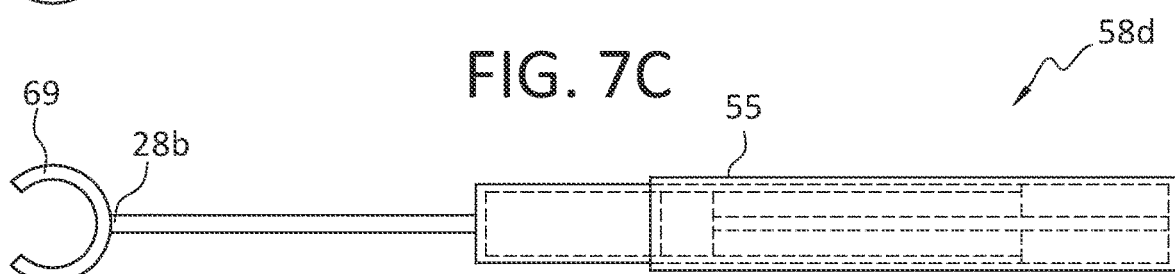
Figure 7E:
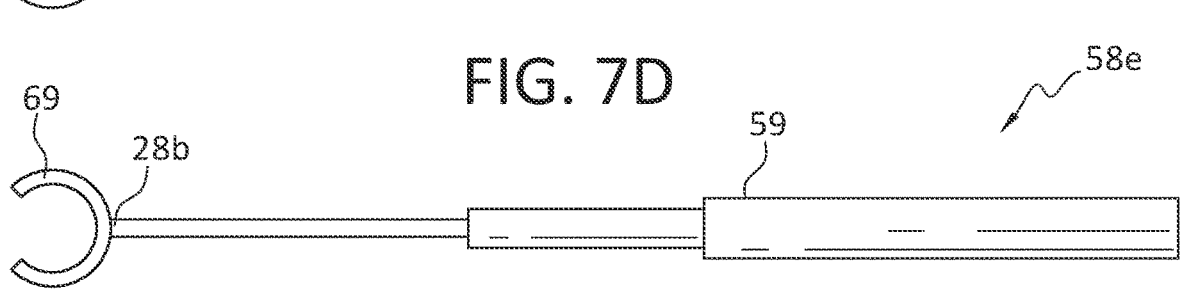
Figure 7F:
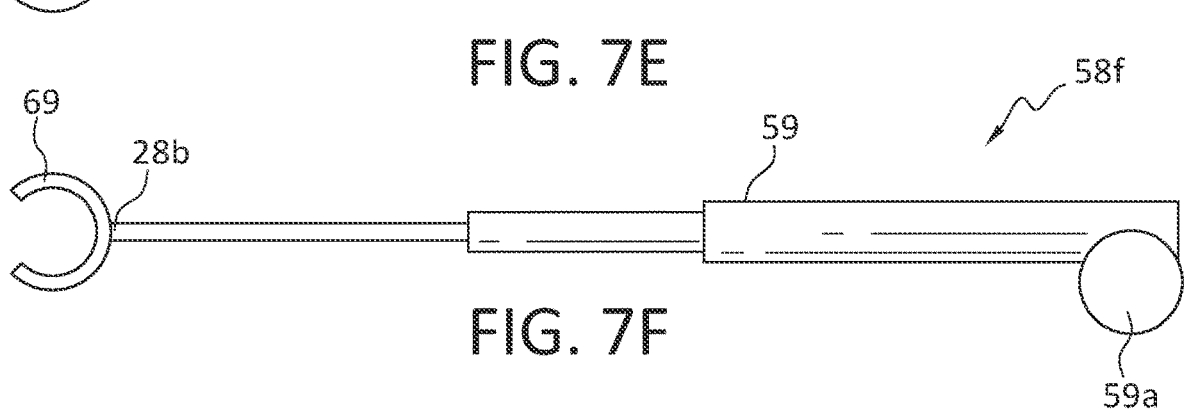
Figure 8A:
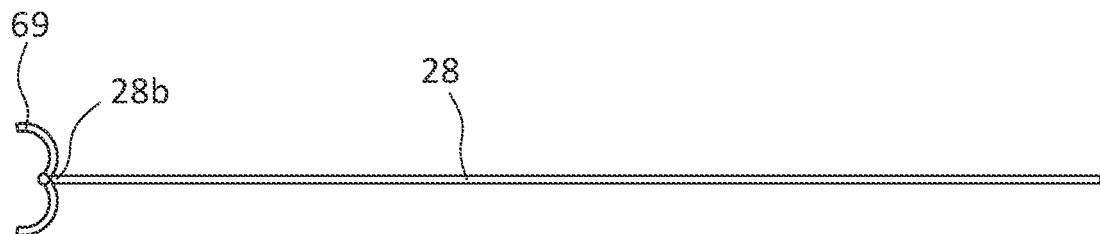
Figure 8B:
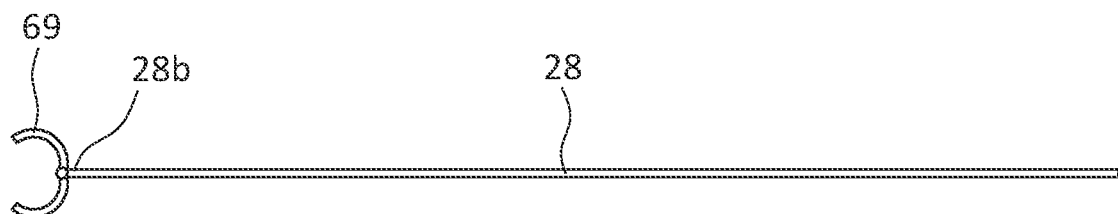
Figure 8C:
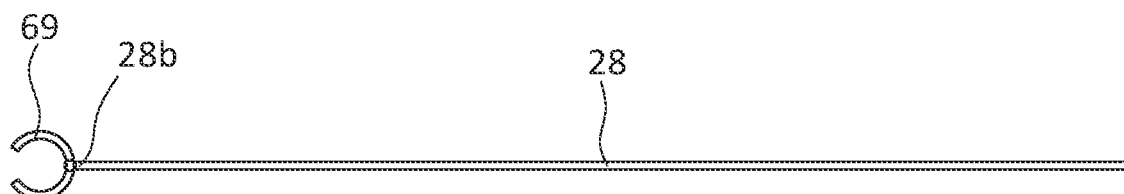
Figure 9A:
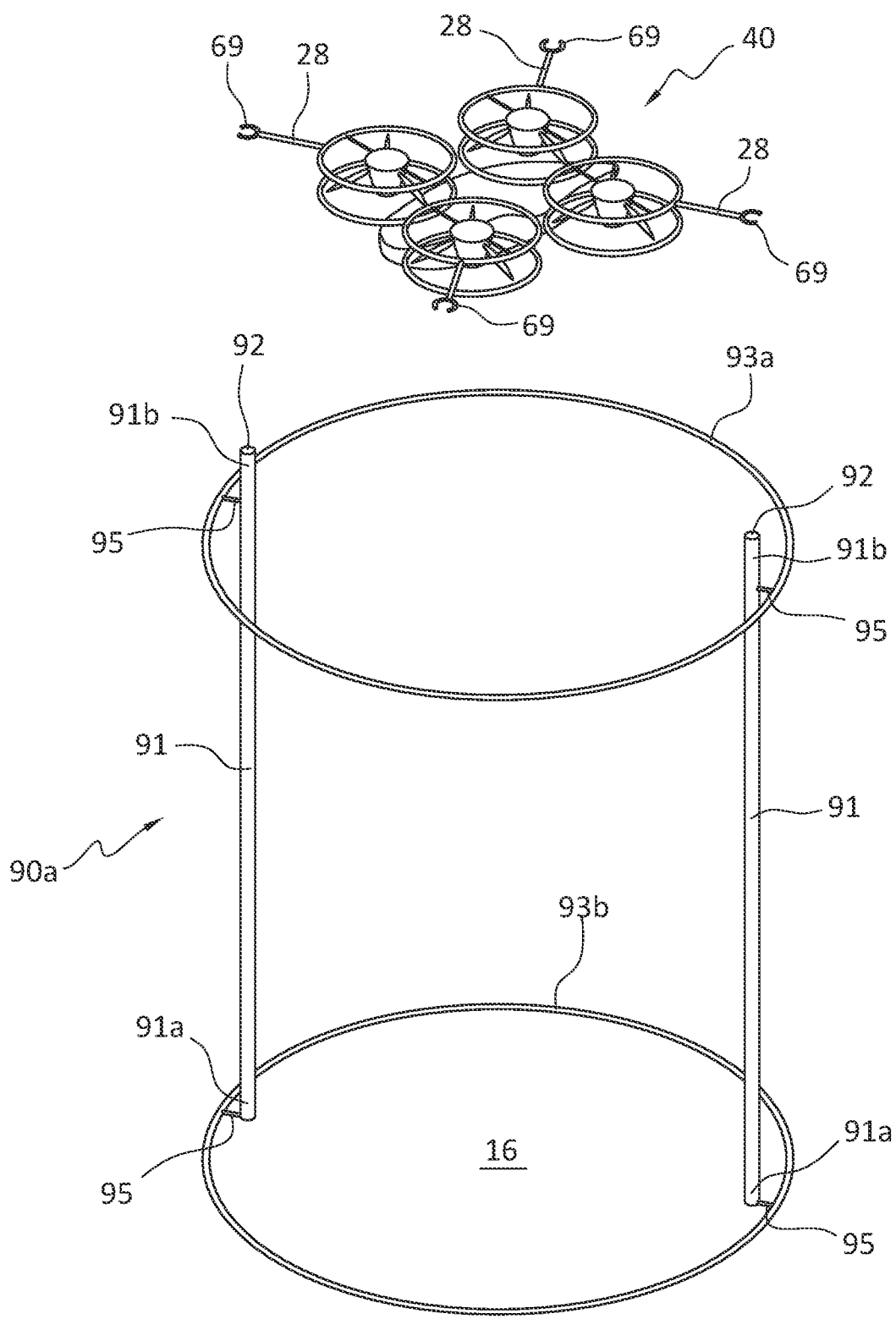
Figure 10A:
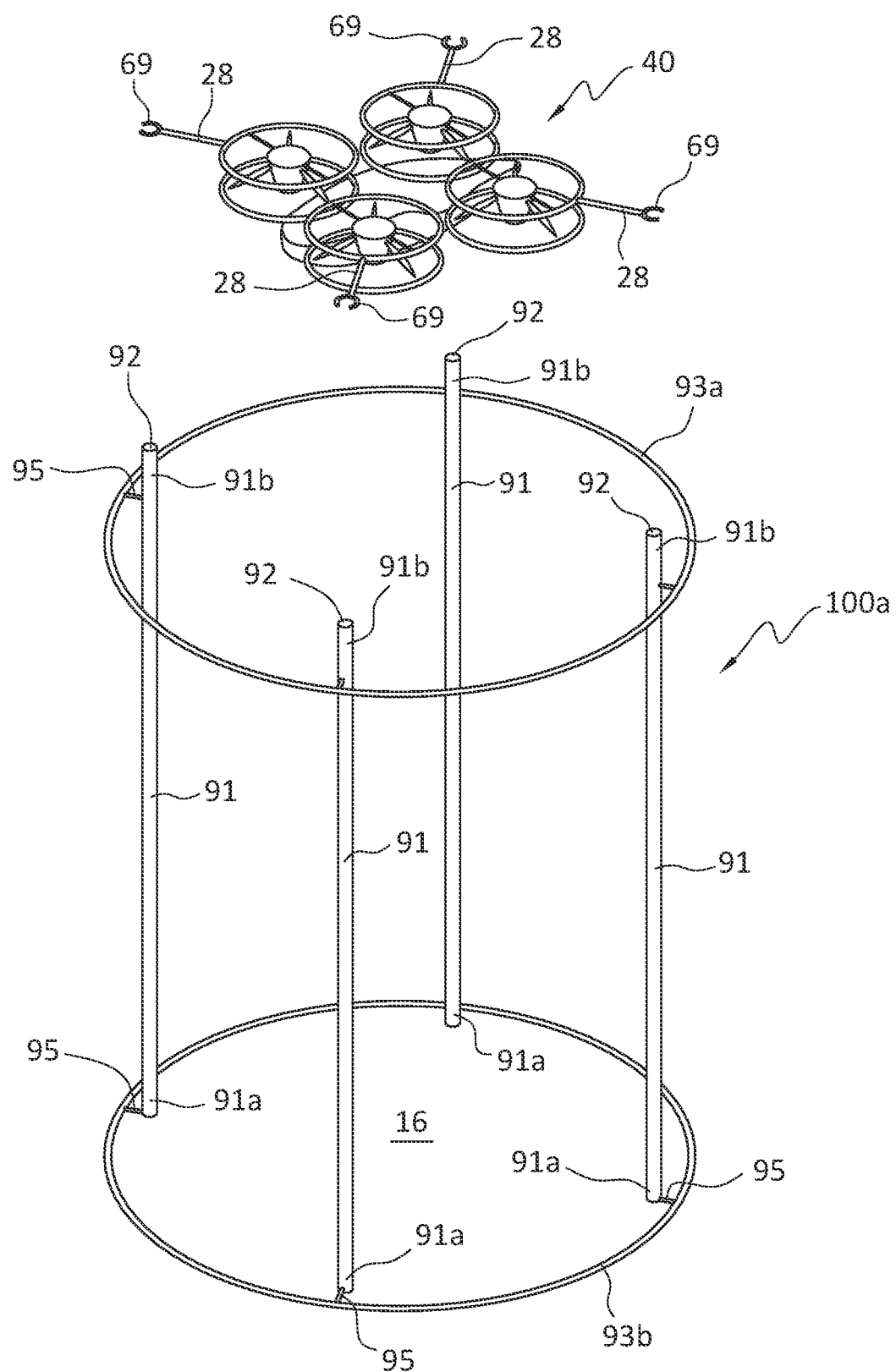
Figures 10B, 10C:
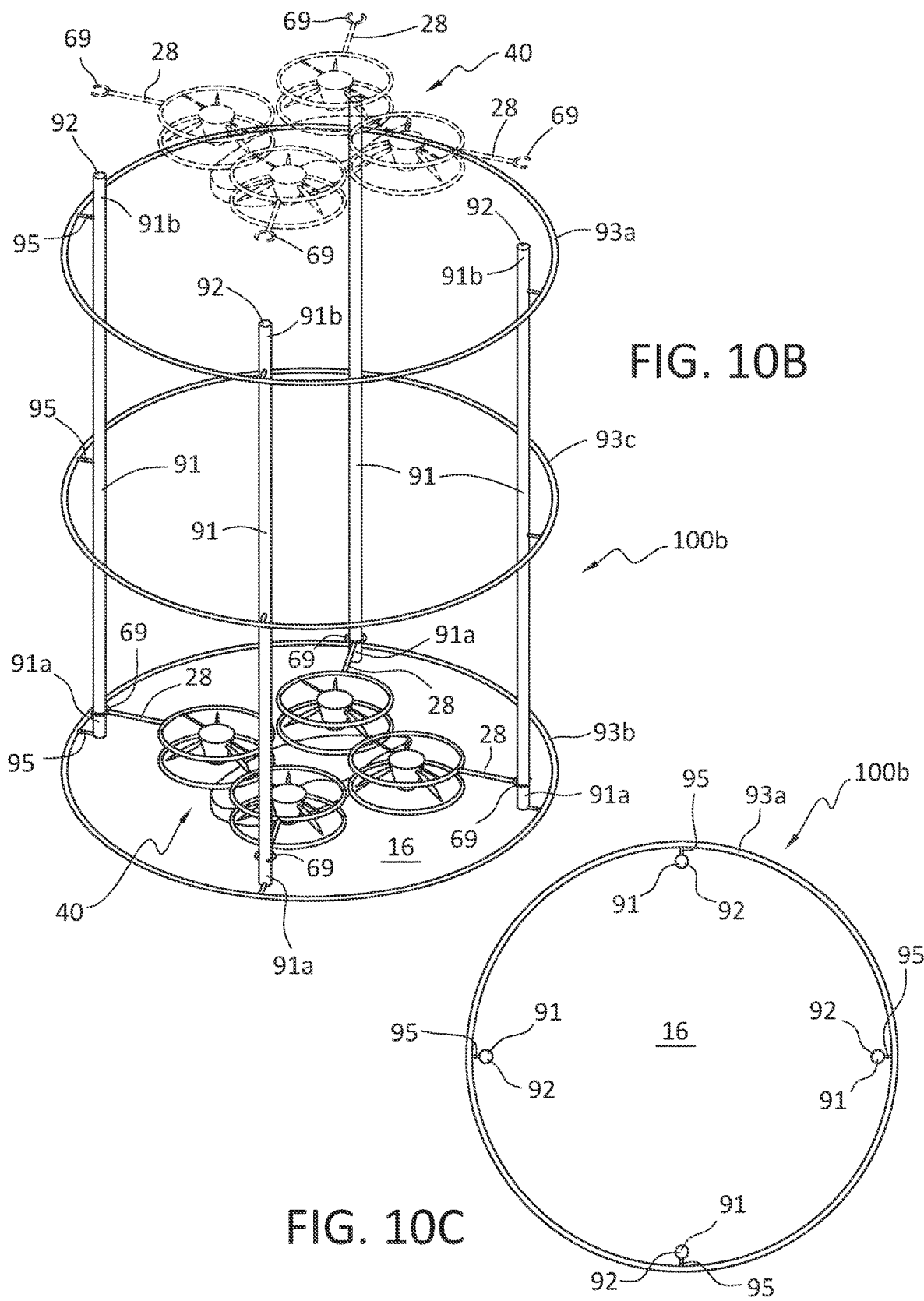
Figure 12A:
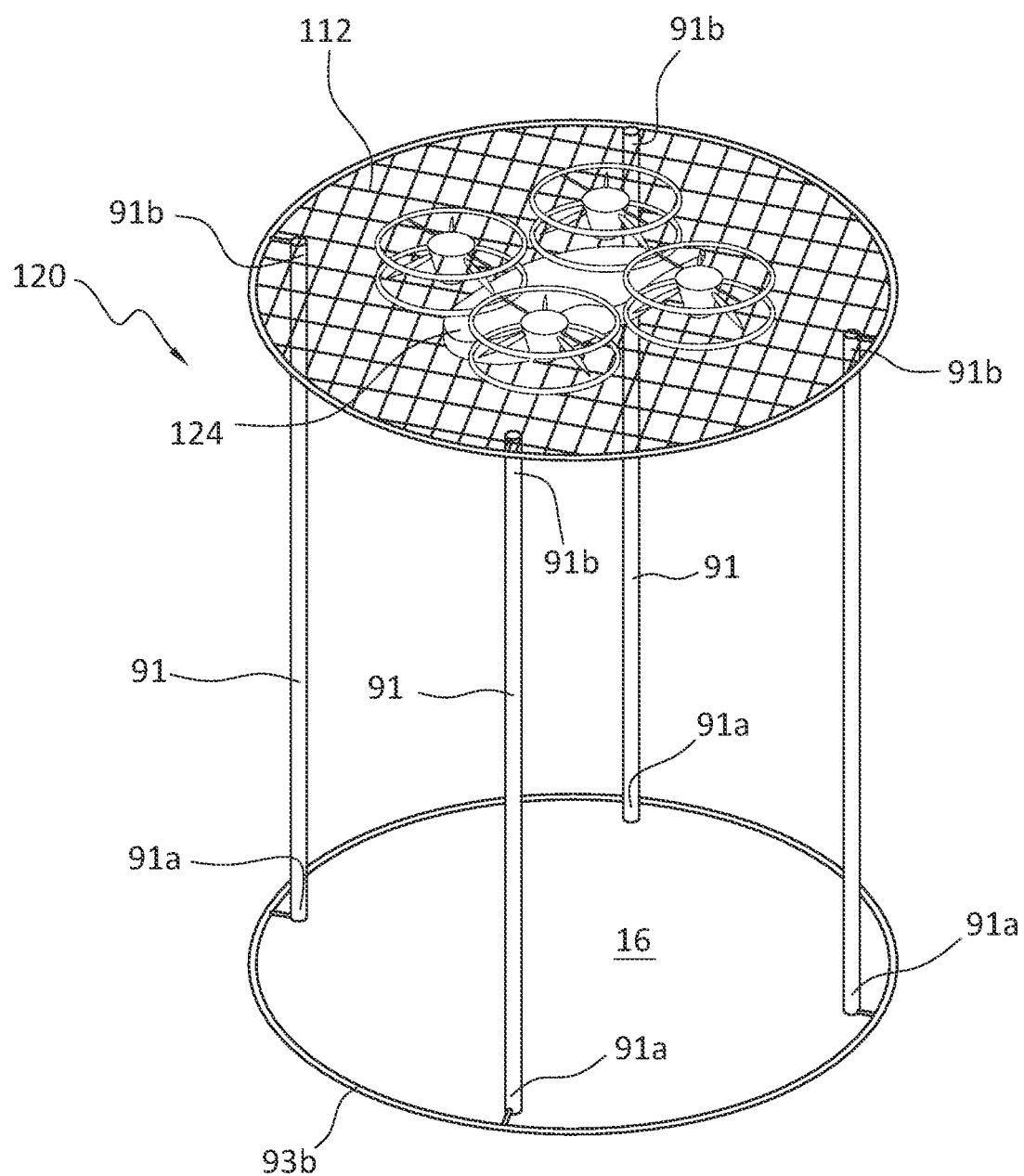
Figure 12B:
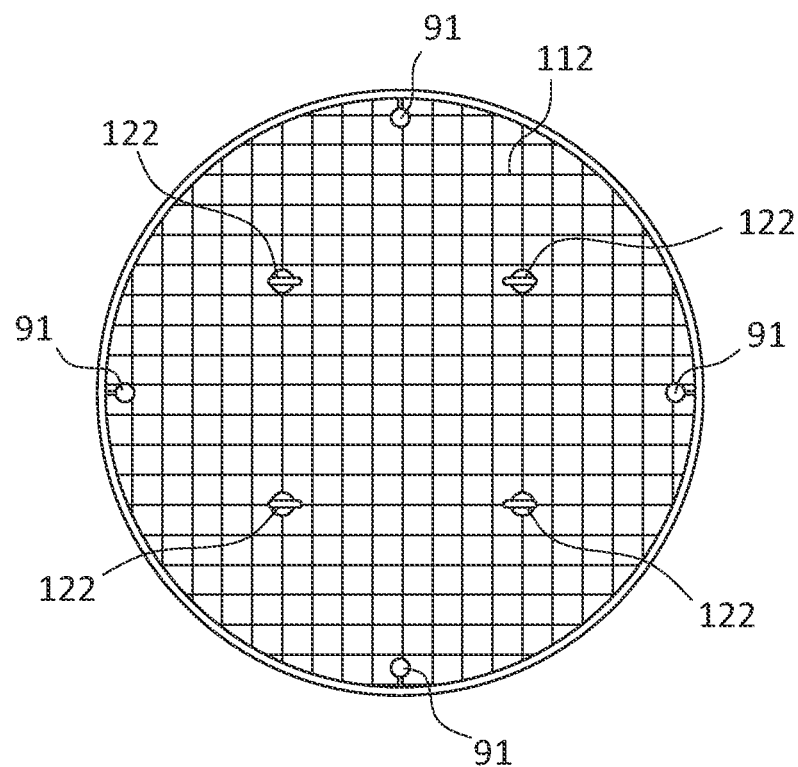
Figure 12C:
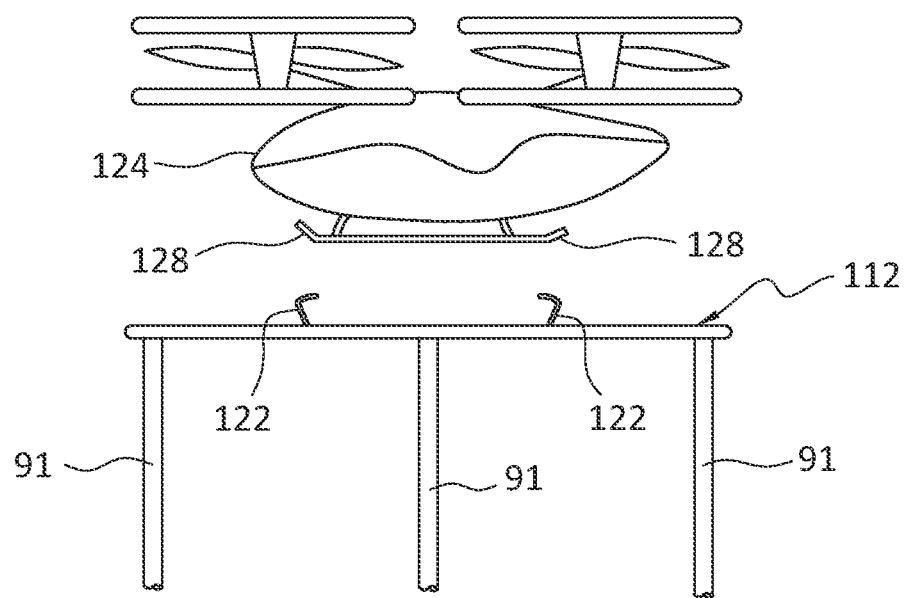
Figure 13:
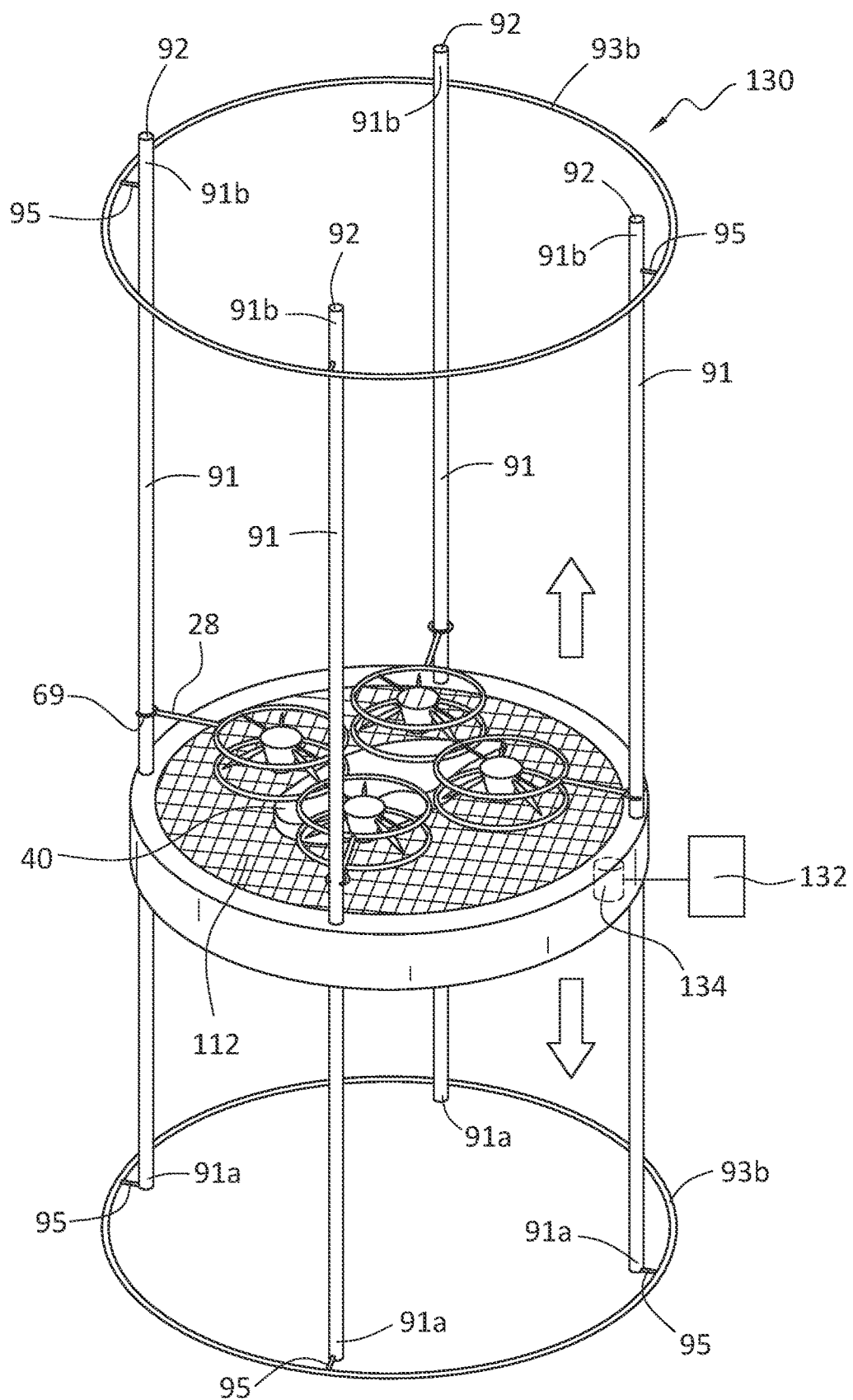
Figure 15A:
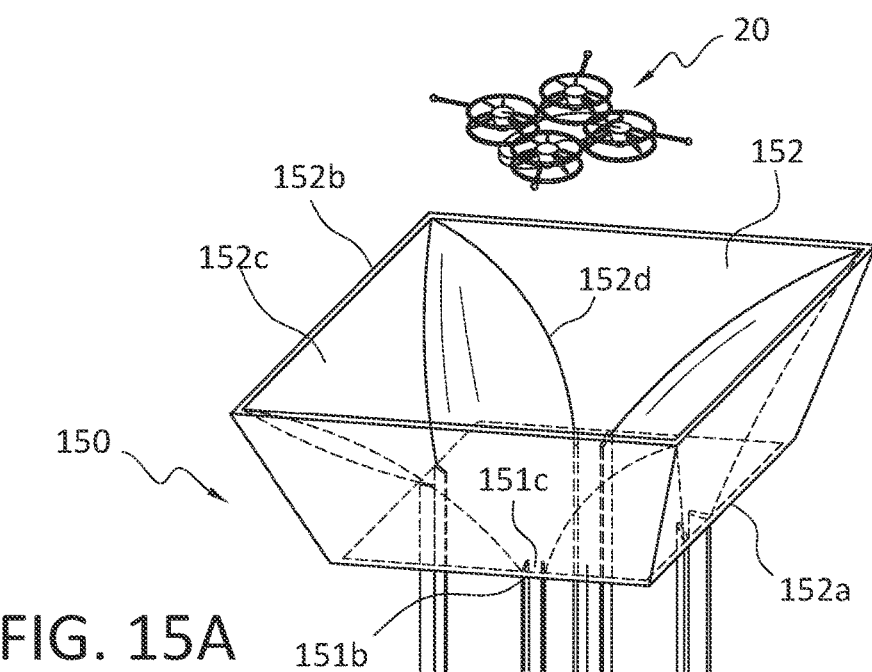
Figure 15B:
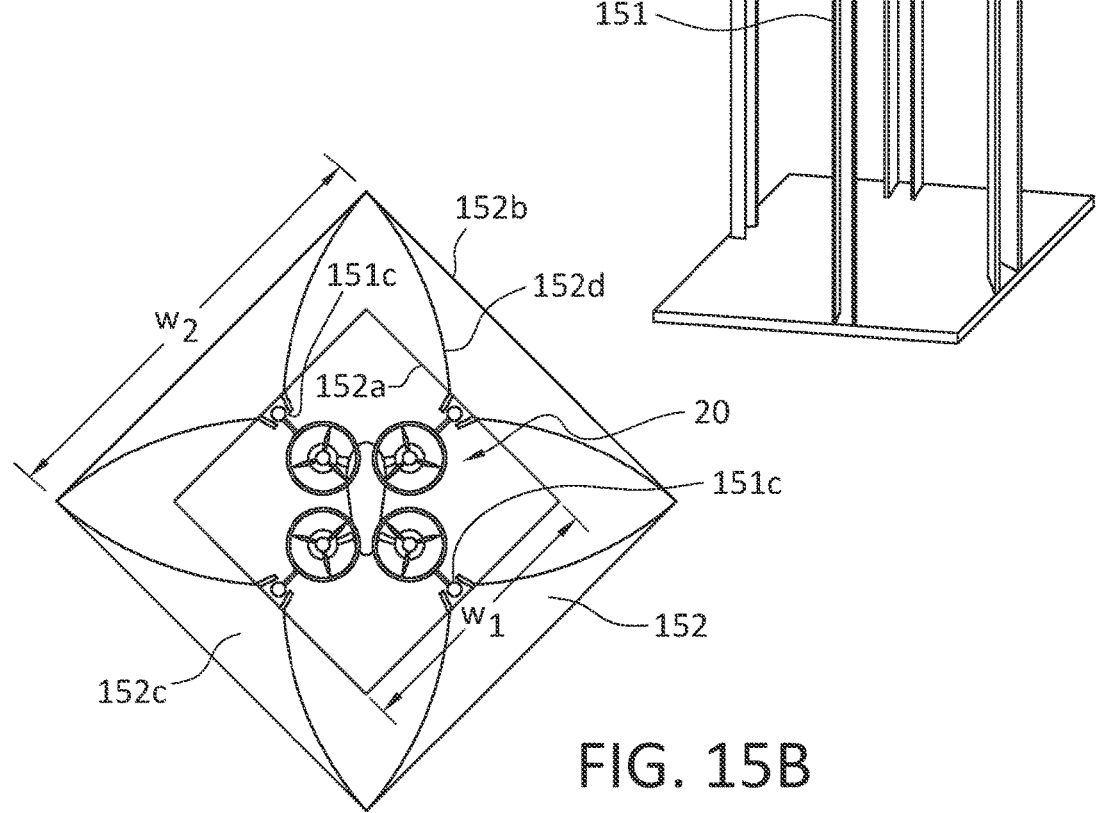
Figure 16A:
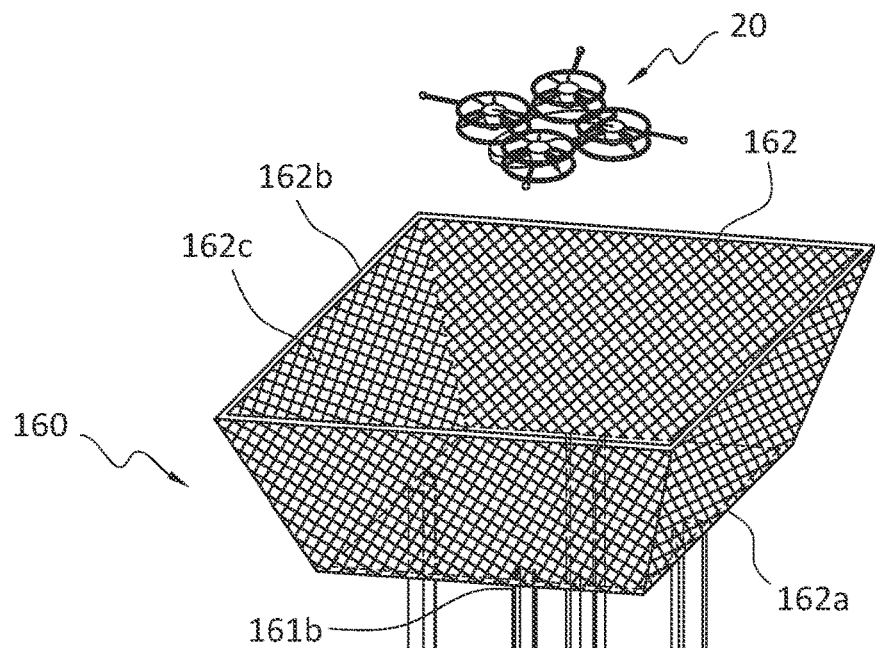
Figure 16B:
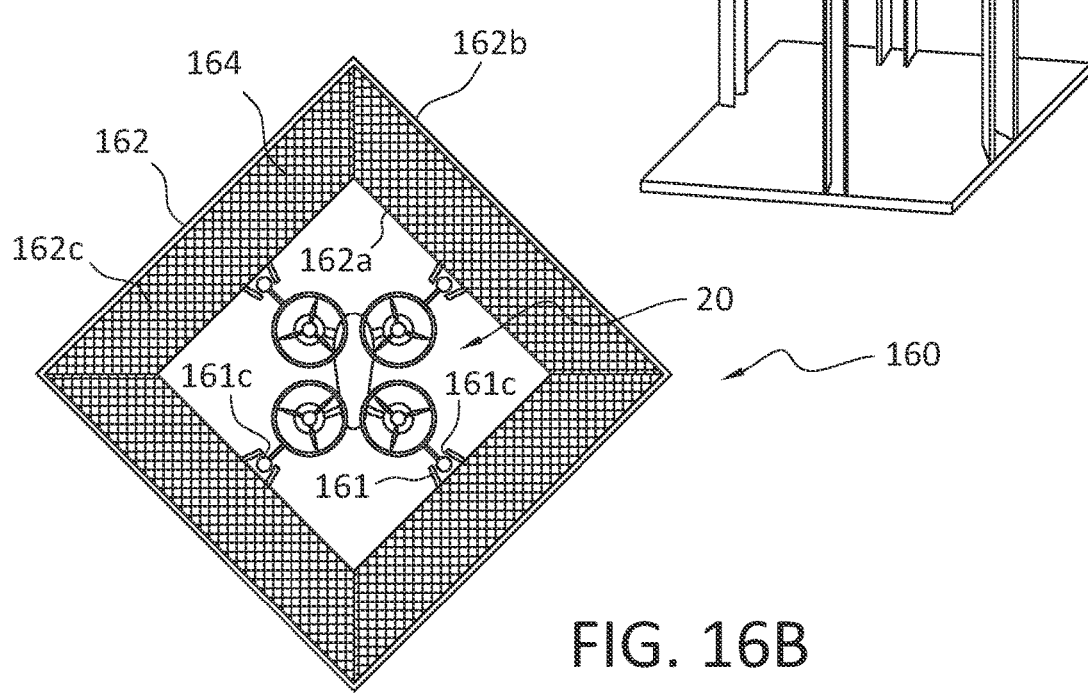
Figure 18A:
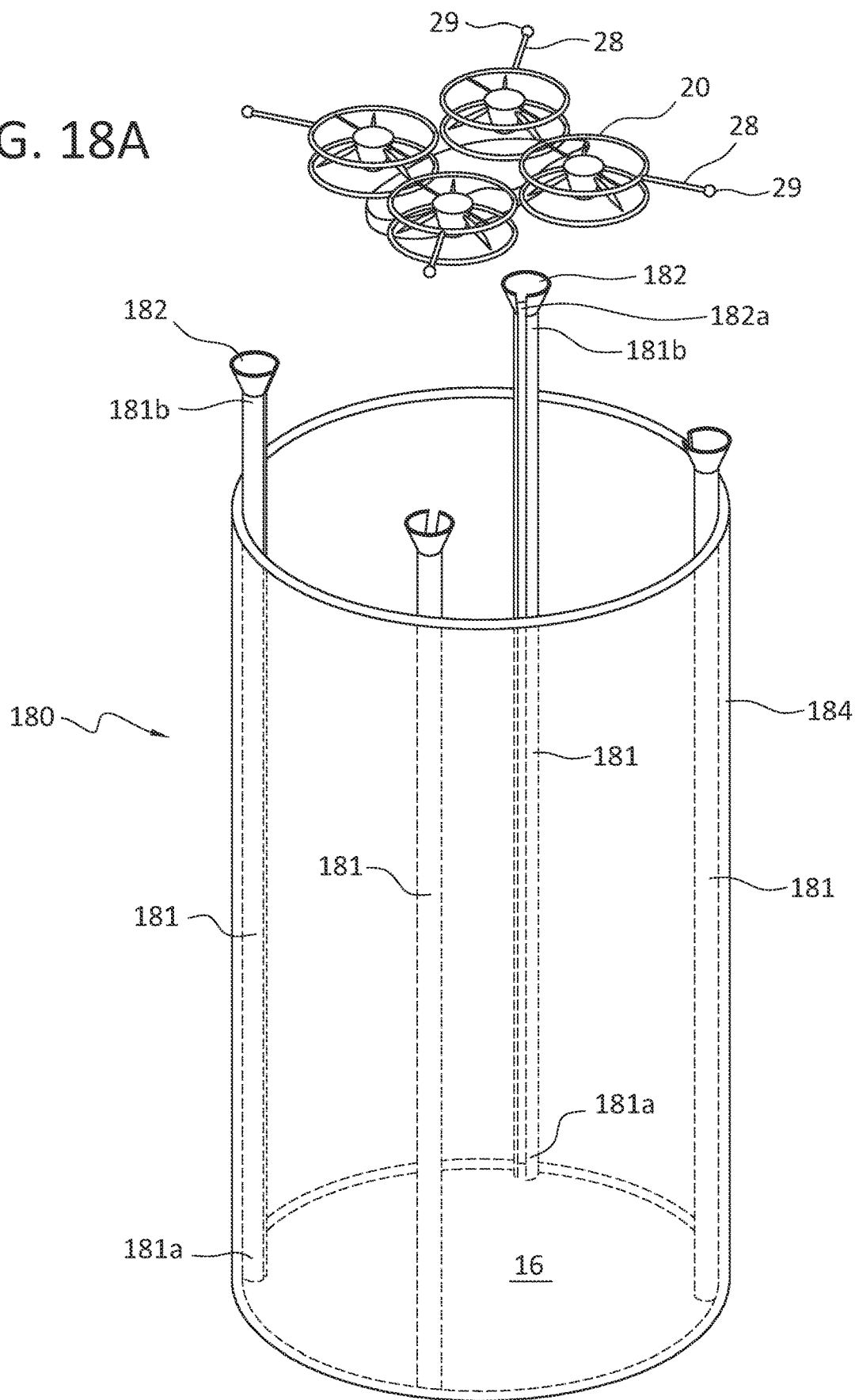
Figure 21:
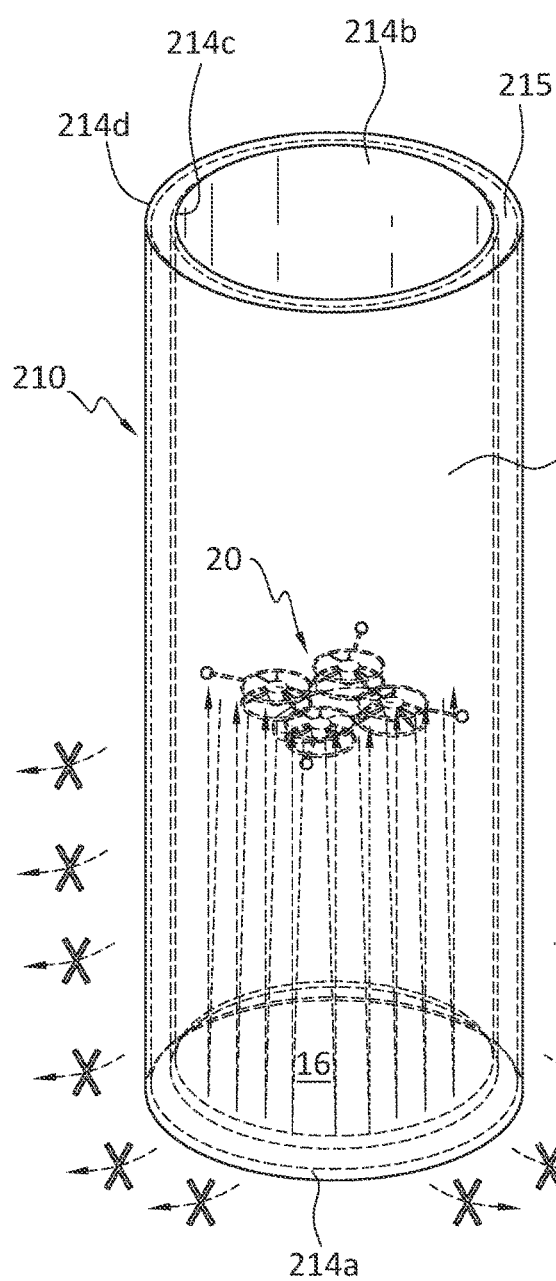
Figure 22:
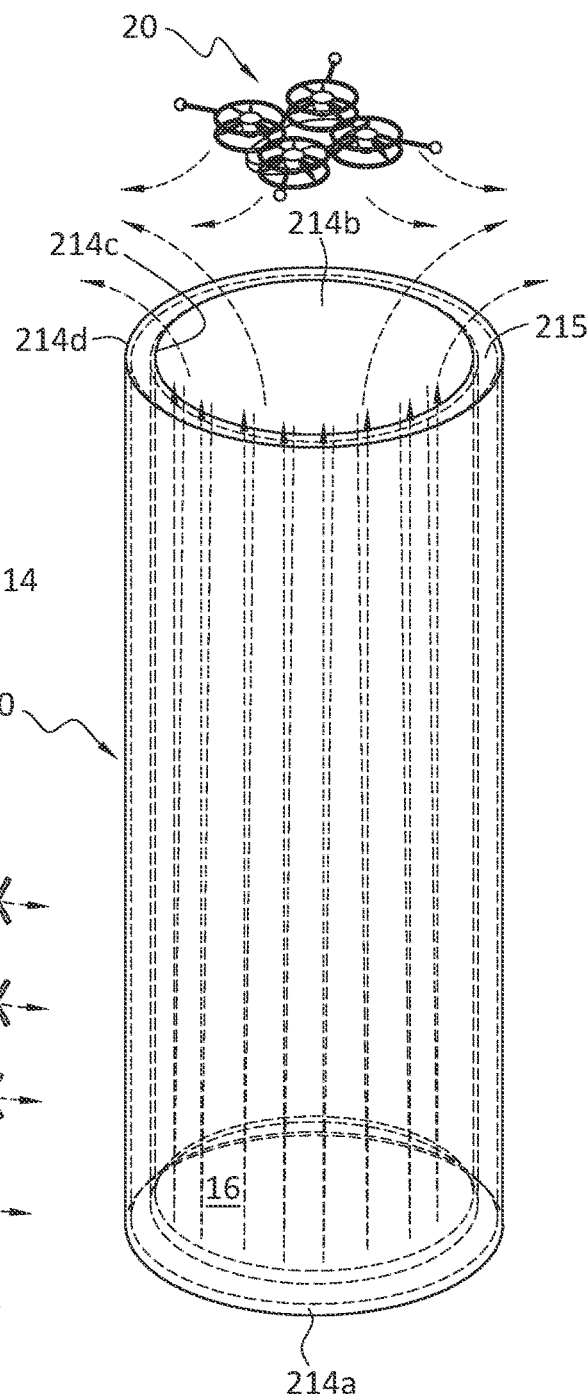
Figure 23:
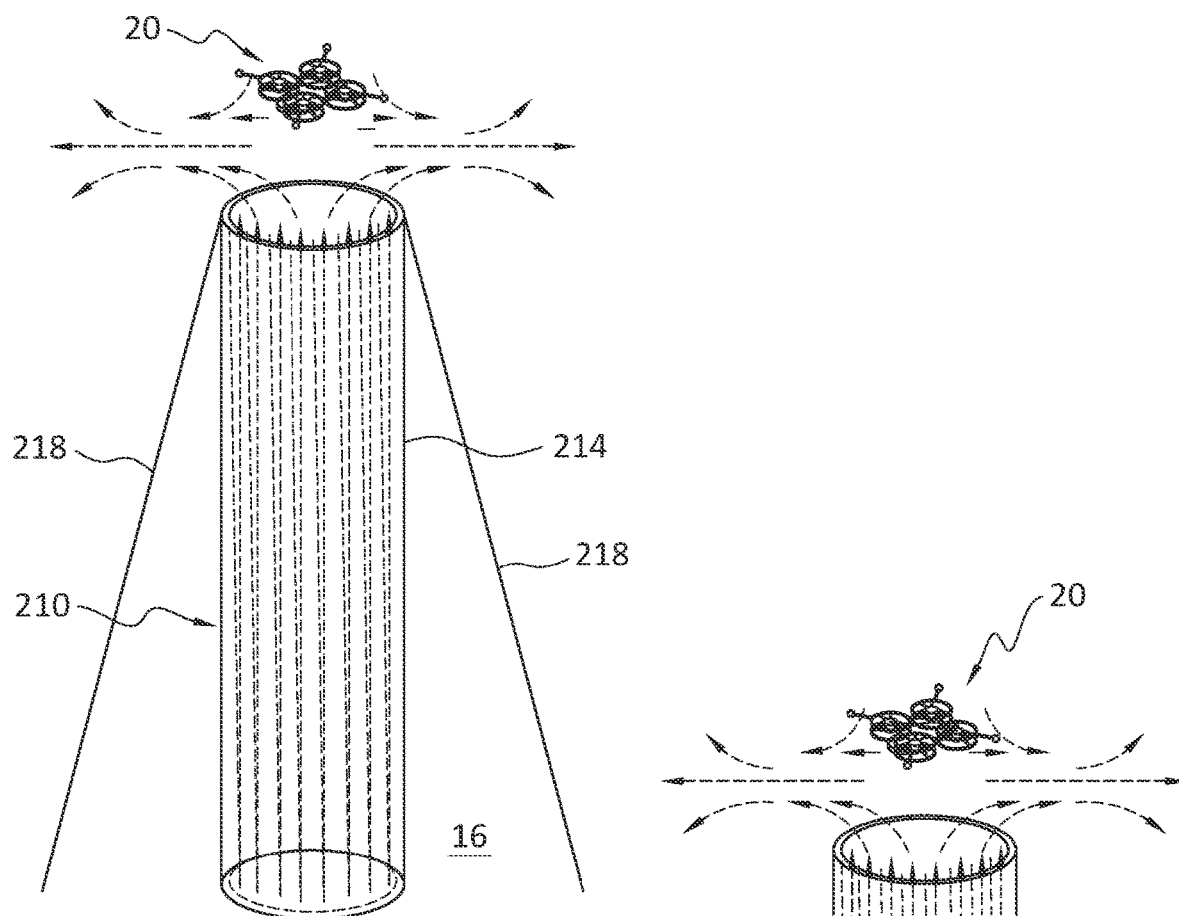
Figure 24:
Figure 25A:
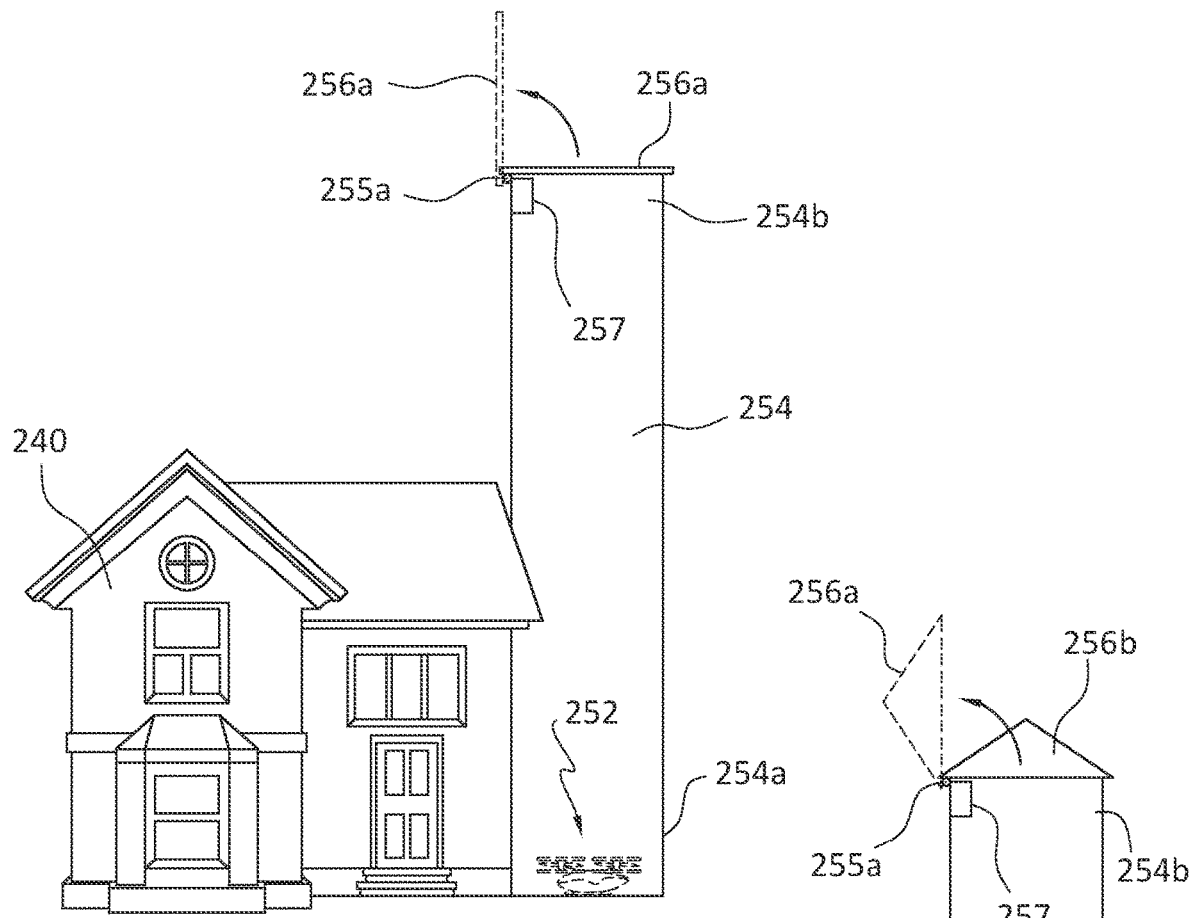
Figure 25B:
Figure 26A:
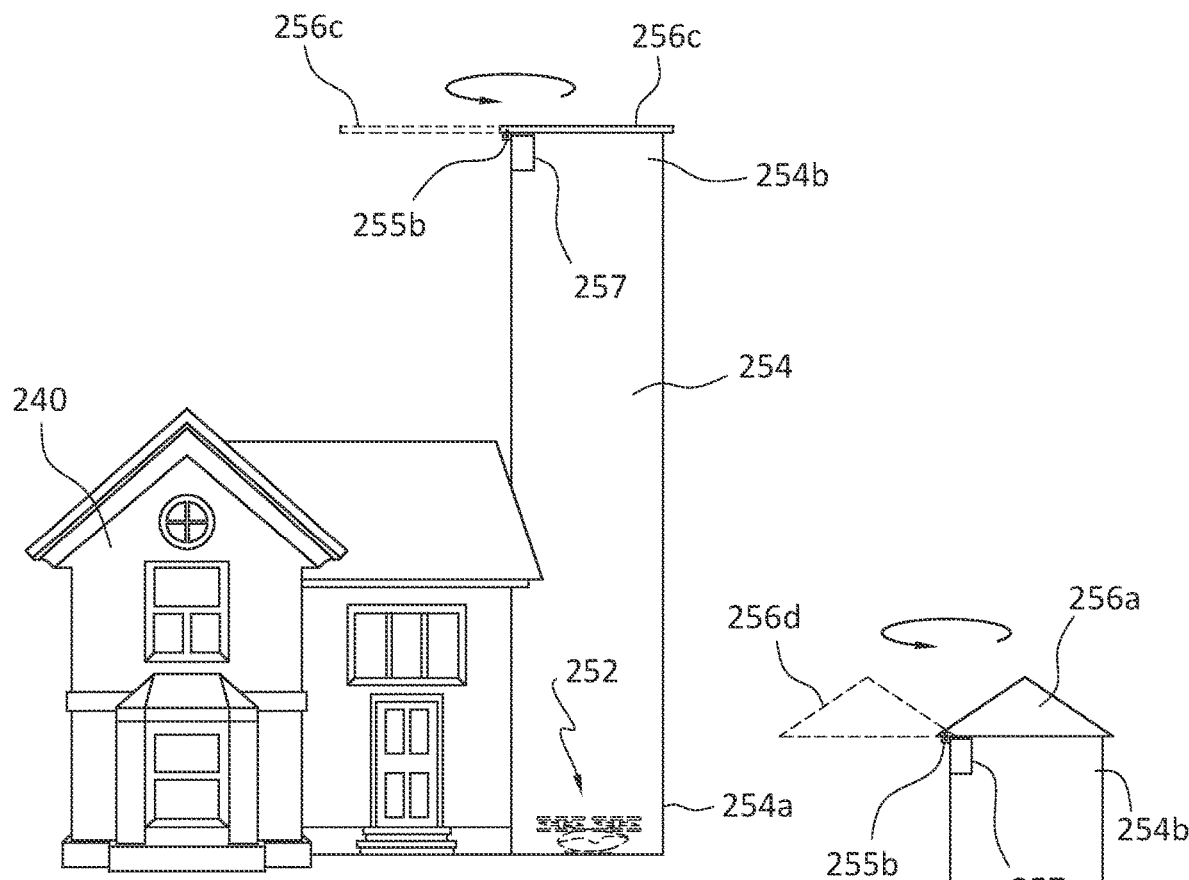
Figure 26B:
Figure 27A:
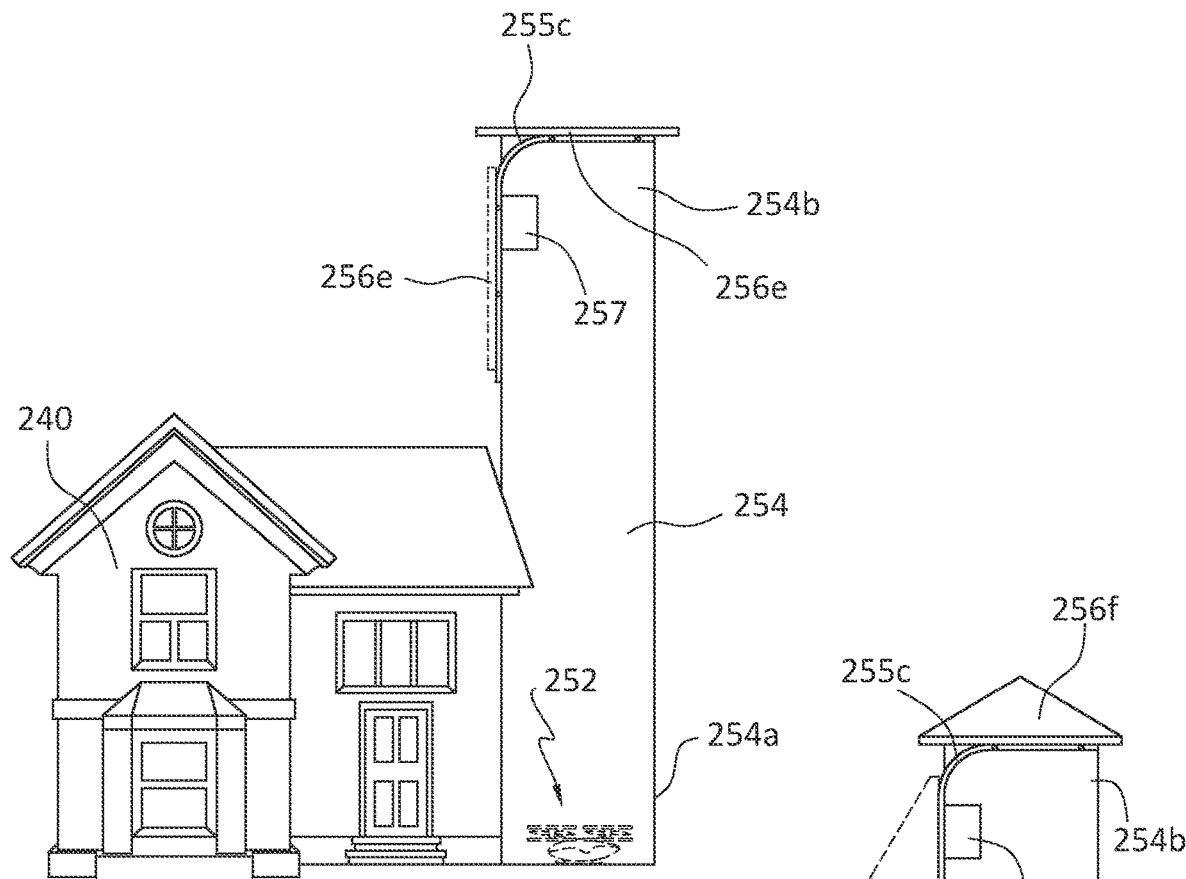
Figure 27B:
Figure 28:
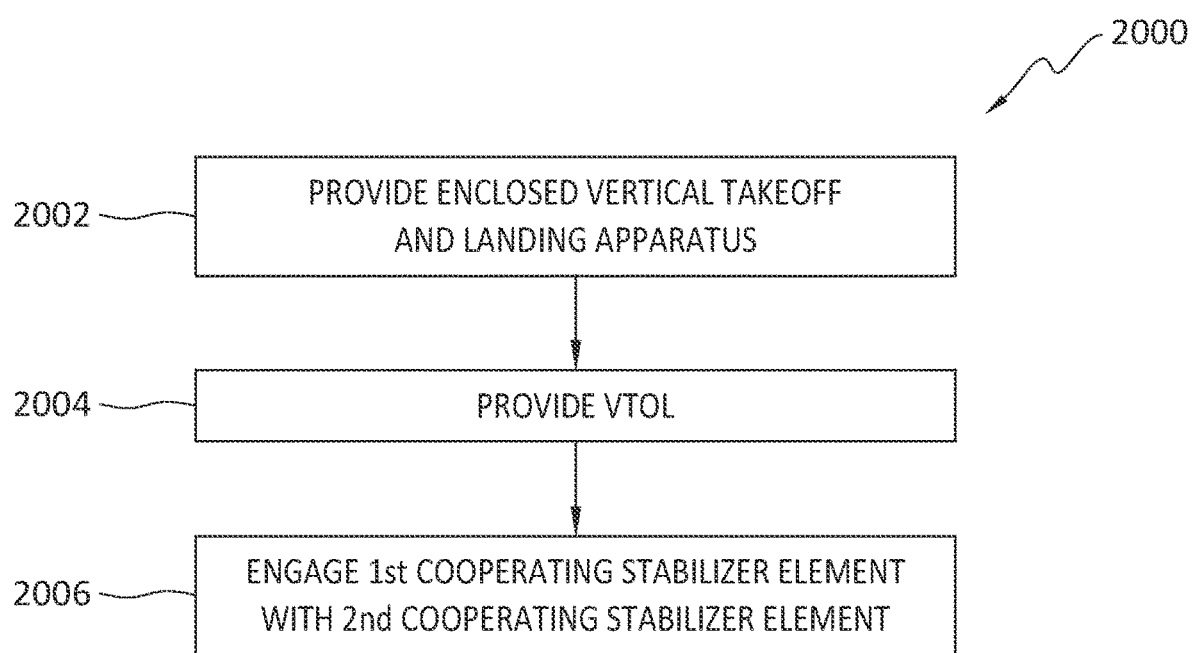
Figure 29:
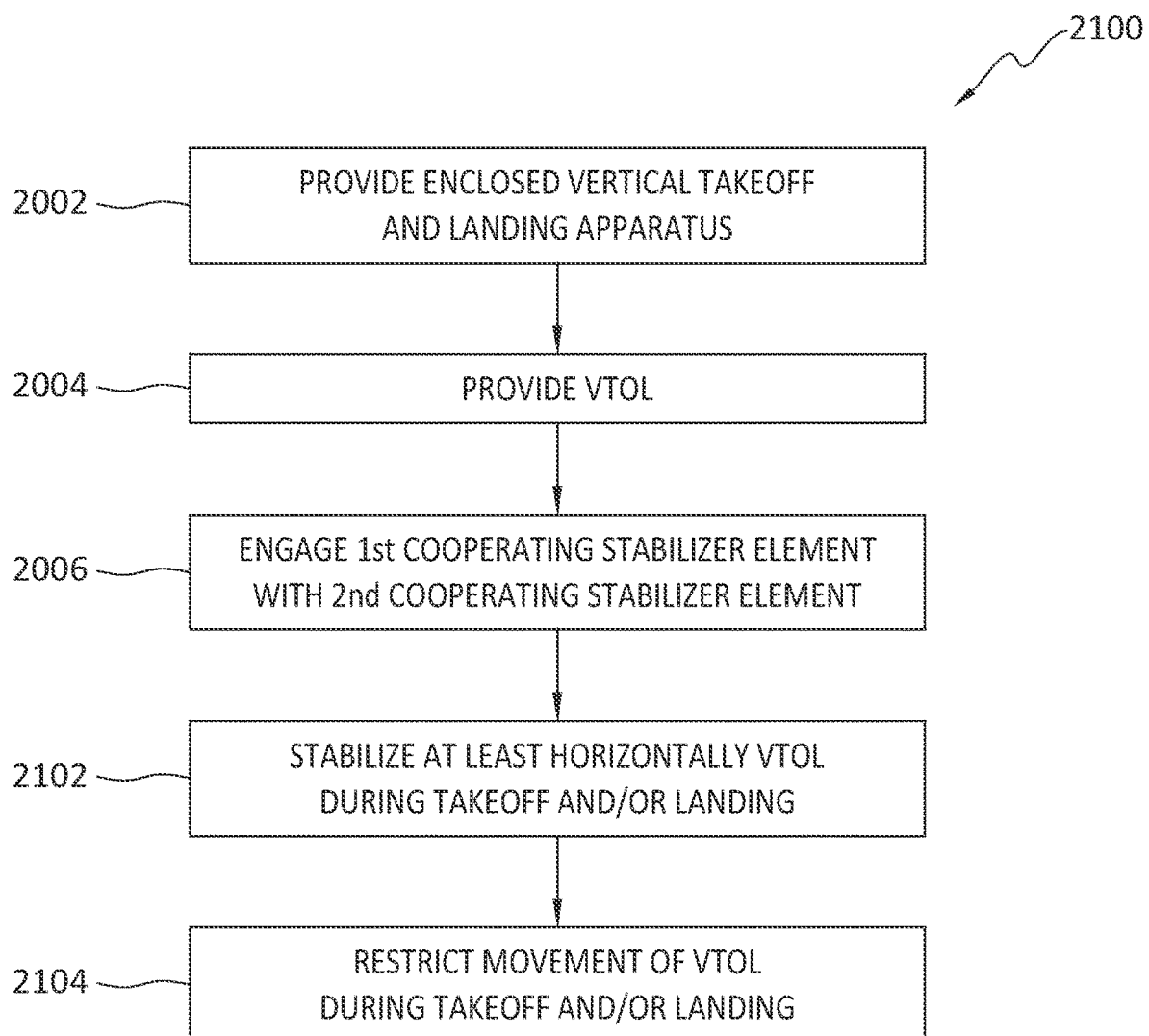
Figure 30:
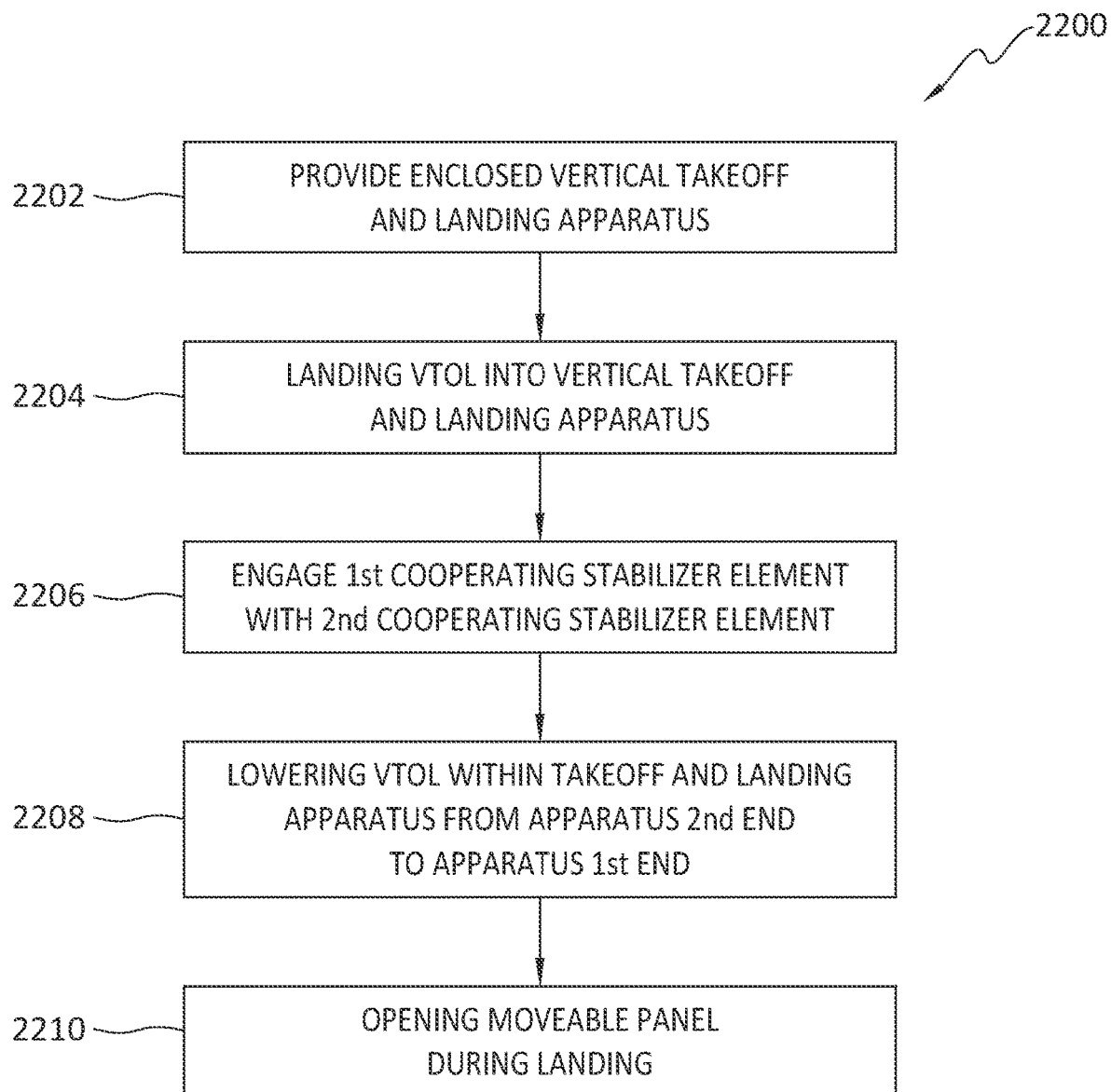
Figure 31:
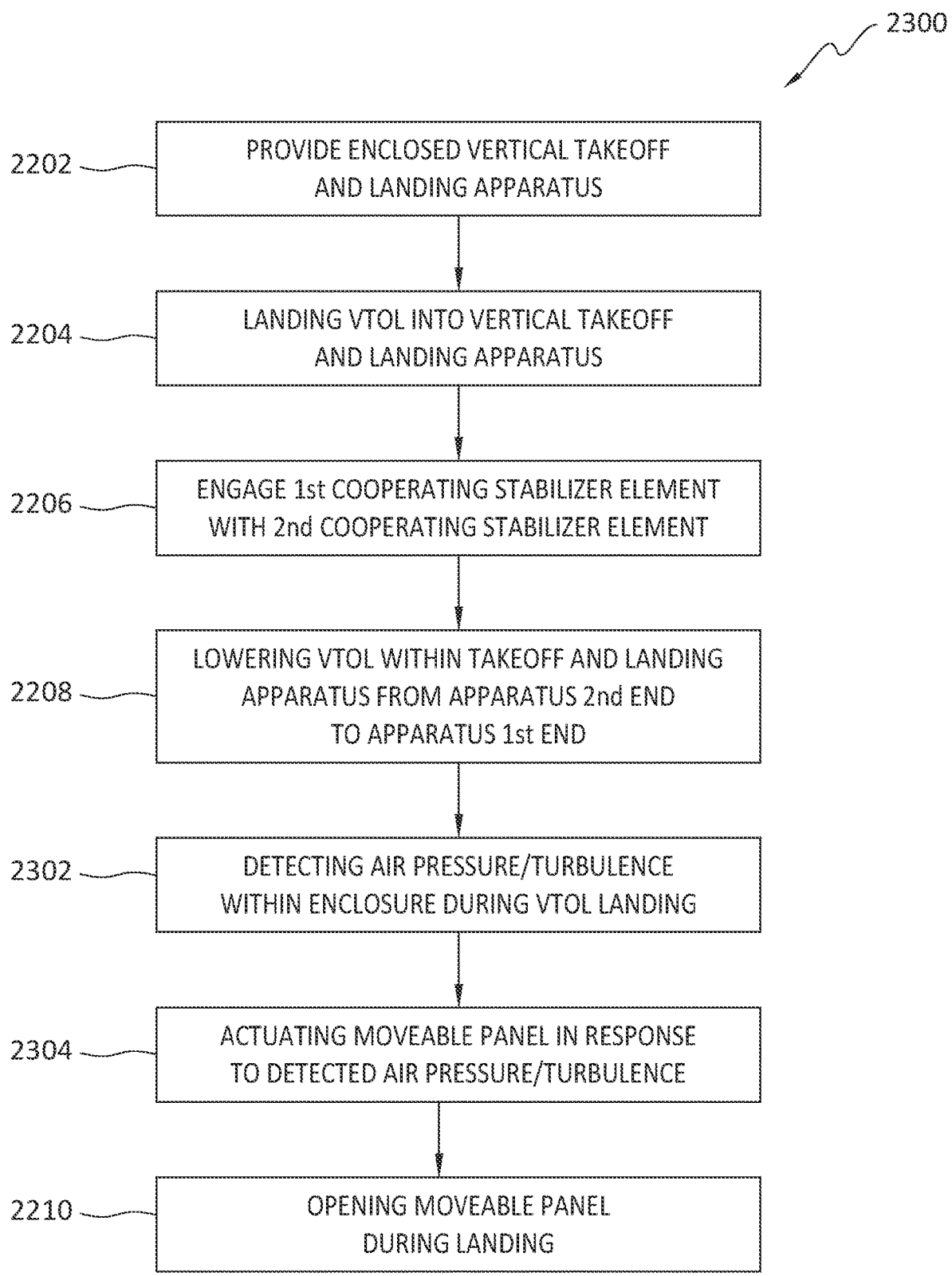
Figure 32:
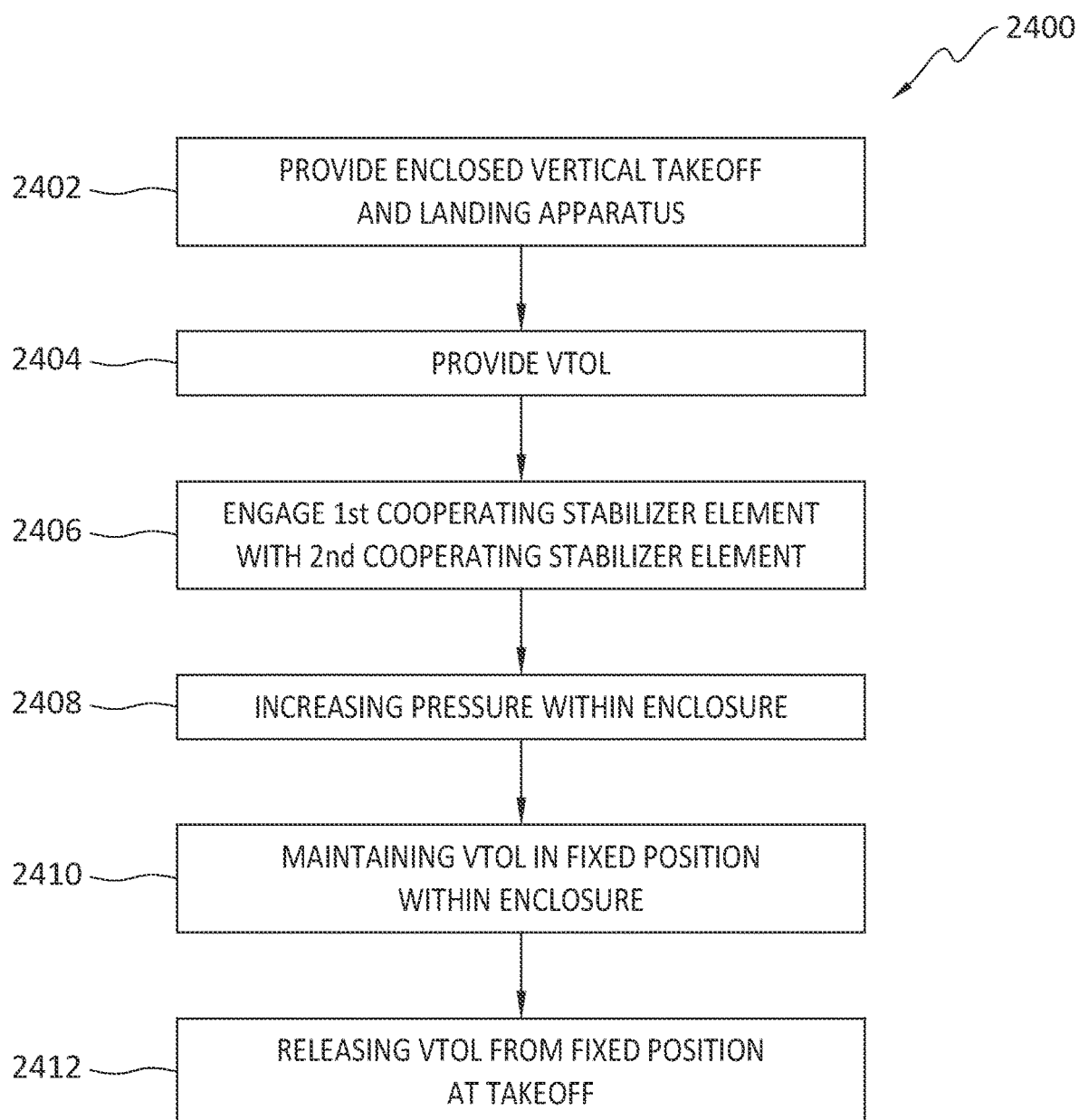

Having thus described variations of the disclosure in general terms, reference will now be made to the accompanying drawings, which are not necessarily drawn to scale, and wherein:

FIG. 1 is a perspective view of a vertical takeoff and landing vehicle (VTOL) according to present aspects;

FIG. 2 is an overhead view of a VTOL engaging a presently disclosed apparatus, according to present aspects;

FIG. 3A is an illustration of a VTOL engaging a presently disclosed apparatus, according to present aspects;

FIG. 3B is an illustration of a VTOL engaging a presently disclosed apparatus, during takeoff, with FIG. 3B further illustrating the VTOL disengaging from presently disclosed apparatus during a takeoff and according to present aspects;

FIG. 4A shows a mating arrangement of first (female) and second (male) cooperating stabilizer elements in an engaged configuration, and according to present aspects;

FIG. 4B shows a mating arrangement of further first (female) and second (male) cooperating stabilizer elements in an engaged configuration, and according to present aspects;

FIG. 4C shows a mating arrangement of further first (female) and second (male) cooperating stabilizer elements in an engaged configuration, and according to present aspects;

FIG. 4D shows a mating arrangement of further first (female) and second (male) cooperating stabilizer elements in an engaged configuration, and according to present aspects;

FIG. 4E shows a mating arrangement of further first (female) and second (male) cooperating stabilizer elements in an engaged configuration, and according to present aspects;

FIG. 4F shows a mating arrangement of further first (female) and second (male) cooperating stabilizer elements in an engaged configuration, and according to present aspects;

FIG. 5A shows a perspective view that can be a side view or an overhead view of a standoff comprising a male cooperating stabilizer element according to present aspects;

FIG. 5B shows a perspective view that can be a side view or an overhead view of a standoff comprising a male cooperating stabilizer element according to present aspects;

FIG. 5C shows a perspective view that can be a side view or an overhead view of a standoff comprising a male cooperating stabilizer element according to present aspects;

FIG. 5D shows a perspective view that can be a side view or an overhead view of a standoff comprising a male cooperating stabilizer element according to present aspects;

FIG. 5E shows a perspective view that can be a side view or an overhead view of a standoff comprising a male cooperating stabilizer element according to present aspects;

FIG. 5F shows a perspective view that can be a side view or an overhead view of a standoff comprising a male cooperating stabilizer element according to present aspects;

FIG. 6A shows a mating arrangement of first (male) and second (female) cooperating stabilizer elements in an engaged configuration, and according to present aspects;

FIG. 6B shows a mating arrangement of further first (male) and second (female) cooperating stabilizer elements in an engaged configuration, and according to present aspects;

FIG. 6C shows a mating arrangement of further first (male) and second (female) cooperating stabilizer elements in an engaged configuration, and according to present aspects;

FIG. 6D shows a mating arrangement of further first (male) and second (female) cooperating stabilizer elements in an engaged configuration, and according to present aspects;

FIG. 6E shows a mating arrangement of further first (male) and second (female) cooperating stabilizer elements in an engaged configuration, and according to present aspects;

FIG. 7A shows a top view of a standoff comprising a female cooperating stabilizer element according to present aspects;

FIG. 7B shows a top view of a standoff comprising a female cooperating stabilizer element according to present aspects;

FIG. 7C shows a top view of a standoff comprising a female cooperating stabilizer element according to present aspects;

FIG. 7D shows a top view of a standoff comprising a female cooperating stabilizer element according to present aspects;

FIG. 7E shows a top view of a standoff comprising a female cooperating stabilizer element according to present aspects;

FIG. 7F shows a top view of a standoff comprising a female cooperating stabilizer element according to present aspects;

FIG. 8A shows a top view of a standoff comprising a female cooperating stabilizer element according to present aspects;

FIG. 8B shows a top view of a standoff comprising a female cooperating stabilizer element according to present aspects;

FIG. 8C shows a top view of a standoff comprising a female cooperating stabilizer element according to present aspects;

FIG. 9A shows a landing VTOL approaching a presently disclosed apparatus according to present aspects;

FIG. 9B shows a landing VTOL engaging a presently disclosed apparatus according to present aspects;

FIG. 9C shows an overhead view of an apparatus shown in FIGS. 9A and 9B; according to present aspects;

FIG. 10A shows a landing VTOL approaching a presently disclosed apparatus according to present aspects;

FIG. 10B shows a landing VTOL engaging a presently disclosed apparatus according to present aspects;

FIG. 10C shows an overhead view of an apparatus shown in FIGS. 10A and 10B, according to present aspects;

FIG. 11A shows an apparatus according to present aspects;

FIG. 11B shows an overhead view of an apparatus shown in FIG. 11A, according to present aspects;

FIG. 12A shows an alternate apparatus according to present aspects;

FIG. 12B shows an overhead view of an apparatus shown in FIG. 12A, according to present aspects;

FIG. 12C shows a side view of an apparatus shown in FIG. 12A, according to present aspects;

FIG. 13 shows an apparatus according to present aspects;

FIG. 14A shows an apparatus according to present aspects;

FIG. 14B shows an overhead view of an apparatus shown in FIG. 14A, according to present aspects;

FIG. 14C shows aside view of an apparatus shown in FIGS. 14A and 14B, according to present aspects;

FIG. 15A shows an apparatus according to present aspects;

FIG. 15B shows an overhead view of an apparatus shown in FIG. 15A, according to present aspects;

FIG. 16A shows an apparatus according to present aspects;

FIG. 16B shows an overhead view of an apparatus shown in FIG. 16A, according to present aspects;

FIG. 17A shows a VTOL takeoff and landing stabilizing apparatus with guide, according to present aspects;

FIG. 17B shows a VTOL takeoff and landing stabilizing apparatus with guide, according to present aspects;

FIG. 17C shows a representative box diagram, according to present aspects;

FIG. 18A shows a VTOL takeoff and landing stabilizing apparatus with a plurality of guides, according to present aspects;

FIG. 18B shows a VTOL takeoff and landing stabilizing apparatus with guide, according to present aspects;

FIG. 18C shows an enlarged view of a slotted guide of a VTOL takeoff and landing stabilizing apparatus with guide, according to present aspects;

FIG. 19 shows a VTOL takeoff and landing stabilizing apparatus, according to present aspects;

FIG. 20 shows a VTOL takeoff and landing stabilizing apparatus, according to present aspects;

FIG. 21 shows a VTOL takeoff and landing stabilizing apparatus, according to present aspects;

FIG. 22 shows a VTOL takeoff and landing stabilizing apparatus, according to present aspects;

FIG. 23 shows a VTOL takeoff and landing stabilizing apparatus, according to present aspects;

FIG. 24 shows a VTOL takeoff and landing stabilizing apparatus proximate to a dwelling, according to present aspects;

FIG. 25A shows a VTOL takeoff and landing stabilizing apparatus proximate to a dwelling, according to present aspects;

FIG. 25B shows a VTOL takeoff and landing stabilizing apparatus proximate to a dwelling, according to present aspects;

FIG. 26A shows a VTOL takeoff and landing stabilizing apparatus proximate to a dwelling, according to present aspects;

FIG. 26B shows a VTOL takeoff and landing stabilizing apparatus proximate to a dwelling, according to present aspects;

FIG. 27A shows a VTOL takeoff and landing stabilizing apparatus proximate to a dwelling, according to present aspects;

FIG. 27B shows a VTOL takeoff and landing stabilizing apparatus proximate to a dwelling, according to present aspects;

FIG. 28 is a flowchart outlining a present method, according to present aspects;

FIG. 29 is a flowchart outlining a present method, according to present aspects;

FIG. 30 is a flowchart outlining a present method, according to present aspects;

FIG. 31 is a flowchart outlining a present method, according to present aspects; and FIG. 32 is a flowchart outlining a present method, according to present aspects.

DETAILED DESCRIPTION

Present aspects overcome significant drawbacks confronting the use of vertical takeoff and landing vehicles (VTOLs) for the point-to-point delivery and transport of payloads (e.g., packages, equipment, etc.) and personnel, including significant issues that occur during the takeoff and landing of VTOLs such as, for example, noise, excessive turbulence caused by rotor generated ground effect air pressure, vehicle instability, safety concerns, ground structure damage, VTOL damage, etc.

For example, when typical VTOLs land and takeoff, directional airflow generated by a VTOL during takeoff and landing can generate air turbulence including air turbulence referred to as "ground effect" that can de-stabilize and otherwise interfere with, and otherwise increase the difficulty of a VTOL's takeoff and landing protocol. For example, as a VTOL is engaged in a landing (e.g., a descent from an airborne position to the ground or other solid structure, landing pad, etc., that may be located above or below ground level), airflow pressure can be generated by the operating rotors in a directional airflow from rotors that can be initially "downward" from the VTOL, and then "outward" and away from the VTOL. At distances above ground level, the airflow from the rotors dissipates, at least to an extent, with minimal or no deflected return airflow from the rotors directed back toward, or otherwise impacting the VTOL.

As the VTOL continues a descent and approaches the ground, the initial airflow pressure generated from the rotors impacts the ground and is deflected back as deflected airflow pressure in, at least an upward direction from the ground back to the VTOL. In a typical VTOL landing the airflow directional deflections progressively increase as the VTOL nears a landing location (e.g., ground, landing pad, etc.). The maximum airflow directional deflection can typically occur at the point in time that the VTOL "lands" and the VTOL impacts a landing location, and the airflow directional deflections can destabilize the VTOL, cause vibrations, buffeting, turbulence, etc. That is, air turbulence increases as directional airflow not only deflects from the ground vertically back to the VTOL (e.g., in an upward direction), but directional airflow also is deflected in non-vertical directions that can interrupt or "cut through" the downward airflow from the rotors, and that can contribute to VTOL instability and otherwise contribute to an increasing lateral force and an increasing vertical force (e.g., an increase in forces associated with and forces that can otherwise contribute to, for example, pitch, roll, and yaw, etc.) on the VTOL during landing (and takeoff). Such forces can frustrate and otherwise render an unpredictable and turbulent VTOL landing, rather than a desired smooth and turbulence-free VTOL landing devoid of such omnipresent variable and potentially destabilizing vertical and lateral forces imposed on the VTOL. The combined effects of airflow deflection caused by rotor generated airflow impacting and being deflected from a landing surface (e.g., ground, landing pad, etc.) and the resulting air turbulence and force converted from a downward direction to a lateral direction is collectively referred to herein as "ground effect".

Such undesirable forces impacting on a VTOL, for example, during VTOL takeoff and/or landing, can hinder the takeoff and/or landing and imperil ground structures, damage the VTOL, injure ground personnel, etc., as airflow directional deflections reach a maximum effect and that can further destabilize the VTOL, causing vibrations, buffeting, turbulence, etc.

According to present aspects, the actuated rotational vehicle fixtures that provide the mechanical forces necessary for vertical lift of the VTOLs, can be vertical propulsion units including, for example, jets, propellers, and rotors, with the vertical propulsion units equivalently and interchangeably referred to herein as "rotors". That is, the term "rotors" as used herein includes propellers, vertical propulsion units, jets, and rotors.

According to present aspects, apparatuses, systems, and methods significantly ameliorate or substantially eliminate the existing issues attending VTOLs, including during VTOL takeoff and landing. FIG. 1 shows a VTOL 20 according to present aspects including a vehicle body 22, a battery 21 (that can be a rechargeable battery), with at least one rotor assembly 23 (shown in FIG. 1 as four rotor assemblies) in communication with the vehicle body 22. The rotor assembly 23 comprises a rotor 24 with a rotor guard 26 oriented circumferentially to protect the rotor, with the rotor guard having a radius exceeding the length of the rotor such that the rotor, in operation, does not impact the rotor guard. When a VTOL employs a propeller, the rotor guard can be termed a propeller guard, and the diameter of the circumferential propeller guard exceeds the length of the propeller. FIG. 1 further shows a VTOL standoff 28 having a standoff first end 28a attached to or integral with and outwardly extending from a rotor guard 26. Each VTOL standoff 28 further comprises a standoff second end 28b terminating in a second cooperating stabilizer element 29.

Second cooperating stabilizer element 29 of VTOL standoff 28 is configured to attach to a first cooperating stabilizer element 34 of a vertically-oriented support element 32 in an apparatus 30, as shown in FIG. 2. According to further present aspects, the term "vertically-oriented support element" is defined as a support element comprising an angle measured at the vertically-oriented support element first end with respect to a plane established by a substantially horizontal base or with respect to a plane established substantially perpendicular to the vertically-oriented support element first end, and with the angle ranging from about 100 to about 90°, preferably with the angle ranging from about 30° to about 90°, and more preferably with the angle ranging from about 700 to about 90°.

FIG. 2 shows an overhead view (e.g., a "top" view) of the VTOL 20 shown in FIG. 1 in a process that includes landing and coming into contact with apparatus 30 such that the second cooperating stabilizer element 29 of each standoff 28 extending from VTOL 20 has engaged first cooperating stabilizer element 34 (shown as a "slot") of each of the four vertically-oriented support elements 32 of apparatus 30. As shown in FIG. 2, the second cooperating stabilizer element 29 of the standoff 28 of the VTOL 20 is shown as a "male" fixture that engages or is inserted into the "female" or receiving first cooperating stabilizer element 34 of the vertically-oriented support element 32. The remainder of the elements of the VTOL 20 shown in FIG. 2 are numbered in similar fashion to that as provided in FIG. 1.

According to present aspects, a VTOL can include standoffs 28 that incorporate a second incorporating element 29 that can be a male fixture configured to engage and become inserted into a second cooperating feature on a vertically-oriented support element that can include, or itself be, a female fixture (that can be configured and dimensioned to engage with the male fixture of the first cooperating stabilizer element 29 of the standoff 28 located on the VTOL). One arrangement of this type is illustrated in FIGS. 1 and 2.

In further present aspects, for example, as shown in FIGS. 3A and 3B, a VTOL can include standoffs 28 that incorporate a second cooperating element 49 that can be a female fixture configured to receive and become engaged with a first cooperating feature on a vertically-oriented support element 42 that can include a male fixture, or that can, itself be a male fixture (e.g., that can be configured and dimensioned to engage with the female fixture of the second cooperating stabilizer element 49 of the standoff 28 located on the VTOL).

FIG. 3A shows a simplified apparatus 41a, according to present aspects, for facilitating takeoff (e.g., launching) and landing a VTOL 40, with the VTOL 40 including a vehicle body 22 with at least one of rotor assemblies 23 (shown in FIG. 3A as four rotor assemblies) in communication with the vehicle body 22. Aside from the difference in the second cooperating stabilizer element located at the second end of the standoffs, the VTOL 40 shown in FIGS. 3A and 3B incorporates the enumerated parts shown for VTOL 20 in FIGS. 1 and 2. As shown in FIGS. 1 and 2, VTOL standoff 28 includes a standoff first end 28a attached to or integral with and outwardly extending from each rotor guard 26. Each VTOL standoff 28 further comprises a standoff second end 28b terminating in a second cooperating stabilizer element 29.

As shown in FIGS. 3A and 3B second cooperating stabilizer element 49 of VTOL standoff 28 is configured to attach to a vertically-oriented support element 42 in an apparatus 41a, as shown in FIG. 3A, with the vertically-oriented support element 42 having a vertically-oriented support element first end 42a, and a vertically-oriented support element second end 42b. Vertically-oriented support element 42 appears in FIG. 3A as a single element that can be, for example, a pole anchored to or otherwise in communication with a base (not shown) that can be, for example, the ground or a fixture in contact with the ground 16 at, or proximate to, ground level.

The term vertically-oriented support element does not necessarily dictate that the pole is purely vertical. In some aspects, the pole or vertically-oriented support element is at least a 45 degree angle from the base or ground where the VTOL could land or take off at an angle. In some aspects, the pole or vertically-oriented support element is almost horizontal (e.g., about 1 degree from horizontal) and emanates from the side of a building, where the VTOL could land or take off sideways from the building. In some aspects, the vertically-oriented support element is curved or in other ways non-linear. Accordingly, the term "vertically-oriented support element" should be construed to comprise a pole or extension to which the VTOL can attach or detach from almost any angle.

FIG. 3B shows an apparatus 41b, according to present aspects, for facilitating takeoff (e.g., launching) and landing a VTOL 40, with the VTOL 40 including a vehicle body 22 with a plurality of rotor assemblies 23 (shown in FIG. 3A as four rotor assemblies) in communication with the vehicle body 22. One of the two second cooperating stabilizer elements 49 of one of the two standoffs 28 are configured to attach to a vertically-oriented support element 42 in an apparatus 41b, as shown in FIG. 3B, with the vertically-oriented support element having a vertically-oriented support element first end 42a, and a vertically-oriented support element second end 42b. Vertically-oriented support elements 42 appears in FIG. 3B as two elements that can be, for example, two poles anchored to or otherwise in communication with a base (not shown) that can be, for example, the ground or a fixture in contact with the ground 16 at, or proximate to, e.g., ground level.

As exemplified in FIG. 3A and/or FIG. 3B, during a VTOL landing procedure, as a VTOL 40 approaches apparatus 41a, 41b the second cooperating stabilizer element 49 of the VTOL standoff 28 engages the top of the vertically-oriented support element 42 of, for example, apparatus 41a, 41b. The VTOL can then descend, and while ground effect is experienced during the descent of the VTOL to ground level, the turbulent energy 43 from the ground effect (represented by the arrows in FIGS. 3A and 3B) is transferred from the VTOL to the vertically-oriented support element such that the VTOL descent is significantly stabilized as the ground effect on the VTOL is significantly minimized or eliminated. Although not shown in FIGS. 3A, 3B, the vertically-oriented support elements 42 of apparatus 41a, 41b can be anchored into the ground 16, or can be attached or otherwise in fixed communication with a base that is in communication with the ground, or a structure that can be, for example, proximate to the ground.

Note that the term "vertically-oriented support element" does not necessarily dictate that the poles or vertically-oriented support elements are purely vertical. In some aspects the poles or vertically-oriented support elements are at least a 45 degree angle from the base or ground wherein the VTOL could land into them or take off from them at an angle. In some aspects the poles or vertically-oriented support elements are almost horizontal (e.g., about 1 degree from horizontal) and emanate from the side of a building, where the VTOL could land or take off sideways or nearly horizontally from the building. In some aspects, the vertically-oriented support elements are curved or in other ways non-straight, although they would generally be in parallel. Accordingly, the term "vertically-oriented support element" should be construed to comprise poles or extensions, or members to which the VTOL can attach or detach from almost any angle to support and/or stabilize the VTOL.

According to present aspects, the standoffs integral with or attached to the VTOLs can comprise the "male" or "female" second cooperating stabilizer element at the terminus of the second end of the standoff, with the selection made according to the selected features incorporated into, attached to or integral with the vertically-oriented support element of the present apparatuses. That is, the first cooperating stabilizer element on the vertically-oriented support element and the second cooperating stabilizer element of the VTOL standoff are selected to "mate" or interlock FIGS. 4A-4F are representative and enlarged overhead or "top" views of assemblies 50a, 50b, 50c, 50d, 50e, and 50f of engaged first and second cooperating stabilizer elements, with the varying first cooperating stabilizer elements 52*a*, 52,*b*, 52*c*, 52*d*, 52*e*, 52*f* (shown in FIGS. 4A, 4B, 4C, 4D, 4E, 4F respectively) integral with or attached to, or otherwise in communication with, the vertically-oriented support element 54*a*, 54*b*, 54*c*, 54*d*, 54*e*, 54*f* of a VTOL takeoff and landing stabilizing apparatus and shown as being a type of "female" fixture. FIGS. 4A-4F further show an engaged second cooperating stabilizer element of VTOL standoff 28 in communication with or integral with a second cooperating stabilizer element 29 shown as a "male" fixture dimensioned to engage the "female" first cooperating stabilizer element 52*a*, 52,*b*, 52*c*, 52*d*, 52*e*, 52*f* of the associated and corresponding vertically-oriented support element 54*a*, 54*b*, 54*c*, 54*d*, 54*e*, 54*f*. The geometries shown of the fixtures and elements in FIGS. 4A-4F are representative and are non-exhaustive, with additional geometries (including, e.g., cross-sectional geometries, mating geometries, etc.) for the vertically-oriented support element and the first and second cooperating features contemplated by the present aspects.

More specifically, FIG. 4A shows an assembly 50*a* with the VTOL standoff 28 in communication with or integral with a second cooperating stabilizer element 29 shown as a "male" fixture dimensioned to engage the "female" first cooperating stabilizer element 52*a* of the associated vertically-oriented support element 54*a*. FIG. 4B shows an assembly 50*b* with the VTOL standoff 28 in communication with or integral with a second cooperating stabilizer element 29 shown as a "male" fixture dimensioned to engage the "female" first cooperating stabilizer element 52*b* of the associated vertically-oriented support element 54*b*. FIG. 4C shows an assembly 50*c* with the VTOL standoff 28 in communication with or integral with a second cooperating stabilizer element 29 shown as a "male" fixture dimensioned to engage the "female" first cooperating stabilizer element 52*c* of the associated vertically-oriented support element 54*c*, with a spring element 53 positioned between and in communication with the "female" first cooperating stabilizer element 52*c* and the associated vertically-oriented support element 54*c*. The spring element 53 represents an element able to flex, absorb and/or dissipate vibrational or other forces that can attend ground effect turbulence, etc. The spring element can be, for example, an internal compression spring, a shock absorber, a telescoping extender, etc., and combinations thereof.

FIG. 4D shows an assembly 50*d* with the VTOL standoff 28 in communication with or integral with a second cooperating stabilizer element 29 shown as a "male" fixture dimensioned to engage the "female" first cooperating stabilizer element 52*d* of the associated vertically-oriented support element 54*d*, with the vertically-oriented support element 54*d* shown as comprising "I" beam configuration. FIG. 4E shows an assembly 50*e* with the VTOL standoff 28 in communication with or integral with a second cooperating stabilizer element 29 shown as a "male" fixture dimensioned to engage the "female" first cooperating stabilizer element 52*e* of the associated vertically-oriented support element 54*e*. FIG. 4F shows an assembly 50*f* with the VTOL standoff 28 in communication with or integral with a second cooperating stabilizer element 29 shown as a "male" fixture dimensioned to engage the "female" first cooperating stabilizer element 52*f* of the associated vertically-oriented support element 54*f*. The terms "standoff" and "standoff element" are used equivalently and interchangeably herein. Further the terms "standoff first end" and "standoff element first end" are used equivalently and interchangeably herein. In addition, the terms "standoff second end" and "standoff element second end" are used equivalently and interchangeably herein. When the standoff element protrudes from or is otherwise associated as part of a VTOL structure, the standoff element can be equivalently referred to as a "vehicle standoff element", "vehicle standoff", or "VTOL standoff".

As shown in FIGS. 4A-4F, the second cooperating stabilizer element 29 can extend longitudinally along the length of the associated vertically-oriented support element 54*a*, 54*b*, 54*c*, 54*d*, 54*e*, 54*f*. Upon engagement of the second cooperating stabilizer element 29 with the first cooperating stabilizer element 52*a*, 52*b*, 52*c*, 52*d*, 52*e*, 52*f*, that is in communication with or integral with the vertically-oriented support element 54*a*, 54*b*, 54*c*, 54*d*, 54*e*, 54*f*, as the VTOL continues a descent in a landing operating, the slot-like function of the first cooperating stabilizer element 52*a*, 52*b*, 52*c*, 52*d*, 52*e*, 52*f* can serve to act as a guide to assist the downward process during landing of the VTOL along the length of the vertically-oriented support element 54*a*, 54*b*, 54*c*, 54*d*, 54*e*, 54*f* down to the ground level. Further, FIGS. 4A, 4B, 4C, 4D, and 4F show the vertically-oriented support element 54*a*, 54*b*, 54*c*, 54*d*, 54*e*, 54*f* (e.g., pole) in direct or integral contact with the first cooperating stabilizer element 52*a*, 52*b*, 52*c*, 52*d*, 52*e*, 52*f*.

FIGS. 5A-5F are illustrations of enlarged side, top, or bottom views of standoffs that can be integrated into or can be otherwise in communication with a structure of the VTOL, and that can extend outwardly from a VTOL structure such as, for example, (and as shown in the FIGS.) a rotor guard, etc. The FIGS. are exemplary and are not exhaustive relative to the shapes and configurations of the standoffs. For example, while the standoffs shown in FIGS. 5A, 5B, 5C, 5D, 5E, and 5F are substantially linear, e.g., following a single axis along their length, the standoffs, according to present aspects, can angularly deviate from a linear orientation. Alternatively, second cooperating stabilizer element 29 can comprise a solid object of a different shape. Alternatively, second cooperating stabilizer element 29 can comprise a circular object that rotates or rolls (e.g., like a wheel, roller, or bearing) inside the female first cooperating stabilizer element of the vertically-oriented element. In addition, the second cooperating stabilizer element 29 and/or inner surfaces of the first cooperating stabilizer element 52*a*, 52*b*, 52*c*, 52*d*, 52*e*, 52*f* can comprise a low friction coefficient material or material coating, such as, for example polytetrafluoroethylene (PTFE) to facilitate relative movement of the second cooperating stabilizer element 29 along and within the length of the first cooperating stabilizer element 52*a*, 52*b*, 52*c*, 52*d*, 52*e*, 52*f*.

FIG. 5A shows standoff 58*a* comprising a standoff second end 28*b* terminating in a second cooperating stabilizer element 29 having a "male" configuration for engagement with a female first cooperating stabilizer element on a vertically-oriented element of the type shown, for example, in FIGS. 4A-4F. FIG. 5B shows standoff 58*b* comprising a standoff second end 28*b* terminating in a second cooperating stabilizer element 29 having a "male" configuration for engagement with a female first cooperating stabilizer element, with standoff 58*b* comprising a standoff second end 28*b* terminating in a second cooperating stabilizer element 29 having a "male" configuration for engagement with a female first cooperating stabilizer element, with standoff 58*b* further comprising a spring element 57 that can dissipate vibrational and other forces including for example, impact, contact, etc., that can occur during VTOL landing and takeoff, according to present aspects. By dissipating or "absorbing" forces during VTOL takeoff and landing, the addition of the spring element 57 can contribute to the performance of the present apparatuses, systems, and methods by further stabilizing a VTOL during takeoff and landing, etc.

FIG. 5C shows standoff 58c comprising a standoff second end 28b terminating in a second cooperating stabilizer element 29 having a "male" configuration for engagement with a female first cooperating stabilizer element, with standoff 58c further comprising a spring element 57 disposed within a spring housing 56.

FIG. 5D shows standoff 58d comprising a standoff second end 28b terminating in a second cooperating stabilizer element 29 having a "male" configuration for engagement with a female first cooperating stabilizer element, with standoff 58d further comprising a shock absorber 55 that can dissipate vibrational and other forces including for example, impact, contact, etc., that can occur during VTOL landing and takeoff, according to present aspects.

FIG. 5E shows standoff 58e comprising a standoff second end 28b terminating in a second cooperating stabilizer element 29 having a "male" configuration for engagement with a female first cooperating stabilizer element, with standoff 58e further comprising a telescoping section 59 that can be adjusted to alter the length of the standoff to tailor a VTOL for use with present landing and takeoff apparatuses having varying dimensions and/or varying distances between vertically-oriented support elements (e.g., to which the VTOL standoffs will engage during takeoff and landing, etc.).

FIG. 5F shows standoff 58f comprising a standoff second end 28b terminating in a second cooperating stabilizer element 29 having a "male" configuration for engagement with a female first cooperating stabilizer element, with standoff 58f further comprising a telescoping section 59 that is in communication with a telescoping section motor 59a that can be actuated (e.g., remotely, in real time, while the VTOL is in flight, etc.) to alter the length or otherwise adjust the standoff to further tailor and enhance the versatility and compatibility of a VTOL for use with present landing and takeoff apparatuses having varying dimensions and/or varying distances between vertically-oriented support elements (e.g., to which the VTOL standoffs will engage during takeoff and landing, etc.).

FIGS. 6A-6E are representative overhead enlarged views of assemblies 60a, 60b, 60c, 60d, and 60e of engaged first and second cooperating stabilizer elements, with the varying first cooperating stabilizer elements 62a, 62,b, 62c, 62d, 62e (shown in FIGS. 6A, 6B, 6C, 6D, 6E, respectively) integral with or attached to, or otherwise in communication with, the vertically-oriented support element 64a, 64b, 64c, 64d, 64e of a VTOL takeoff and landing stabilizing apparatus. The first cooperating stabilizer elements 62a, 62,b, 62c, 62d, 62e are shown as being a type of "male" fixture. FIGS. 6A-6F further show an engaged second cooperating stabilizer element of VTOL standoff 28 in communication with or integral with a second cooperating stabilizer element 69 shown as a "female" fixture dimensioned to engage the "male" first cooperating stabilizer element 62a, 62,b, 62c, 62d, 62e of the associated and corresponding vertically-oriented support element 64a, 64b, 64c, 64d, 64e, 64f. The geometries shown of the fixtures and elements in FIGS. 6A-6F are representative and are non-exhaustive, with additional geometries (including, e.g., cross-sectional geometries, mating geometries, etc.) for the vertically-oriented support element and the first and second cooperating features contemplated by the present aspects. Note that further enhancements (not shown) may be added to increase the ability of the cooperating stabilizer elements to roll or slide within each other, such as ball bearings, wheels, rollers, lubricants, etc.

More specifically, FIG. 6A shows an assembly 60a with the VTOL standoff 28 in communication with or integral with a second cooperating stabilizer element 29 shown as a "female" fixture dimensioned to engage the "male" first cooperating stabilizer element 62a of the associated vertically-oriented support element 64a. FIG. 6B shows an assembly 60b with the VTOL standoff 28 in communication with or integral with a second cooperating stabilizer element 29 shown as a "female" fixture dimensioned to engage the "male" first cooperating stabilizer element 62b of the associated vertically-oriented support element 64b. FIG. 6C shows an assembly 60c with the VTOL standoff 28 in communication with or integral with a second cooperating stabilizer element 29 shown as a "female" fixture dimensioned to engage the "male" first cooperating stabilizer element 62c of the associated vertically-oriented support element 64c, with a spring element 63 positioned between and in communication with the "male" first cooperating stabilizer element 62c and the associated vertically-oriented support element 64c. The sprint spring element 63 represents an element able to absorb or dissipate vibrational or other forces that can attend ground effect turbulence, etc. The spring element can be, for example, an internal compression spring, a shock absorber, a telescoping extender, etc., and combinations thereof.

FIG. 6D shows an assembly 60d with the VTOL standoff 28 in communication with or integral with a second cooperating stabilizer element 29 shown as a "female" fixture dimensioned to engage the "male" first cooperating stabilizer element 62d of the associated vertically-oriented support element 64d, with the vertically-oriented support element 64d shown as comprising "I" beam configuration. FIG. 6E shows an assembly 60e with the VTOL standoff 28 in communication with or integral with a second cooperating stabilizer element 29 shown as a "female" fixture dimensioned to engage the "male" first cooperating stabilizer element 62e of the associated vertically-oriented support element 64e.

According to present aspects, with respect to the assemblies shown in FIGS. 6A-6E, the first cooperating stabilizer element can extend outwardly from and be integral with the vertically-oriented support element. Upon engagement of the first cooperating stabilizer element of the vertically-oriented support element with the second cooperating stabilizer element of the VTOL standoff, in operation and according to present aspects, as the VTOL continues a descent in a landing operating, the slot-like function of the second cooperating stabilizer element can serve to act as a guide to assist the downward process during landing of the VTOL along the length of the vertically-oriented support element down to the ground level.

As made clear herein, the geometry of the first cooperating stabilizer element of the vertically-oriented support element and second cooperating stabilizer element of the VTOL standoff can comprise either "male" or "female" configurations such that the first and second cooperating stabilizer elements can engage together to form a connected orientation and impart stabilizing characteristics to the VTOL during ascent (e.g., takeoff) from and descent (e.g., landing) onto the presently disclosed support apparatuses.

According to present aspects, FIGS. 7A-7F illustrate enlarged views of standoffs 58a, 58b, 58c, 58d, 58e, 58f similar to those depicted in FIGS. 5A-5F, but with the second cooperating stabilizer element 69 located at the terminus of the standoff second end 28b of the standoffs shown now comprising a "female" second cooperating stabilizer element configuration (rather than the "male" configuration of the second cooperating stabilizer element 29 as shown in FIGS. 5A-5F).

Similar to FIGS. 5A-5F, the standoffs 28 are configured to dissipate vibrational and other forces including for example, impact, contact, etc., that can occur during VTOL landing and takeoff, according to present aspects.

According to present aspects, the first and second cooperating stabilizer elements can comprise actuators and mechanisms to achieve a degree of movement in the cooperating stabilizer elements to facilitate engagement of the first and second cooperating stabilizer elements, including movement in real-time and in response to a signal (e.g., movement of the cooperating stabilizer element having the "female" configuration to facility entry and engagement of the cooperating stabilizer element having the "male" configuration). For example, FIGS. 8A-8C, show a progression of a second cooperating stabilizer element of a standoff during, for example, a landing operation of a VTOL.

As shown in FIG. 8A, a VTOL standoff 28 has a second cooperating stabilizer element 69 located proximate to the standoff second end 28b, with the second cooperating stabilizer element 69 shown as being actuated to an "open" orientation, (e.g., in anticipation of the VTOL approaching the first cooperating stabilizer element of a vertically-oriented support element during a landing maneuver). In FIG. 8B, the second cooperating stabilizer element 69 of VTOL standoff 28 is shown as having moved to a "partially closed" orientation (compared to the "open" orientation shown in FIG. 8A).

FIG. 8C shows the second cooperating stabilizer element 69 of VTOL standoff 28 in a "closed" orientation. According to present aspects, as a VTOL approaches the takeoff and landing apparatuses presented herein, signals (e.g. signals sent to the VTOL including signals sent remotely to the VTOL, signals sent from the VTOL itself, etc. to actuation devices, etc.) are sent to and received by the VTOL to actuate the second cooperating stabilizer element of the standoff to open or expand a second cooperating stabilizer element "female" fixture to facilitate engagement of the second cooperating stabilizer element to a first cooperating stabilizer element on the vertically-oriented support element of the landing (and takeoff) apparatus presented herein. According to present aspects, the second cooperating stabilizer element 69 shown in FIGS. 8A-8C can be in the form of adjustable grasping tips further comprising motors on the tips or the tips can be in communication with mechanical attachments and linkages located on or within the standoff structure that can include, for example, solenoids to perform "grasping", and that can be responsible for operating the tips to open and/or close to varying and selected degrees. In further aspects, motors, mechanical linkages, wires, etc. can be located in the VTOL, with the VTOL-located motors in communication with the grasping tips, etc.

FIGS. 9A-9C illustrate, according to present aspects, a VTOL engaged in a landing operation, with the VTOL descending and coming into proximity with a VTOL landing and takeoff stabilizing apparatus. As shown in FIG. 9A, as a VTOL 40 approaches a VTOL landing and takeoff stabilizing apparatus 90a, the VTOL is oriented during landing such that two of the standoffs 28 on the VTOL 40 are moved into a position proximate to first cooperating stabilizer elements 92 located at the second ends 91b of the two vertically-oriented support elements 91 to place a second cooperating stabilizer element 69 of a VTOL standoff 28 in position to engage the first cooperating stabilizer element 92 located at the second end 91b of a vertically-oriented support element 91. FIG. 9A further shows a circumferential frame support 93a engaging the two vertically-oriented support elements 91 proximate to the two vertically-oriented support element second ends 91b, and further shows a circumferential frame support 93b engaging the two vertically-oriented support elements 91 proximate to the two vertically-oriented support element first ends 91a. While the engagement can be a direct engagement, as shown in FIGS. 9A-9C the circumferential frames 93a, 93b are shown engaging a frame standaway attachment 95 that in turn engages or is otherwise in communication with the two vertically-oriented support element first ends 91a and vertically-oriented support element second ends 91b. Note that circumferential frame support 93a and 93b as shown are circular, however any shape of frame support that maintains the form and/or shape of the vertical takeoff and landing stabilizing apparatus is acceptable. Alternatively, the VTOL takeoff and landing stabilizing apparatus is attached directly to the ground or some other structure.

The VTOL takeoff and landing stabilizing apparatus 90b shown in FIG. 9B is similar to the VTOL landing apparatus 90a (shown in FIG. 9A), with apparatus 90b showing an additional circumferential frame support 93c located approximately midway between circumferential frame supports 93a and 93b, apparatus 90b is shown at least for the purpose of connoting that any number of circumferential frame supports can be included and present in the presently contemplated apparatuses. FIG. 9B further shows reinforcements 94 in contact with the circumferential frame supports 93a, 93b, 93c and the vertically-oriented support elements 91. The VTOL shown in FIG. 9B in "broken lines" represents a VTOL that is in the process of landing, with the VTOL located on the ground 16 having completed a landing is shown and drawn in solid lines.

According to present aspects, the frame supports can contact the vertically-oriented support elements and provide support to the vertically-oriented support elements. The present frame supports, when in place in the present VTOL takeoff and landing stabilizing apparatuses together with the vertically-oriented support elements can together provide a "frame" of the apparatus. The frame supports can be deployed in the apparatus as horizontal supports that directly connect to the vertically-oriented support elements. The frame supports are said to be circumferential frame supports when the geometric orientation of the frame supports have a substantially circular geometry, as the frame supports "bound" or "surround" a theoretical perimeter formed by a line drawn to include the area created within the region created by the vertically-oriented support elements, with the inside perimeter representing a value that can accommodate the outer perimeter of VTOLs configured to takeoff from and land into the present VTOL takeoff and landing stabilizing apparatuses. Although shown as circular, present aspects include other geometries for the frame supports that are not circular. For example, when four vertically-oriented support elements are present, the frame supports can be circular or can be, for example, rectangular in shape. If the four vertically-oriented support elements are equidistant from one another, the frame supports can be square. According to present aspects, the term "circumferential" frame supports include frame support geometries that may not be circular geometries. However, in all instances, as presented herein, the selected perimeters formed by the "circumferential frame supports" are selected and dimensioned to accommodate landing entry into, and takeoff from the VTOL takeoff and landing stabilizing apparatuses according to the dimensions of the VTOL. That is, present aspects contemplate a cross-sectional apparatus perimeter that is greater than an outer perimeter of the VTOLs that takeoff and land from a present apparatus.

FIG. 9C is an overhead view of the VTOL takeoff and landing stabilizing apparatus 90b shown in FIG. 9B with numbered features as indicated in FIG. 9B. According to present aspects, the apparatuses 90a, 90b shown in FIGS. 9A-9C facilitate the landing and takeoff of VTOLs by increasing the stability of a VTOL during takeoff and landing, and by significantly ameliorating and/or eliminating ground effect turbulence, turbulent rotation of the VTOL by ground effect, and such present apparatuses facilitate the dissipation of recirculating vortices otherwise caused by ground effect, with turbulent energy and effects transferred from the VTOL to the apparatuses of the types shown in FIGS. 9A-9C.

According to further present aspects, FIGS. 10A-10C depict a VTOL engaged in a landing operation similar to that shown in FIGS. 9A-9C, with the VTOL 40 descending and coming into proximity with a VTOL landing and takeoff stabilizing apparatus 100a, 100b having four vertically-oriented support elements 91. As shown in FIG. 10A, a VTOL 40 approaches a VTOL landing and takeoff stabilizing apparatus 100a, and the VTOL 40 is oriented during landing such that four of the standoffs 28 on the VTOL 40 are moved into an aligned position proximate to first cooperating stabilizer elements 92 located at the second ends 92b of the four vertically-oriented support elements 91 and in a relative position between the VTOL 40 and the apparatus 100a to place a second cooperating stabilizer element 69 of a VTOL standoff 28 in position to engage the first cooperating stabilizer element 92 located at the second end 91b of a vertically-oriented support element 91. FIG. 10A further shows a circumferential frame support 93a engaging the four vertically-oriented support elements 91 proximate to the four vertically-oriented support element second ends 91b, and further shows a circumferential frame support 93b engaging the four vertically-oriented support elements 91 proximate to the four vertically-oriented support element first ends 91a.

FIG. 10B shows a landing apparatus 100b, similar to the VTOL landing apparatus 100a (shown in FIG. 10A), with apparatus 90b showing an additional circumferential frame support 93c located approximately midway between circumferential frame supports 93a and 93b, and apparatus 100b is shown at least for the purpose of connoting that any number of circumferential frame supports can be included and present in the presently contemplated apparatuses. While FIG. 10B does not show further reinforcements in contact with the circumferential frame supports 93a, 93b, 93c and the vertically-oriented support elements 91, the inclusion of additional supports of the type shown in FIGS. 9A-9C are contemplated for apparatuses 100a, 100b. The VTOL shown in FIG. 10B in "broken lines" represents a VTOL that is in the process of landing, with the VTOL located on the ground 16 having completed a landing is shown and drawn in solid lines.

FIG. 10C is an overhead view of the VTOL takeoff and landing stabilizing apparatus 100b shown in FIG. 10B with numbered features as indicated in FIG. 10B. According to present aspects, the apparatuses 100a, 100b shown in FIGS. 10A-10C facilitate the landing and takeoff of VTOLs by increasing the stability of a VTOL during takeoff and landing, and by significantly ameliorating and/or eliminating ground effect turbulence, turbulent rotation of the VTOL by ground effect, and such present apparatuses facilitate the dissipation of recirculating vortices otherwise caused by ground effect, with turbulent energy and effects transferred from the VTOL to the apparatuses of the types shown in FIGS. 10A-10C. While FIGS. 10A-10C show four vertically-oriented support elements, present aspects contemplate including a selected number of vertically-oriented support elements other than four.

In further present aspects, methods, systems, and apparatuses employing the presently disclosed VTOL takeoff and landing stabilizing apparatuses can include a platform to further enhance the stability imparted to a VTOL engaged in a landing or takeoff operation. According to present aspects, the platform can comprise a grate made from a material that can be a rigid or taut material, including a mesh material that can be a rigid mesh material, and having an average mesh gauge, such that the grate comprises a mesh material selected to be robust enough to support the weight of a VTOL that come in contact with the grate, and that is supported by the grate.

FIG. 11A shows a VTOL 40 having completed a landing operation, onto apparatus 110, with the VTOL in position on a platform 112. According to present aspects, platform 112 is made from a rigid and/or taut material. According to another aspect, the platform is constructed to form a platform suitable to support the weight of the VTOL 40, with the rigid material configured into a grid or mesh such that airflow from the VTOL 40, at least during landing, passes through the platform at a rate and to a degree that substantially no ground effect is directed from the platform toward the VTOL 40, and the platform does not otherwise negatively impact the stability afforded the VTOL by the apparatus 112, at least during landing. Present aspects contemplate a platform 112 that can be made from metals, plastics, resin-based composite materials, ceramics, cloth, and combinations thereof. The platform can be made from a conductive material, or can be coated or impregnated with a conductive material or a conductive material coating, etc.

As shown in FIG. 11A, VTOL 40 comprises a plurality of standoffs 28 (shown in FIG. 11A as four standoffs 28) and with a second cooperating stabilizer element 29, 69 located proximate to the terminus of vertically-oriented support element 91 second end 91b. As further shown in FIG. 11A the four second cooperating stabilizer elements 69 associated with the four VTOL standoffs 28 have engaged the four first cooperating stabilizer elements 92 that are in communication with the four vertically-oriented support elements 91. FIG. 11A further shows a circumferential frame support 93b engaging the four vertically-oriented support elements 91 proximate to the four vertically-oriented support element first ends 91a and further proximate to the ground 16. Note that circumferential frame support 93b is shown as circular, however any shape of frame support that maintains the form and/or shape of the vertical takeoff and landing stabilizing apparatus is acceptable.

FIG. 11B is an overhead view of the VTOL takeoff and landing stabilizing apparatus 110 shown in FIG. 11A with numbered features as also indicated in FIG. 11A and as described herein. According to present aspects, the apparatus 110 shown in FIGS. 11A, 11B facilitate the landing and takeoff of VTOLs by increasing the stability of a VTOL during takeoff and landing, and by significantly ameliorating and/or eliminating ground effect turbulence, turbulent rotation of the VTOL caused by ground effect, and such present apparatuses facilitate the dissipation of recirculating vortices otherwise caused by ground effect, with turbulent energy and effects transferred from the VTOL to the apparatuses of the types shown in FIGS. 11A and 11B. While FIGS. 11A and 11B show four vertically-oriented support elements, present aspects contemplate including a selected number of vertically-oriented support elements other than four.

According to further alternate present aspects, FIGS. 12A, 12B, and 12C show alternate arrangement for a VTOL takeoff and landing stabilizing apparatus 120 that allows for an absence of first cooperating stabilizer elements on the vertically-oriented support element first end, and further allows for assisting and facilitating the takeoff and landing of VTOLs that do not comprise standoffs extending from the VTOL, such as, for example, standoffs extending from a rotor guard.

FIG. 12A shows a VTOL 124 resting on apparatus 120 comprising elements similar to those shown in FIGS. 11A-11C and described herein, with the exception that apparatus 120 comprises a platform 112, that can be a grid/mesh platform, with the platform 112 further comprising at least one retainer 122 in communication with the platform 112, with the retainer 122 configured to releasably engage a structure of a VTOL (e.g., a VTOL landing strut, landing skid, wheel, etc.) during a VTOL landing, resting, and/or a takeoff operation. FIG. 12A further shows a VTOL in contact with platform 112. FIG. 12A also shows vertically-oriented support elements 91 having vertically-oriented support element second ends 91b that can be substantially flush with, and that may not extend beyond the upper surface of the platform. In addition, FIG. 12A shows a VTOL 124 that does not comprise standoffs extending from any rotor guard and otherwise configured to engage any structure of apparatus 120. According to present aspects, the retainer is equivalently referred to as a "release mechanism".

FIG. 12B is a top view of the apparatus 120 shown in FIG. 12A, wherein the VTOL 124 (also shown in a side view in FIG. 12C) is positioned proximate to the platform 112, with platform 112 comprising a retainer 122 configured to engage landing skid 128 of VTOL 120. Although not shown in FIG. 12B, in this alternate aspect, retainers can also, or in an alternative, extend from a VTOL structure (e.g. landing skid, etc.) and be configured to securely and releasably engage the grid mesh of platform 112. Further, motors, actuators, electronics, signaling transmitter and receivers, mechanical mechanisms, etc. to impart a degree of movement for one or more retainers 122 can be associated and/or in communication with apparatus 120, and, if one or more retainers (not shown) are integral with the VTOL, motors, actuators, electronics, signaling transmitter and receivers, mechanical mechanisms, etc., can be located on the VTOL to control movement of retainers, including movement configured to releasable engage such retainers on the VTOL with a platform of the type shown in FIGS. 12A, 12B.

FIG. 12C is a side view of the apparatus 120 shown in FIG. 12A, wherein the VTOL 124 (also shown in a side view) is positioned proximate to the platform 112, with platform 112 comprising a retainer 122 configured to engage landing skid 128 of VTOL 124. Although not shown in FIG. 12C, in this alternate aspect, retainers can also or in the alternative extend from a VTOL structure (e.g. landing skid, etc.) and be configured to securely and releasably engage the grid mesh of platform 112. Further, motors, actuators, electronics, signaling transmitter and receivers, mechanical mechanisms, etc., to impart a degree of movement for one or more retainers 122 can be associated and/or in communication with apparatus 120, and, if one or more retainers (not shown) are integral with the VTOL, motors, actuators, electronics, signaling transmitter and receivers, mechanical mechanisms, etc., can be located on the VTOL to control movement of retainers, including movement configured to releasably engage such retainers on the VTOL with a platform of the type shown in FIGS. 12A, 12B, and 12C.

According to further present aspects, a platform of the type shown in FIGS. 11A, 11B, 11C and/or FIGS. 12A, 12B, and 12C can further comprise mechanical mechanisms to actuate movement of a platform of the types described herein. As shown in FIG. 13, a VTOL takeoff and landing stabilizing apparatus 130 can combine aspects of the apparatuses shown at least in FIGS. 11A-11C, 12A, 12B, 12C and can further include a platform configured to move or migrate through various selected vertical positions and locations longitudinally along the length of the vertically-oriented support elements of the disclosed VTOL takeoff and landing stabilizing apparatuses described herein. As shown in FIG. 13, VTOL 40 comprising standoffs 28 terminating in a second cooperating stabilizer element 69 is shown in prior to a takeoff operation or is shown at the completion of a landing operation such that each of the VTOL's second cooperating stabilizer element 69 is engaged with a vertically-oriented support element 91. VTOL 40 is shown resting on platform 112 with destabilizing ground effect on the VTOL (generated by the VTOL rotors during takeoff and/or landing) significantly ameliorated or substantially eliminated by transferring energy and forces from, for example, ground effect, at least in part, to the stabilizing apparatus 130.

According to one exemplary takeoff operation, according to present aspects, power (e.g., electrical power) from power source 132 can be turned on and directed to a drive mechanism 134, with the drive mechanism 134 can (as shown in FIG. 13) located in direct communication, or otherwise integral with, platform 112. According to alternate present aspects, at least portions of the drive mechanism can be located remotely from, but in communication with, drive elements located in communication with platform 112. When the drive mechanism is activated, the platform 112 can be moved (e.g., lowered, raised, etc.) to a desired height, including ground level. The drive mechanism can be located remotely from but in communication with platform 112 with the drive mechanism configured to ascend or descend the platform 112 to varying selected heights along the length of the apparatus 130. The VTOL 40 can be positioned on platform 112 with second cooperating stabilizer elements 69 on standoffs 28 engaged (e.g., one each) to a vertically-oriented support element 91. If takeoff from a height other than ground level is desired, the platform can be directed to a selected height along the length of the apparatus 130 up to and including a height such that the platform is proximate to the maximum height of the apparatus with the platform driven to a height occupied proximate to the vertically-oriented support element second ends 91b. The VTOL can then be activated for takeoff, with significantly enhanced VTOL takeoff stability as the undesirable takeoff ground effects are significantly ameliorated and/or significantly eliminated.

According to an exemplary VTOL landing protocol, and according to present aspects, as a VTOL is directed to apparatus 130, power (e.g., electrical power) from power source 132 can be turned on and directed to a drive mechanism 134 to elevate platform 112 to a selected height within apparatus 130 to receive the landing VTOL in a stabilized landing with ameliorated or eliminated ground effect. In a fashion similar to landing protocols described herein, the VTOL is guided to align second cooperating stabilizer elements 69 on the VTOL standoffs 28 with first cooperating stabilizer elements 92 located integral with or proximate to the vertically-oriented support elements 91 of apparatus 130. When the controlled and stabilized landing is completed, the VTOL 40 will safely rest on platform 112, at which point, in the landing protocol, the drive mechanism 134 in platform 112 can be activated manually or automatically to cause the platform to descend from, for example, a selected platform landing height, to a selected platform 112 height that can include, for example, ground level.

According to further aspects, present apparatuses disclosed herein can further include guides that can be attached to, in communication with, or otherwise located proximate to the second ends 91b of the vertically-oriented support elements of the present apparatuses. FIGS. 14A, 14B, 14C, 15A, 15B, 16A, 16B show exemplary variations for guides according to present aspects, that can be configured to further stabilize VTOL takeoff and landing and incorporated into the apparatuses, systems, and methods disclosed herein. The guides can be incorporated into any of the presently disclosed VTOL takeoff and landing stabilizing apparatuses, systems, and methods.

As shown in FIG. 14A, VTOL takeoff and landing stabilizing apparatus 140 comprises many of the features presented in the present apparatuses, including, for example, the apparatus 100a shown in FIG. 10A. As shown in FIG. 14A, guide 142 "tops" apparatus 140, with guide first end 142a contacting or otherwise located proximate to the vertically-oriented support element second end 141c, and with guide first end 142a having a guide first end diameter (d1) (see FIG. 14C) that can be substantially equivalent to the diameter of the circumferential frame support 93a. Guide 142 further comprises a guide second end 142b having a guide second end diameter (d2) (see FIG. 14C), with the guide second end diameter (d2) being greater than the guide first end diameter (d1). See side view of guide 140 at FIG. 14C, showing guide second end diameter (d2), being greater than the guide first end diameter (d1).

FIG. 14B is an overhead view of VTOL takeoff and landing stabilizing apparatus 140 showing guide first end 142a and guide second end 142b, with VTOL 20 "nested" within guide 140, with VTOL 20 engaged in a landing or a takeoff protocol. The parts shown in FIGS. 14A and 14B are as labelled for apparatus 100a in FIG. 10A, but the guide 142 shown in FIGS. 14A-14C is understood as being adaptable to the many apparatuses disclosed herein. When the VTOL takeoff and landing stabilizing apparatuses comprise a circumferential frame support, such as circumferential frame support 93a that is substantially circular, the guide 142, as shown in FIG. 14A can comprise guide first end 142a and guide second end 142b that, geometrically, are also substantially circular. In this aspect, and as shown in FIGS. 14A-14C, the guide can have an overall geometry that is frustoconical. According to further aspects, the guide geometry may "match" a geometry near the opening of the VTOL takeoff and landing stabilizing apparatus that is located adjacent to the guide first end 142a. As shown in FIGS. 14A, 14B, 14C, the general geometry of the guide 142 is circular, and the general geometry of the apparatus 140 is tubular and also cross-sectionally generally circular. A guide inner surface 142c of guide 142 can incorporate raised elements or elements in relief that serve as "grooves" or guide inner surface channels 142d (e.g., guide inner surface channels configured to form a directional track, etc.) that are shown in FIGS. 14A, 14B, 14C, with the guide shown to be conical and "funnel-like" in shape.

The guide inner surface channels 142d can be in communication with, and can be in general alignment with, the first cooperating stabilizer elements, and the grooves can facilitate the directing of the VTOL from a position within the guide to the first cooperating stabilizer elements by feeding at least one of the VTOL second cooperating stabilizer elements from the guide inner surface channel 142d to the first cooperating stabilizer element in communication with the vertically-oriented support element of the VTOL takeoff and landing stabilizing apparatus.

As shown in FIGS. 14A, 14B, 14C, the first cooperating stabilizer element can comprise grooves or raised features configured to form a "directional track" or "directional channel" in the guide inner surface, such that the directional track can be dimensioned to accommodate the dimension of the second cooperating stabilizer element of the standoff. As the second cooperating stabilizer element of the VTOL standoff engages, or otherwise comes into contact with, the directional track in the guide inner surface, the second cooperating stabilizer element (and the VTOL that is attached to the second cooperating stabilizer element) is directed from the guide downward into the first cooperating stabilizer element that comprises the track or channel.

According to present aspects, when present apparatuses employ a guide of the types shown in FIGS. 14A, 14B, 14C, a landing protocol provided for VTOLs is further facilitated. In an exemplary landing protocol using the VTOL takeoff and landing stabilizing apparatus 140, a VTOL 20 can approach an area proximate to the top of the guide 142 and the VTOL can further be substantially centered in flight to hover over the guide. As the VTOL descends into the guide, the second cooperating stabilizer element 29 at the outer terminus of VTOL standoff 28 can associate with and otherwise become at least partially inserted into, grooves configured to form a directional track or directional channel that "feeds" into internal tracks along the inner surface of the guide 142. The guide inner surface channel 142d formed by the grooves can be oriented along the guide inner surface 142c of guide 142 with the guide inner surface channel 142d functioning as a directional track in communication with, substantially aligned with, and otherwise feeding into the vertically-oriented support element channel 141c on the vertically-oriented support element 141. Once the VTOL's second cooperating stabilizer elements 29 are slotted into or otherwise oriented with the first cooperating stabilizer element, the VTOL can descend to ground level with the interfering ground effect that would otherwise occur being significantly ameliorated or substantially eliminated as the turbulent ground effect forces are transferred from the landing VTOL to the apparatus 140.

Further, the outer and/or inner geometry of the VTOL takeoff and landing stabilizing apparatus need not be substantially circular, substantially tubular, substantially cylindrical, etc., so long as the internal lengthwise dimension of the VTOL takeoff and landing stabilizing apparatus can dimensionally accommodate the outer dimension of a VTOL designed to takeoff from or land into a particular VTOL takeoff and landing stabilizing apparatus.

While FIGS. 15A, 15B, 16A, 16B depict further exemplary and non-exhaustive configurations for contemplated VTOL takeoff and landing stabilizing apparatuses, according to present aspects, the overall geometries (e.g. substantially rectangular or "square") of the apparatus longitudinal "body" or "chute" is shown as matching a geometry of the guide, and it is understood that, according to present aspects not shown, guide geometries can differ from apparatus body or "chute" geometries, so long as the internal lengthwise dimension of the VTOL takeoff and landing stabilizing apparatus can dimensionally accommodate the outer dimension of a VTOL designed to takeoff from or land into a particular VTOL takeoff and landing stabilizing apparatus.

According to further present aspects, FIGS. 15A and 15B show a VTOL takeoff and landing stabilizing apparatus 150 comprising a guide 152 that can "top" apparatus 150, with guide first end 152a contacting or otherwise located proximate to the vertically-oriented support element second end 151b, and with guide first end 152a having a guide first end width (w1) that can be substantially equivalent to the diameter of a circumferential frame support. Guide 152 further comprises a guide second end 152b having a guide second end width (w2), with the guide second end width (w2) being greater than the guide first end width (w1).

A guide inner surface 152c of guide 152 can incorporate raised elements or elements in relief that serve as "grooves" or guide inner surface channels 152d that are shown in FIGS. 15A, 15B. The guide inner surface channel 152d can be formed by the grooves, recesses, regions of raised relief, etc. that can be oriented along the guide inner surface 152c of guide 152 with the guide inner surface channel 152d in communication with, substantially aligned with, and otherwise feeding into the vertically-oriented support element channel 151c on the vertically-oriented support element 151.

FIG. 15B is an overhead view of VTOL takeoff and landing stabilizing apparatus 150 showing guide first end 152a and guide second end 152b, with VTOL 20 "nested" within guide 150, with VTOL 20 engaged in a landing or a takeoff protocol. The guide 152 shown in FIGS. 15A, 15B is understood as being adaptable to the many apparatuses disclosed herein.

According to further present aspects, FIGS. 16A and 16B show a VTOL takeoff and landing stabilizing apparatus 160 comprising a guide 162 that can "top" apparatus 160, with guide first end 162a contacting or otherwise located proximate to the vertically-oriented support element second end 161b, and with guide first end 162a having a guide first end dimension that can be substantially equivalent to a geometry that is collectively formed by the location of the plurality of the vertically-oriented support element second ends 161b, such that the guide first end 162a is supported by the vertically-oriented support element second ends 161b. Guide 162 further comprises a guide second end 162b having a guide second end width, with the guide second end width being greater than the guide first end width.

FIG. 16B is an overhead view of VTOL takeoff and landing stabilizing apparatus 160 as shown in FIG. 16A, and showing guide first end 162a and guide second end 162b, with VTOL 20 "nested" within guide 160, with VTOL 20 engaged in a landing or a takeoff protocol. The guide 162 shown in FIGS. 16A, 16B is understood as being adaptable to the many apparatuses disclosed herein.

FIGS. 16A, 16B further shows guide 162 as comprising a guide mesh material 164 that can be a rigid or taut mesh material. A guide mesh material can be selected such that, at least during VTOL takeoff and landing, as the VTOL enters the mesh guide, airflow from the VTOL rotors passes through the guide mesh at a rate and to a degree such that substantially no ground effect is directed from the guide surfaces back toward the VTOL 20, and the guide does not otherwise negatively impact the stability afforded the VTOL 20 by the guide 162, at least during VTOL takeoff and landing. According to further aspects, a highly perforated material can be used as the material for the guide 162.

Present aspects contemplate a guide 142, 152, 162 that can be made from metals, plastics, resin-based composite materials, ceramics, cloth, and combinations thereof. The guide can be made from a conductive material, or can be coated or impregnated with a conductive material or a conductive material coating, etc.

According to present aspects, VTOL takeoff and landing stabilizing apparatuses, systems, and methods can further facilitate aspects of VTOL takeoff and landing, including energy conservation and stabilization at takeoff and landing, and noise reduction at takeoff and landing. According to further present aspects, the enclosed apparatuses can include at least one housing that surrounds or that can substantially surround and otherwise enclose the vertically-oriented support element(s) and a frame support that can be a circumferential frame support, and the vertically-oriented support element(s) that together can form an apparatus frame.

For example, present aspects further contemplate apparatuses, systems, and methods for vertical takeoff and landing vehicles (VTOLs) that comprise an enclosed or a substantially enclosed apparatus (collectively and equivalently referred to herein as an "enclosed apparatus") from which such vehicles can takeoff and into which such vehicles can land, with the apparatuses affording significantly ameliorated or substantially eliminated ground effect on the vehicles, while increasing VTOL stability during takeoff and landing, and while conserving energy and reducing operational decibel levels during takeoff and landing. According to present aspects, the enclosed apparatuses can comprise the fixtures and components as specified herein, with such enclosed apparatuses additionally including at least one moveable panel that can open and close (e.g., that can move from an open to a closed position and from a closed to an open position, including partially open and partially closed positions, etc.). According to present aspects, the enclosed apparatuses, with moveable doors in the open position, can accommodate a vertical takeoff and landing vehicle into the enclosed apparatuses, that can also include the guides and elevator-type platforms described herein. With respect to the enclosure, the terms "panel" and "door" as used herein are equivalent and interchangeable terms. Further, the terms "moveable enclosure panel" and "moveable panel" are equivalent terms for purposes of the present application.

First focusing on a VTOL landing operation into a presently disclosed enclosed VTOL takeoff and landing stabilizing apparatus, the at least one moveable panel can be moved in manual or automated fashion, directly or remotely, for example, from a closed position to an open position. During a descent, the VTOL is positioned over and descends into the present apparatuses, including apparatuses that can include a guide. As shown in FIGS. 17A and 17B, a VTOL 20 of the type shown at least in FIGS. 1, 2, has descended into an enclosed VTOL takeoff and landing stabilizing apparatus 170.

The enclosed VTOL takeoff and landing stabilizing apparatus 170 is similar in framework and structure to that shown (as VTOL takeoff and landing stabilizing apparatus 140) in FIGS. 14A, 14B, with the notable addition, in enclosed VTOL takeoff and landing stabilizing apparatus 170, of enclosure 174 that substantially surrounds and otherwise encloses the VTOL takeoff and landing stabilizing apparatus 170 to form, (when the enclosure is substantially cylindrical, for example) a tubular body region.

As shown in FIGS. 17A and 17B, enclosed VTOL takeoff and landing stabilizing apparatus 170 includes at least one (shown in FIGS. 17A, 17B, as a plurality of four (4)) vertically-oriented support element 171, with the support element 171 further including a vertically-oriented support element first end 171a, vertically-oriented support element second end 171b, and vertically-oriented support element channel 171c.

Enclosed VTOL takeoff and landing stabilizing apparatus 170 further includes circumferential frame supports 173*a*, 173*b* in communication with the vertically-oriented support elements 171. FIGS. 17A, 17B further show guide 172, (shown as 142 in FIG. 14A) that can comprise guide first end 172*a* and guide second end 172*b* that, geometrically, are also substantially circular. FIGS. 17A, and 17B show the enclosed VTOL takeoff and landing stabilizing apparatus 170 further comprising an outer housing configured to form enclosure 174 that surrounds the body of the enclosed VTOL takeoff and landing stabilizing apparatus 170, and a plurality of enclosure doors 176. FIG. 17A shows four (4) enclosure doors 176 in the closed position, while FIG. 17B shows the four (4) enclosure doors 176 in the open position.

FIG. 17A shows VTOL 20 in a landing descent, with the VTOL already having oriented each of the four second cooperating (male) elements 29 on the four standoffs 28 (one each) into the vertically-oriented support element channel 171*c*, and with the VTOL 20 in a significantly enhanced, stabilized descent within the enclosed VTOL takeoff and landing stabilizing apparatus 170 as the VTOL descends within the VTOL takeoff and landing stabilizing apparatus 170. As ground effect from the VTOL's rotors generate a degree of air turbulence within the VTOL takeoff and landing stabilizing apparatus 170, and as the VTOL 20 descends to a point proximate to the ground 16, the impact of ground effect turbulence region within a distance proximate to the ground 16 can impact the stabilized VTOL 20 and the VTOL takeoff and landing stabilizing apparatus 170. Such ground effect turbulence within the enclosed VTOL takeoff and landing stabilizing apparatus 170, according to present aspects, can be controlled and significantly mitigated by the enclosed VTOL takeoff and landing stabilizing apparatus 170 triggering the opening of enclosure doors 176 to dissipate the ground effect turbulence.

As shown in FIG. 17B, enclosure doors 176 are now in the open position and the ground effect turbulence generated by the rotors of VTOL 20 is dissipated at least through the open enclosure doors 176 (as shown by the arrows), and the force otherwise commensurate with the generated ground effect turbulence is significantly reduced as forces, including the ground effect forces, are purged from the enclosed VTOL takeoff and landing stabilizing apparatus 170 via the open enclosure doors 176.

FIG. 17B shows a control box 177 representing the electrical and mechanical components for regulating the positioning of the enclosure doors 176, with at least one control box 177 including or otherwise in communication with a pressure detector 177*a* configured to sense pressure at regions within the VTOL takeoff and landing stabilizing apparatus 170. As shown in more detail in the box diagram shown in FIG. 17C, control box 177 can comprise a controller 177*b*, a power supply 177*c*, an actuator 177*d* in communication with at least one enclosure door, with the actuator 177*d* configured to receive a signal from the controller 177*b* and/or the pressure detector 177*a*, and with the actuator 177*d* configured to effect movement of an enclosure door upon command.

FIGS. 18A and 18B show an alternate arrangement for a VTOL takeoff and landing stabilizing apparatus 180, that differs from VTOL takeoff and landing stabilizing apparatus 170 in that each of the vertically-oriented support elements 181 comprise a plurality of individual guides 182 positioned adjacent to or atop the vertically-oriented support element second end 181*b*. In this aspect, during a descent and as a VTOL 20 approaches the VTOL takeoff and landing stabilizing apparatus 180, the VTOL 20 aligns the second cooperating stabilizer element 29 located on VTOL standoff 28 proximate to an individual guide 182 and the second cooperating stabilizer element 29 engages individual guide 182, with the individual guide 182 comprising individual guide slot 182*a* structurally configured to feed into a slot located with the vertically-oriented support element 181 associated with the individual guide 182 at the vertically-oriented support element second end 181*b*. Enclosure 184 is shown surrounding the body of VTOL takeoff and landing stabilizing apparatus 180.

FIG. 18B shows the VTOL takeoff and landing stabilizing apparatus 180 shown in FIG. 18A, with the VTOL 20, descending into the body of the VTOL takeoff and landing stabilizing apparatus 180. FIG. 18C shows an enlarged representative overhead view of the individual guide 182 receiving the second cooperating stabilizer element 29 of a VTOL standoff 28, with FIG. 18C further showing the vertically-oriented support element 181 in communication with guide 182 and enclosure 184.

FIGS. 19 and 20 show alternate present aspects and alternate configurations of VTOL takeoff and landing stabilizing apparatuses that comprise additional and/or alternate pressure release elements that can assist with the mitigation of ground effect air turbulence and otherwise dissipate increasing pressures within a VTOL takeoff and landing stabilizing apparatus during the landing of a VTOL, according to present aspects.

As shown in FIG. 19, an enclosed VTOL takeoff and landing stabilizing apparatus 190 comprises many of the components of an enclosed VTOL takeoff and landing stabilizing apparatus 170 as shown in FIG. 17A, with the addition of an external shield 195 that is located external to the enclosure and that can extend from an external shield first end 195*a* (e.g., proximate to the ground 16) to an external shield second end 195*b*. As a VTOL descends (e.g., during landing) or ascends (e.g., during takeoff) within the VTOL takeoff and landing stabilizing apparatus 190, the ground effect air turbulence is allowed to pass out of and is otherwise directed from the VTOL takeoff and landing stabilizing apparatus enclosure 194 via the enclosure openings 196 bounded by the enclosure 194. As an alternative to laterally-opening enclosure openings 176 as shown in FIGS. 17A and 17B, in FIG. 19, the enclosure openings 196 can open outwardly at the top while hinged at the bottom to comport with the shape of external shield 195. The higher (than ambient) pressure ground effect turbulent air that escapes from the enclosure openings 196 can then be directed against the external shield inner surface 195*c* and escape into the lower pressure atmosphere as indicated by the arrows shown in FIG. 19 and can be otherwise "released" into the air at a selected distance away from the ground that can be essentially equivalent to the height of the VTOL takeoff and landing stabilizing apparatus (e.g., a distance away from the ground ranging from about 4 ft. to about 100 ft., etc.).

FIG. 20 shows a further alternate aspect for ameliorating ground effect during VTOL landing and takeoff within a VTOL takeoff and landing stabilizing apparatus 200. As shown in FIG. 20, an enclosed VTOL takeoff and landing stabilizing apparatus 200 comprises many of the components of an enclosed VTOL takeoff and landing stabilizing apparatus 170 as shown in FIG. 17A, but with the addition of a plurality of pipes 205 that can be located with a pipe lower end 205*a* extending through an enclosure opening 206 in enclosure 204. Pipe second end 205*b* extends to a selected distance away from pipe first end 205*a* to pipe second end 205*b*, with the substantial length of pipe 205 as shown in FIG. 20 located exterior to enclosure 204 at enclosure exterior 204a and can be positioned proximate to or can be attached to or integral with enclosure 204. Alternatively, pipe 205 is angled outwardly and away from enclosure 204 such that pipe second end 205b is situated horizontally farther away from enclosure 204 than pipe first end 205a.

As a VTOL descends (during landing) or ascends (during takeoff) within the VTOL takeoff and landing stabilizing apparatus 200 (e.g., during a landing), the ground effect air turbulence is allowed to pass out of, and is otherwise directed from the VTOL takeoff and landing stabilizing apparatus enclosure 204 via the enclosure openings 206 bounded by the enclosure 204. The higher (than ambient) pressure ground effect turbulent air that escapes from the enclosure openings 206 can then be directed into pipes 205, and released from pipes 205 into the lower pressure atmosphere (as indicated by the arrows shown in FIG. 20) at a selected distance away from the ground that can be essentially equivalent to the height of the VTOL takeoff and landing stabilizing apparatus (e.g., a distance away from the ground ranging from about 10 ft. to about 200 ft., etc.). In FIGS. 17A, 17B, 18A, 18B, 19, 20, etc., the VTOL takeoff and landing stabilizing apparatuses 170, 180, 190, 200, etc., can comprise access doors to retrieve cargo or passengers delivered by the VTOL, or for loading cargo or passengers into the VTOL, etc.

The elimination, in substantially real time, of the higher pressure ground effect turbulent air from the VTOL takeoff and landing stabilizing apparatuses 190, 200 during a VTOL landing and/or takeoff further stabilizes the VTOL within the apparatus during landing, and otherwise facilitates the landing operation as pressure equilibrium is achieved between pressures within the landing apparatus and ambient pressure outside of the VTOL takeoff and landing stabilizing apparatus.

According to further present aspects, VTOL takeoff and landing stabilizing apparatuses are disclosed that ameliorate or otherwise significantly reduce VTOL operation noise during takeoff and landing by incorporating soundproofing measure into the VTOL takeoff and landing stabilizing apparatuses. FIGS. 21, 22, 23 are drawings that show soundproofing present aspects.

FIG. 21 shows a cutaway view into a VTOL takeoff and landing stabilizing apparatus 210 comprising an enclosure 214. The internal features of the apparatuses shown in previous FIGS. are omitted from FIGS. 21 and 22, although it is contemplated that the soundproofing aspects shown in FIGS. 21 and 22 can be incorporated into an enclosed VTOL takeoff and landing stabilizing apparatus 210 that incorporates enclosure 214 and that is shown in the present FIGS. including at least FIGS. 17A, 17B, for example. FIG. 21 shows a VTOL 20 engaged in a takeoff maneuver and ascending within the enclosed VTOL takeoff and landing stabilizing apparatus 210. FIG. 22 shows the VTOL 20 having ascended to a height greater than the height represented by the enclosure second end 214b, such that the VTOL 20 has exceeded the height of the enclosed VTOL takeoff and landing stabilizing apparatus 210.

As shown in FIGS. 21 and 22 the VTOL takeoff and landing stabilizing apparatus comprises enclosure 214, comprising enclosure first end 214a located proximate to the ground 16 or base and enclosure second end 214b, distal from the ground 16 or base, with enclosure 214 further comprising an enclosure inner wall 214c spaced a selected distance from enclosure outer wall 214d, with an internal inner volume 215 disposed between the enclosure inner wall 214c and the enclosure outer wall 214d.

Sound reduction can include reflection, absorption, and diffusion. In a present aspect, sound reflection or diffusion is obtained by various treatments of enclosure inner wall 214c, the walls in internal inner volume 215, and the enclosure outer wall 214d. Further, the enclosure internal volume 215 can be made from and otherwise incorporate or be filled with a single panel or a plurality of panels of materials or continuous or discrete materials. Examples of such materials having sound absorbing capabilities, include honeycomb materials, acoustic foam, phase cancellation materials, active and passive noise cancellation panels, acoustic tiles, other sound proofing materials and/or techniques, and combinations thereof, etc. According to present aspects, the enclosure 214 incorporating the enclosure internal volume 215 can reduce decibel levels of the sound generated by a VTOL taking off and/or landing from an unattenuated level ranging from about 68 dB (at 1 meter) for, for example, a relatively "quiet" drone, etc., to about 120 dB or higher (at 1 meter) for a flying car, etc. According to present aspects, these VTOL noise levels can be attenuated by different decibel amounts based on the materials used in the walls and inner internal volume 215 according to the material densities, energy absorption characteristics, and distance of the materials between enclosure inner wall 214c and enclosure outer wall 214d. According to present aspects, various selected amounts of noise reduction is obtained based on the selected design.

According to present aspects, the VTOL takeoff and landing stabilizing apparatuses can be dimensioned relative to width and height to complement the noise reduction at ground level afforded the apparatuses by incorporating the enclosure internal wall having the internal volume 215. That is, acceptable noise reduction levels at ground level can be selected to, for example, comply with local noise ordinances, safety ordinances etc., by selecting and incorporating sound absorbing materials for use in the enclosure internal volume 215, along with selected dimensioning of the internal inner wall as well as, for example, the height of the VTOL takeoff and landing stabilizing apparatus.

FIG. 23 shows the enclosed VTOL takeoff and landing stabilizing apparatus 20 (as shown in FIGS. 21 and 22) with optional guy-wire 218 attached to the enclosed VTOL takeoff and landing stabilizing apparatus 210 and anchored into, for example, the ground 16. For present purposes, the term "guy-wire" encompasses any tensioned cable or line that is selected to add stability to a free-standing VTOL takeoff and landing stabilizing apparatus according to present aspects.

According to further aspects, the VTOL takeoff and landing stabilizing apparatuses disclosed herein can attach to or can be positioned proximate to a dwelling structure. An exemplary dwelling structure 240 is shown in FIG. 24, with a proximately located enclosed VTOL takeoff and landing vehicle apparatus 244. As contemplated herein, VTOLs can be dimensioned to transport and deliver cargo (e.g. packages for delivery, etc.). Contemplated VTOLs also can be dimensioned to transport passengers, as would be the case, for example, where the VTOL is an airborne vehicle, including vehicles designed for both terrestrial and airborne use (e.g., flying cars, etc.), and where the VTOLs have "hybrid" or multi-functional terrestrial, waterborne, and airborne modalities, for example. In this aspect, an enclosed VTOL takeoff and landing stabilizing apparatus 244 can function, for example, as a "garage" that can be associated with a dwelling and located proximate to a dwelling, including being integral with the dwelling, for example, with the VTOL takeoff and landing stabilizing apparatus 244 in such "garage" configuration advantageously facilitating the takeoff and landing of a flying car VTOL, for example.

FIGS. 25A, 25B, 26A, 26B, 27A, and 27B show further various configurations for enclosed VTOL takeoff and landing stabilizing apparatuses associated with dwellings, with emphasis directed to the functional elements of a roof moveably configured to, for example, protect the enclosed VTOL apparatuses, and the VTOLs (e.g., a "parked" VTOL, etc.) from elements and "open" in various ways, and on demand to accommodate VTOL takeoff from and landing into the present enclosed VTOL takeoff and landing stabilizing apparatuses.

As shown in FIGS. 25A, an enclosed VTOL takeoff and landing stabilizing apparatus 254 is in a configuration that can be a "garage" that is located proximate to dwelling 240, with the enclosed VTOL takeoff and landing stabilizing apparatus 254 comprising a VTOL takeoff and landing stabilizing apparatus first end 254a proximate to ground level, and VTOL takeoff and landing stabilizing apparatus second end 254b located at a selected distance from the first end 254a, with the distance between the VTOL takeoff and landing stabilizing apparatus first and second ends 254a, 254b representing a distance that is approximately equal to the total height of the enclosed VTOL takeoff and landing stabilizing apparatus 254. FIG. 25A further shows a roof 256a in a closed roof position that can be moved to an open roof position (shown in dotted lines, with the movement between closed to open position indicated by the arrow in FIG. 25A). The inside of the enclosed VTOL takeoff and landing stabilizing apparatus 254 is exposed when the roof 256a is in the open position.

As shown in FIG. 25A, roof 256a can be dimensioned to be flat, and the roof can move between open and closed positions via, for example, pivoting about roof mechanism 255a that can be, for example, a motorized hinge, etc. The roof 256a can engage or otherwise be in communication with mechanical actuators in communication with controllers, and a power source that can be contained within, for example, control box 257. Control box 257 can further include a receiver for receiving a remote signal, with the signal sent from the receiver to a controller, with the controller in communication with an actuator that is further in communication with the roof mechanism. For example, upon receiving a signal (e.g., a signal sent from an approaching VTOL, or a signal from the dwelling, or a signal from the VTOL within the enclosed VTOL takeoff and landing stabilizing apparatus awaiting takeoff, etc.), a receiver in control box 257 (e.g. a receiver that can be integral with the controller or in communication with the controller in control box 257) can send a signal to the controller, and the controller can signal an actuator to move the roof 256a from an open to a closed position or from a closed position to an open position. FIG. 25A further shows VTOL 252 positioned at ground level within the enclosed VTOL takeoff and landing stabilizing apparatus, with the VTOL not drawn to scale, and with the VTOL being a cargo-carrying or a personnel-carrying VTOL.

FIG. 25B shows an alternate aspect of the enclosed VTOL takeoff and landing stabilizing apparatus shown in FIG. 25A, with the roof 256b shown in FIG. 25B dimensioned as a pitched roof. The remainder of the depicted and enumerated aspects in FIG. 25B are as indicated in FIG. 25A.

FIG. 26A shows an alternate aspect of the enclosed VTOL takeoff and landing stabilizing apparatus 254 shown in FIG. 25A, with the roof 256c shown in FIG. 26A dimensioned as a flat roof, with the roof mechanism 255b in communication with the roof 256c, and with roof mechanism configured to apply a lateral force to the roof 256c to, for example swivel or "slide" the roof from a closed position to an open roof 256c (as indicated by the arrow in FIG. 26A), with the inside of the enclosed VTOL takeoff and landing stabilizing apparatus 254 exposed when the roof 256c is in the open position. The supporting mechanisms disclosed herein that can be in communication with the roof 256c are similar to those disclosed with respect to the aspects shown in FIGS. 25A and 25B, with the understanding that the roof mechanism 255b shown in FIGS. 26A and 26B is selected to deliver a force required to, for example, laterally move the roof 256c and 256d between open and closed positions, with the roof mechanism 255b including, for example, necessary hydraulics, pneumatics, servos, pistons, etc.

FIG. 26B shows an alternate aspect of the enclosed VTOL takeoff and landing stabilizing apparatus shown in FIG. 26A, with the roof 256d shown in FIG. 26B dimensioned as a pitched roof (similar to the roof 256b shown in FIG. 25B), with the roof 256d comprising the roof mechanism 255b of the type shown and described in relation to FIG. 26A herein. FIGS. 26A and 26B can further comprise the control box 257 shown in FIGS. 25A, 25B, with the control box 257 configured to comprise the mechanisms and electronics to operate as described herein.

FIG. 27A shows another alternate present aspect of a VTOL takeoff and landing stabilizing apparatus 254 having a roof similar to that shown in FIGS. 25A and 26A (e.g., a roof having a flat orientation, etc.), with the roof 256e shown in FIG. 27A comprising roof mechanism 255c in communication with the roof 256e, and with roof mechanism 255c configured to deliver a force to the roof 256e and otherwise incorporating a rail or track to, for example, move the roof 256e from a closed roof position to an open roof position, with the inside of the enclosed VTOL takeoff and landing stabilizing apparatus 254 exposed when the roof 256e is in the open position. The supporting mechanisms disclosed herein that can be in communication with the roof 256e are similar to those disclosed with respect to the aspects shown in FIGS. 25A and 26A, with the understanding that the roof mechanism 255c shown in FIGS. 27A and 27B are selected to deliver a force required to, for example, move the roof 256e, 256f along, for example, a rail or track arrangement to move the roof 256e, 256f between open and closed positions, with the roof mechanism 255c including, for example, necessary hydraulics, pneumatics, servos, pistons, rails, tracks, pulleys, geared chains, etc.

FIG. 27B shows an alternate aspect of the enclosed VTOL takeoff and landing stabilizing apparatus 254 in FIG. 27A, with the roof 256f shown in FIG. 27B dimensioned as a roof 256f similar to the type of pitched roof shown in FIGS. 25B, 26B, and with the roof mechanism 255c comprising the elements described herein relative to the aspects shown in FIG. 27A. FIGS. 27A and 27B can further comprise the control box 257 shown in FIGS. 25A, 25B, 26A, 26B with the control box 257 configured to comprise the mechanisms and electronics to operate as described herein.

FIGS. 28, 29, 30, 31, and 32 are flowcharts outlining methods according to present aspects. As shown in FIG. 28, a method 2000 is outlined for launching and landing a vertical takeoff and landing vehicle is disclosed, with the method 2000 including providing 2002 an at least partially enclosed vertical takeoff and landing apparatus, with the apparatus comprising at least one vertically-oriented support element, with the at least one vertically-oriented support element having a vertically-oriented support element first end and a vertically-oriented support element second end, with the vertically-oriented support element first end proximate to a base, with the vertically-oriented support element extending from the vertically-oriented support element first end to the vertically-oriented support element second end, with the vertically-oriented support element second end located at a selected distance away from the first end, with the vertically-oriented support element comprising a first cooperating stabilizer element, and with the first cooperating stabilizer element located proximate to the vertically-oriented support element second end. Apparatus further comprises an enclosure, with the enclosure dimensioned to substantially surround the at least one vertically-oriented support element.

As shown in FIG. 28, the method 2000 further includes providing 2004 a vertical takeoff and landing vehicle, with the vertical takeoff and landing vehicle comprising at least one second cooperating stabilizer element, with the second cooperating stabilizer element dimensioned to engage with the first cooperating stabilizer element, and engaging 2006 the first cooperating stabilizer element of the vertically-oriented support element with the second cooperating stabilizer element of the vertical takeoff and landing vehicle.

FIG. 29 is a flowchart outlining a method 2100 comprising elements of the method 2000 for launching and landing a vertical takeoff and landing vehicle as set forth in FIG. 28, with the method 2100 further comprising stabilizing 2102 at least horizontally the vertical takeoff and landing vehicle during at least one of takeoff and landing, and restricting 2104 movement of the VTOL during takeoff and/or landing.

FIG. 30 is a flowchart outlining a method 2200 for launching and landing a vertical takeoff and landing vehicle is disclosed, with the method 2200 including providing 2202 an at least partially enclosed vertical takeoff and landing apparatus, with the apparatus comprising at least one vertically-oriented support element, with the at least one vertically-oriented support element having a vertically-oriented support element first end and a vertically-oriented support element second end, with the vertically-oriented support element first end proximate to a base, with the vertically-oriented support element extending from the vertically-oriented support element first end to the vertically-oriented support element second end, with the vertically-oriented support element second end located at a selected distance away from the first end, with the vertically-oriented support element comprising a first cooperating stabilizer element, and with the first cooperating stabilizer element located proximate to the second end. The apparatus further comprises an enclosure, with the enclosure dimensioned to substantially surround the at least one vertically-oriented support element, and an enclosure, said enclosure dimensioned to substantially surround the at least one vertically-oriented support element, with the enclosure comprising at least one moveable enclosure panel, with the at least one moveable enclosure panel positioned proximate to the vertically-oriented support element first end.

As shown in FIG. 30, the method 2200 further includes 2204 landing a vertical takeoff and landing vehicle into the vertical takeoff and landing vehicle apparatus, with vertical takeoff and landing vehicle comprising at least one second cooperating stabilizer element, and with the second cooperating stabilizer element dimensioned to engage with the first cooperating stabilizer element, engaging 2206 the second cooperating stabilizer element of the vertical takeoff and landing vehicle second with the first cooperating stabilizer element of the vertically-oriented support element, lowering 2208 the vertical takeoff and landing vehicle within the at least partially enclosed vertical takeoff and landing apparatus from the vertically-oriented support element second end to the vertically-oriented support element first end. As shown in FIG. 30, method 2200 further comprises opening 2210 the at least one moveable panel to dissipate air turbulence in the enclosure during the landing of the VTOL FIG. 31 is a flowchart outlining a method 2300 comprising elements of the method 2200 for launching and landing a vertical takeoff and landing vehicle as set forth in FIG. 30, with the method 2300 further comprising detecting 2302 air pressure in at least a region of the enclosure, actuating 2304 the at least one moveable panel in response to a detected air pressure within the enclosure detected by the detector, followed by opening 2210 the at least one moveable panel to dissipate air turbulence in the enclosure during the landing of the VTOL.

According to another aspect, FIG. 32 outlines a method 2400 for assisting takeoff of a vertical takeoff and landing vehicle, with the method 2400 including providing 2402 an at least partially enclosed vertical takeoff and landing apparatus, with the apparatus comprising at least one vertically-oriented support element, with the at least one vertically-oriented support element having a vertically-oriented support element first end and a vertically-oriented support element second end, with the vertically-oriented support element first end proximate to a base, with the vertically-oriented support element extending from the vertically-oriented support element first end to the vertically-oriented support element second end, with the vertically-oriented support element second end located at a selected distance away from the first end, with the vertically-oriented support element comprising a first cooperating stabilizer element, and with the first cooperating stabilizer element located proximate to the second end. Apparatus further comprises an enclosure, with the enclosure dimensioned to substantially surround the at least one vertically-oriented support element.

As shown in FIG. 32, the method 2400 further includes providing 2404 a vertical takeoff and landing vehicle, with the vertical takeoff and landing vehicle comprising at least one second cooperating stabilizer element, with the second cooperating stabilizer element dimensioned to engage with the first cooperating stabilizer element, and engaging 2406 first cooperating stabilizer element of the vertically-oriented support element with the second cooperating stabilizer element of the vertical takeoff and landing vehicle.

Method 2400 further comprises increasing pressure 2408 within at least a region of the enclosure from an ambient pressure to a takeoff pressure said takeoff pressure greater than the ambient pressure, with the region of the enclosure proximate to the vertical takeoff and landing vehicle, maintaining 2410 the vertical takeoff and landing vehicle in a substantially fixed position within the enclosure, and releasing 2412 the vertical takeoff and landing vehicle from the substantially fixed position at the takeoff pressure.

The presented aspects can, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. An apparatus for stabilizing takeoff and landing of a vertical takeoff and landing (VTOL) vehicle, the apparatus comprising:
    a vertically-oriented support element, said vertically-oriented support element comprising:
        a vertically-oriented support element first end proximate to a base;

a vertically-oriented support element second end located at a distance away from the vertically-oriented support element first end, said vertically-oriented support element extending from the vertically-oriented support element first end to the vertically-oriented support element second end, said vertically-oriented support element further comprising at least one first cooperating stabilizer element proximate to the vertically-oriented support element second end;

an enclosure, said enclosure dimensioned to substantially surround the vertically-oriented support element, said enclosure further dimensioned to completely surround a vertical takeoff and landing (VTOL) vehicle during at least one of a (VTOL) vehicle takeoff and a (VTOL) vehicle landing, said enclosure comprising an enclosure first end located proximate to the base, said enclosure comprising at least one enclosure opening located near the enclosure first end;

an external shield, said external shield located external to said enclosure, said external shield comprising an external shield first end proximate to the base and an external shield second end located distally from the external shield first end, said external shield configured to receive ground effect air turbulence from the enclosure through the at least one enclosure opening, said external shield further configured to mitigate the ground effect air turbulence within the apparatus by directing ground turbulent air out from and away from said enclosure in real time; and wherein the at least one first cooperating stabilizer element comprises at least one of a male attachment portion and a female attachment portion.

2. The apparatus for stabilizing takeoff and landing of a VTOL vehicle of claim 1, wherein the enclosure further comprises at least one moveable enclosure panel, said at least one moveable enclosure panel configured to open to form the at least one enclosure opening during at least one of the VTOL vehicle takeoff and the VTOL vehicle landing.

3. The apparatus for stabilizing takeoff and landing of a VTOL vehicle of claim 2, further comprising:
    a detector for detecting pressure within at least a localized region of the enclosure;
    a controller in communication with the detector; and
    an actuator in communication with the controller, said actuator
        further in communication with the at least one moveable enclosure panel.

4. The apparatus for stabilizing takeoff and landing of a VTOL vehicle of claim 1, further comprising:
    a frame, said frame comprising:
    a plurality of vertically-oriented support elements, said plurality of vertically-oriented support elements spaced at a distance from one another;
    at least one circumferential frame support, said at least one circumferential frame support in communication with one or more of the plurality of vertically-oriented support elements; and
    wherein said enclosure is dimensioned to substantially surround the frame.

5. The apparatus for stabilizing takeoff and landing of a VTOL vehicle of claim 4, wherein the frame is configured to support the plurality of vertically-oriented support elements.

6. The apparatus for stabilizing takeoff and landing of a VTOL vehicle of claim 4, wherein said base is configured to support the frame.

7. The apparatus for stabilizing takeoff and landing of a VTOL vehicle of claim 1, further comprising:
    a guide, said guide in communication with the vertically-oriented support element second end said guide further in communication with the at least one first cooperating stabilizer element.

8. The apparatus for stabilizing takeoff and landing of a VTOL vehicle of claim 7, wherein the guide further comprises:
    a guide inner surface, said guide inner surface further comprising at least one guide inner surface channel, said at least one guide inner surface channel dimensioned to receive a second cooperating stabilizer element into the at least one guide inner surface channel, said at least one guide inner surface channel in communication with the at least one first cooperating stabilizer element.

9. The apparatus for stabilizing takeoff and landing of a VTOL vehicle of claim 1, further comprising:
    a first end, said first end proximate to a ground level;
    a second end, said second end located a selected distance from the first end, said selected distance equal to a total length of the apparatus; and
    wherein the apparatus is located proximate to a dwelling.

10. An apparatus for stabilizing takeoff and landing of a vertical takeoff and landing (VTOL) vehicle, the apparatus comprising:
    a vertically-oriented support element, said vertically-oriented support element comprising:
        a vertically-oriented support element first end proximate to a base;
        a vertically-oriented support element second end located at a distance away from the vertically-oriented support element first end, said vertically-oriented support element extending from the vertically-oriented support element first end to the vertically-oriented support element second end, said vertically-oriented support element further comprising at least one first cooperating stabilizer element proximate to the vertically-oriented support element second end;
    an enclosure, said enclosure dimensioned to substantially surround the vertically-oriented support element, said enclosure further dimensioned to completely surround a vertical takeoff and landing (VTOL) vehicle during at least one of a VTOL vehicle takeoff and a VTOL vehicle landing, said enclosure comprising an enclosure first end located proximate to the base and an enclosure second end located distally from the base, said enclosure further comprising an enclosure inner wall spaced a selected distance from an enclosure outer wall, with an internal wall inner volume disposed between the enclosure inner wall and the enclosure outer wall; and
    an external shield, said external shield located external to said enclosure, said external shield comprising an external shield first end proximate to the base and an external shield second end located distally from the external shield first end, said external shield configured to receive ground effect air turbulence from the enclosure through an enclosure opening, said external shield further configured to mitigate the ground effect air turbulence within the apparatus by directing ground turbulent air out from and away from said enclosure in real time.

11. The apparatus for stabilizing takeoff and landing of a VTOL vehicle of claim 10, wherein said enclosure further comprises at least one of a honeycomb material, acoustic foam, a phase cancellation material, an active noise cancellation panel, a passive noise cancellation panel, and combinations thereof.

12. The apparatus for stabilizing takeoff and landing of a VTOL vehicle of claim 10, further comprising:
a guide, said guide in communication with the vertically-oriented support element second end, said guide further in communication with the at least one first cooperating stabilizer element, said guide further comprising a guide inner surface, said guide inner surface further comprising at least one guide inner surface channel, said at least one guide inner surface channel dimensioned to receive a second cooperating stabilizer element into the at least one guide inner surface channel, said at least one guide inner surface channel in communication with the at least one first cooperating stabilizer element.

* * * * *